(12) United States Patent
Hatakeyama et al.

(10) Patent No.: US 7,252,389 B2
(45) Date of Patent: Aug. 7, 2007

(54) PROJECTION OPTICAL SYSTEM

(75) Inventors: Koshi Hatakeyama, Tokyo (JP);
Toshihiro Sunaga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/345,523

(22) Filed: Feb. 2, 2006

(65) Prior Publication Data

US 2006/0126029 A1 Jun. 15, 2006

Related U.S. Application Data

(62) Division of application No. 10/803,066, filed on Mar. 16, 2004, now Pat. No. 7,086,742.

(30) Foreign Application Priority Data

Mar. 18, 2003 (JP) ............................. 2003-074658

(51) Int. Cl.
*G03B 21/28* (2006.01)
*G02B 27/18* (2006.01)

(52) U.S. Cl. ..................... 353/70; 353/98; 359/632; 348/745

(58) Field of Classification Search ........... 353/81, 353/20, 69, 70, 98–101; 359/649, 364–366, 359/433–435, 796, 797, 813, 822, 823, 872–874, 359/633, 631, 858, 632, 873; 348/745–747, 348/782–785, 788; 349/7, 8, 57
See application file for complete search history.

(56) References Cited

U.S. PATENT DOCUMENTS

| | | | |
|---|---|---|---|
| 4,089,599 A | 5/1978 | Kuboshima | |
| 5,442,413 A * | 8/1995 | Tejima et al. | 353/69 |
| 6,208,318 B1 | 3/2001 | Anderson et al. | |
| 6,412,972 B1 | 7/2002 | Pujol et al. | |
| 6,450,648 B1 | 9/2002 | Ohzawa et al. | |
| 6,626,541 B2 | 9/2003 | Sunaga | |
| 6,765,544 B1 * | 7/2004 | Wynne Willson | 345/6 |
| 6,817,722 B1 * | 11/2004 | Cole et al. | 353/69 |
| 2002/0008853 A1 | 1/2002 | Sunaga | |
| 2003/0035232 A1 * | 2/2003 | Sasaki | 359/859 |
| 2003/0107716 A1 | 6/2003 | Ogawa | |
| 2004/0223126 A1 * | 11/2004 | Hatakeyama et al. | 353/122 |

FOREIGN PATENT DOCUMENTS

| | | |
|---|---|---|
| EP | 1 139 145 | 10/2001 |
| JP | 8-292371 | 11/1996 |
| JP | 8-292372 | 11/1996 |
| JP | 9-005650 | 1/1997 |
| JP | 9-222561 | 8/1997 |
| JP | 9-304733 | 11/1997 |
| JP | 10-282451 | 10/1998 |
| JP | 2000-89227 | 3/2000 |
| JP | 2001-255462 | 9/2001 |

\* cited by examiner

*Primary Examiner*—Andrew T. Sever
(74) *Attorney, Agent, or Firm*—Morgan & Finnegan LLP

(57) ABSTRACT

A projection optical system is disclosed with which undistorted images can be obtained at any image position within a specification range, and whose projection angle can be changed. The projection optical system includes a plurality of optical elements and a first optical system constituted by at least one of the plurality of optical elements having the ability to form an image with light onto a predetermined surface different from the projection surface. A projection image of the original image can be moved by rotating a first optical element of the plurality of optical elements substantially around a center of an exit pupil position of the first optical system as the rotation center.

35 Claims, 54 Drawing Sheets

PROJECTION OPTICAL SYSTEM

This is a divisional of prior application Ser. No. 10/803,066, filed Mar. 16, 2004 now U.S. Pat. No. 7,086,742, now pending. The prior application is incorporated herein by reference in its entirety.

BACKGROUND OF THE INVENTION

1. Field of the Invention

The present invention relates to projection optical systems projecting light from an original image onto a projection surface, and to image projection apparatuses having such a projection optical system.

2. Description of Related Art

As projection optical systems used for projectors (image projection apparatuses), projection optical systems have been proposed, which can project images obliquely onto a screen in order to perform image projection without obstructing the visual field of the viewers. Moreover, since so-called trapezoidal distortion occurs in the projection image when projecting images obliquely onto the screen, there have been proposals regarding the correction of this trapezoidal distortion.

The projection optical system proposed in Japanese Patent Application Laid-Open No. H9(1997)-304733 (referred to in the following as Document 1) is an application of a coaxial rotationally symmetric f-θ lens, and rotates the image surface in a state in which there is no trapezoidal distortion of the image due to rotationally decentering a lens unit around the aperture stop. Moreover, the projection optical system proposed in Japanese Patent Application Laid-Open No. H9(1997)-282451 (referred to in the following as Document 2) corrects trapezoidal distortion with a fixed projection angle by using a decentered aspherical surface.

On the other hand, regarding off-axial optical systems, a design method and method of calculating paraxial amounts such as the focal length for off-axial optical systems have been disclosed in Japanese Patent Application Laid-Open No. H9(1997)-005650 (referred to in the following as Document 3), and design examples of off-axial optical systems are shown in Japanese Patent Application Laid-Open No. H8(1996)-292371, Japanese Patent Application Laid-Open No. H8(1996)-292372, and Japanese Patent Application Laid-Open No. H9(1997)-222561, and it has become clear that it is possible to construct optical systems with sufficient correction of aberrations by introducing the concept of reference axis and using asymmetric aspherical surfaces as the constituent surfaces.

Such off-axial optical systems are defined as optical systems which, when the path of the light ray passing through the image center and the pupil center is defined as the reference axis, include curved surfaces whose surface normal at the intersection of the constituent surface with the reference axis is not on the reference axis (off-axial curved surfaces), and in which the reference axis takes on a bent shape.

In such off-axial systems, the constituent surfaces are ordinarily non-coaxial, and there is no vignetting at the reflective surfaces, so that it is easy to construct an optical system using reflective surfaces. Moreover, a compact optical system with a broad field angle can be configured by forming an intermediate surface within the optical system. Furthermore, the light path can be guided relatively freely while using a front-aperture optical system, so that a compact optical system can be configured.

Utilizing these characteristic features, Japanese Patent Application Laid-Open No. 2001-255462 (corresponding to U.S. Pat. No. 6,626,541 and EP 1139145 (A2)) and No. 2000-089227 propose a projection optical system in which trapezoidal distortion at a fixed projection angle is corrected using curved rotationally asymmetric reflective surfaces.

The projection optical system proposed in Document 1 uses a combination of coaxial rotationally symmetric f-θ optical systems, but its field angle is narrow, so that it is difficult to apply to ordinary projectors or the like. Moreover, with ordinary lenses, the light amount is reduced as the field angle from the optical axis becomes large, so that there are greater differences in the brightness on the image surface the broader the field angle of the used lens system is. For this reason, the projection optical system in Document 1 is not suited for projectors that necessitate a broad field angle and a bright image surface.

The projection optical system proposed in Document 2 corrects the trapezoidal distortion with decentered aspherical surfaces. However, since it is a projection optical system that can correct the trapezoidal distortion only at a fixed projection angle, the degree of freedom for the positions at which the projection apparatus can be set up is compromised. Moreover, regarding the fact that the shift amount of the image surface is small and that it is not telecentric with respect to the liquid crystal panel, it is not suited for projectors.

The projection optical systems in Documents 3 and 4 accomplish a correction of the trapezoidal distortion over a broad field angle using curved rotationally asymmetric reflective surfaces. However, they are projection optical systems with which the trapezoidal distortion can be corrected only at a fixed projection angle, so here, too, the degree of freedom for the positions at which the apparatus can be set up is compromised.

SUMMARY OF THE INVENTION

It is an object of the present invention to provide a projection optical system and an image projection apparatus including the same, with which undistorted images can be obtained at any image position within a specification range, and whose projection angle can be changed.

In accordance with one aspect of the present invention, a projection optical system projecting light from an original image onto a projection surface includes a plurality of optical elements, and a first optical system constituted by at least one of the plurality of optical elements having an ability to form an image with the light onto a predetermined surface different from the projection surface. A projection image of the original image can be moved (for example, moved in parallel or in a tilting direction) by rotating a first optical element of the plurality of optical elements substantially around a center of an exit pupil of the first optical system.

These and further objects and features of the projection optical system, the image projection apparatus and the image display system of the present invention will become apparent from the following detailed description of preferred embodiments thereof taken in conjunction with the accompanying drawings.

DETAILED DESCRIPTION OF THE PREFERRED EMBODIMENTS

The following is a description of preferred embodiments of the present invention, with reference to the accompanying drawings.

Figure 52:
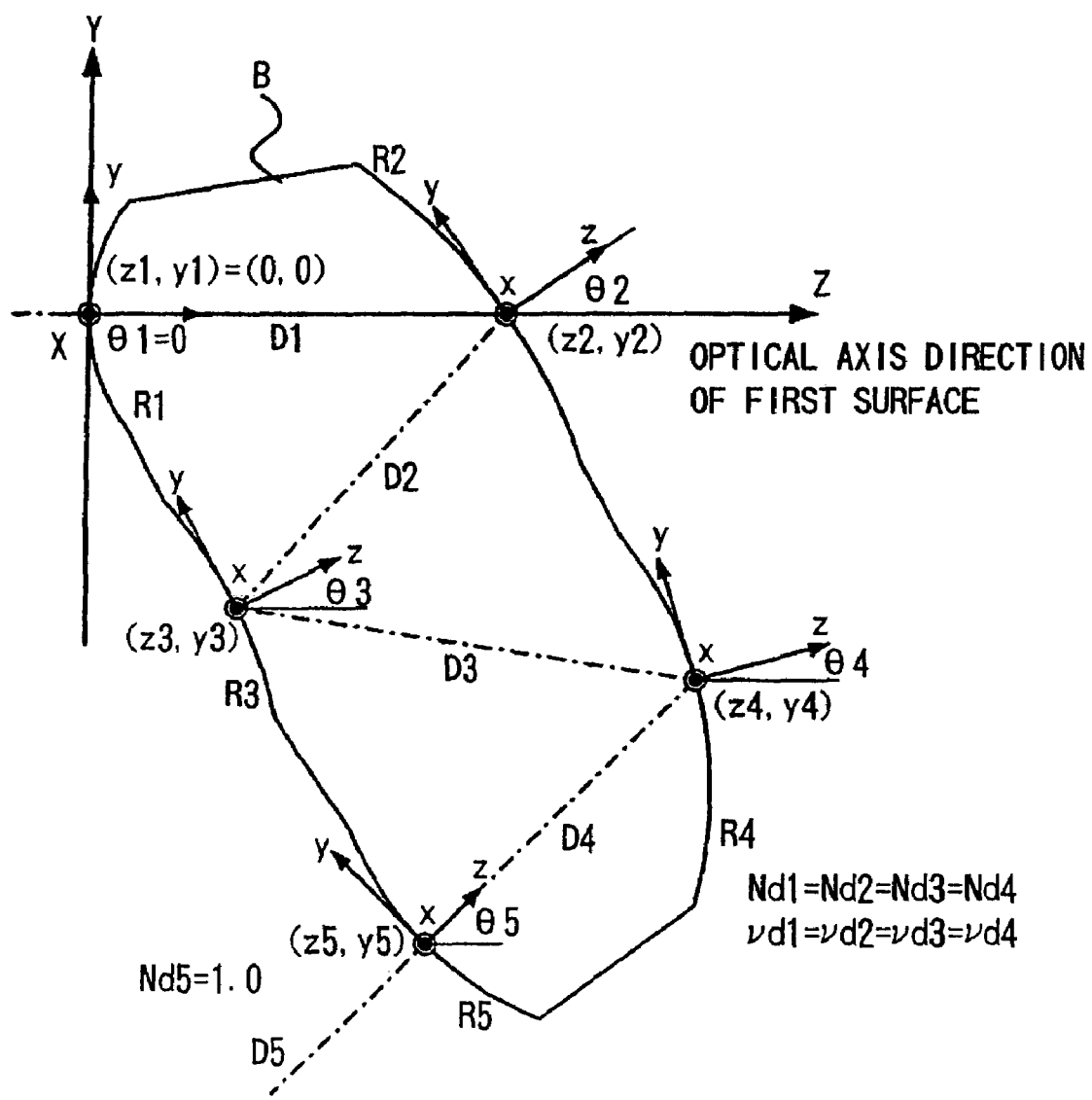
FIG. 52 is a diagram illustrating the coordinate systems in the present embodiments.

First, before going into the description of the embodiments, the notation for structural aspects in the embodiments as well as some common points of the overall embodiments are explained. FIG. 52 is a diagram of a coordinate system in which the structural data of the optical systems of the embodiments are defined. In the present embodiments, "i-th surface" means the i-th surface along the path of a single light ray traveling from the object side to the image surface (this light ray is indicated by a dash-dot line in FIG. 52 and is referred to as reference axis ray).

In FIG. 52, a first surface R1 is a refractive surface, a second surface R2 is a reflective surface which is tilted with respect to the first surface R1, a third surface R3 and a fourth surface R4 are reflective surfaces which are both shifted and tilted with respect to the surface respectively preceding them, and a fifth surface R5 is a refractive surface which is shifted and tilted with respect to the fourth surface R4. The various surfaces from the first surface R1 to the fifth surface R5 are constituted by a single optical element, which is made of a medium such as glass or plastic, namely a first optical element B shown in FIG. 52.

Consequently, in the structure in FIG. 52, the medium from the object surface (not shown in the drawings) to the first surface R1 is air, there is a common medium from the first surface R1 to the fifth surface R5, and the medium from the fifth surface R5 to the sixth surface R6 (not shown in the drawings) is air.

The optical system of each of the embodiments is an off-axial optical system, which means that the various surfaces constituting the optical system do not have a common optical axis. Accordingly, in the present embodiments, an absolute coordinate system is set, whose origin is defined as the center of the first surface.

Then, while making the center of the first surface in the present embodiments the origin, the path of the light ray passing through the centers of the origin and the final image-forming surface (in the following, this light ray is referred to as "reference axis ray") is defined as the reference axis of the optical system. Furthermore, the reference axis in the present embodiments is directional. The direction of the reference axis is the direction in which the reference axis ray travels during image formation.

In the present embodiments, the reference axis serving as the reference of the optical system is set as explained above, when choosing the axis serving as the reference of the optical system, one should choose an axis which is appropriate with regard to the optical design, to accounting for aberrations and expressing the surface shapes constituting the optical system. Typically, however, the path of a light ray passing through the center of the image surface and the center of the aperture stop or the entrance pupil or the exit pupil or the first surface of the optical system, or the center of the final surface is set as the reference axis.

That is to say, in the present embodiments, the reference axis passes through the center of the first surface, and the path over which the light ray (reference axis ray) reaching the center of the final image-formation surface is refracted and reflected by the refractive and reflective surfaces is defined as the reference axis. The order of the surfaces is defined as the order of the surfaces at which the reference axis ray is refracted and reflected.

Consequently, the reference axis changes its direction in accordance with the rules for refraction or reflection along the various surfaces in the set order, and finally reaches the center of the image surface. Moreover, in the present embodiments, object surface side, image display panel surface side as well as predetermined image surface side, image surface side and screen side indicate the sides with respect to the direction of the reference axis.

The various axes of the absolute coordinate system of the optical systems according to the present embodiments are defined as follows.

Z axis: A straight line passing through the origin and the center of the object surface. The direction from the object surface to the first surface R1 is defined as positive.

Y axis: A straight line passing through the origin and forming an angle of 90° counterclockwise with the Z axis, in accordance with the definition of a right-handed coordinate system.

X axis: A straight line passing through the origin and perpendicular to the Z axis and the Y axis.

Moreover, to express the surface shape and the tilt angle of the i-th surface of the optical system, a local coordinate system is defined by taking the point at which the reference axis intersects with the i-th surface as the origin. Expressing the surface shape of the surface in the local coordinate system and expressing the tilt angle as the angle defined by the reference axis and the local coordinate system makes shape and angle more intuitive than annotating the shape and tilt angle of that surface in the absolute coordinate system. For this purpose, the surface shape of the i-th surface is expressed by the following local coordinate system. For this, first, the following coordinate system on the reference axis is defined with respect to any given point on the reference axis:

zb axis: A straight line passing through a given point on the reference axis and taking the direction of the reference axis as positive. At points where the reference axis is deflected, the incidence direction is taken as positive.

yb axis: A straight line passing through a given point on the reference axis and forming an angle of 90° counterclockwise with the zb axis, in accordance with the definition of a right-handed coordinate system. At the origin of the absolute coordinate system, the yb axis coincides with the Y axis of the absolute coordinate system, and thereafter, there shall be no rotation with respect to the zb axis.

xb axis: A straight line passing through a given point on the reference axis and perpendicular to the zb axis and the yb axis.

Next, the local coordinate system is defined.

z axis: A surface normal through the origin of the local coordinate system.

y axis: A straight line through the origin of the local coordinate system, and forming an angle of 90° counterclockwise with the z axis, in accordance with the definition of a right-handed coordinate system.

x axis: A straight line through the origin of the local coordinate system and perpendicular to the ybzb plane.

Figure 53:
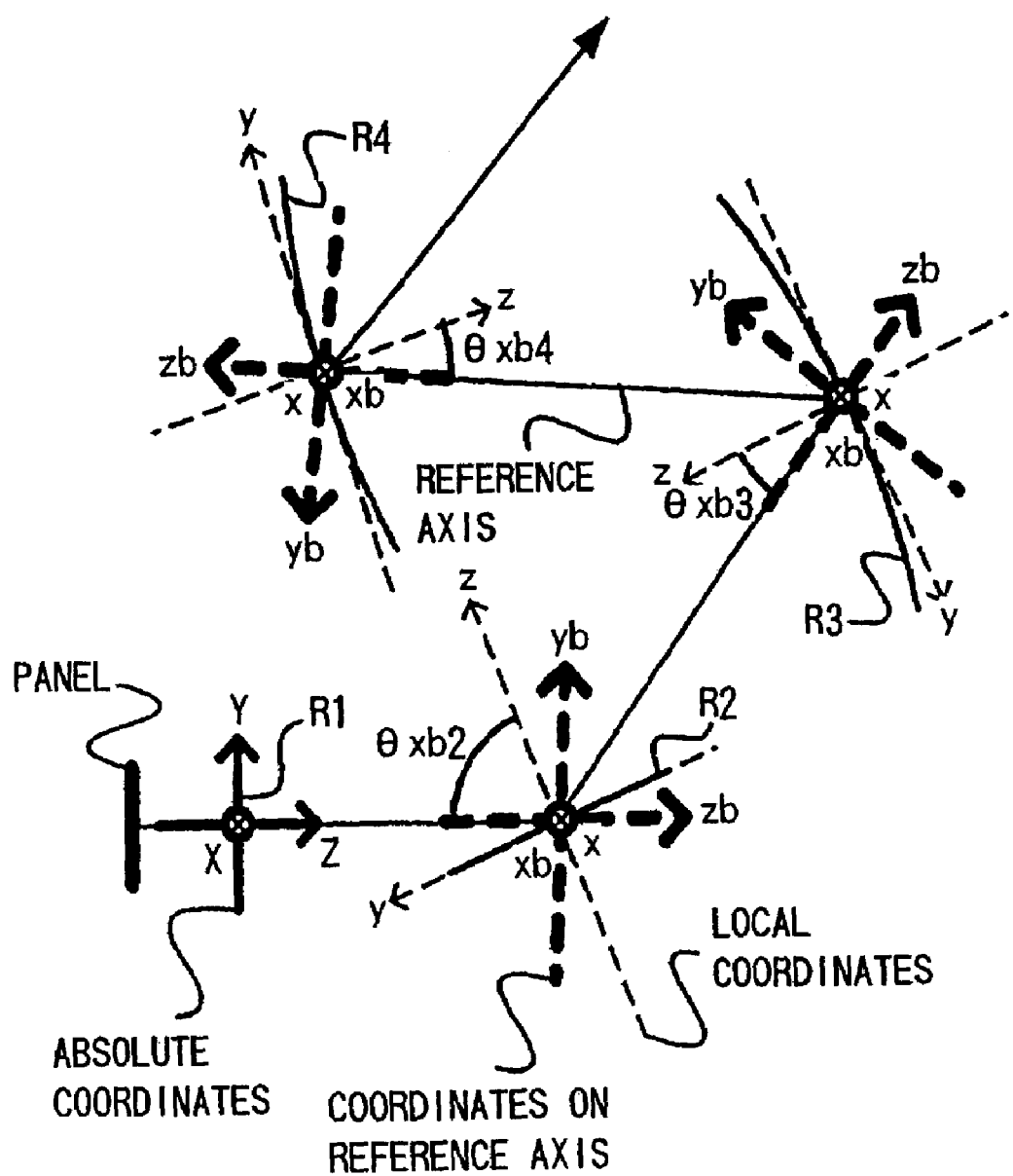
FIG. 53 is a diagram illustrating the absolute coordinate system, the reference axis based coordinate system and the local coordinate system.

Consequently, in the present embodiments (numerical examples), the tilt angle in the i-th ybzb plane is expressed as the angle $\theta xb,i$ (in degrees) between the z axis of the local coordinate system and the zb axis of the coordinate system on the reference axis, taking the counterclockwise direction in which the two axes form a sharp angle as positive, the tilt angle in the i-th xbzb plane is expressed as the angle $\theta yb,i$ (in degrees) to the zb axis of the coordinate system on the reference axis, taking the counterclockwise direction as positive, and the tilt angle in the i-th xbyb plane is expressed as the angle θzb,i (in degrees) to the yb axis of the coordinate system on the reference axis, taking the counterclockwise direction as positive. Ordinarily, however, θzb,i corresponds to a rotation of the surface and is disregarded in the present embodiments. FIG. 53 illustrates the relationship between the absolute coordinate system, the coordinate systems on the reference axis and the local coordinate systems.

Moreover, in the present embodiments (numerical examples), Di is a scalar quantity expressing the distance between the origins of the local coordinate systems of the i-th surface and the (i+1)th surface, and Ndi and vdi are, respectively, the refractive index and the Abbe number of the medium between the i-th surface and the (i+1)th surface. Furthermore, e–X is shorthand for $10^{-X}$.

Here, the shape of spherical surfaces is expressed by the following equation:

$$z = \frac{(x^2 + y^2)/Ri}{1 + \{1 - (x^2 + y^2)/Ri^2\}^{1/2}} \quad (1)$$

Moreover, the optical systems of the present embodiments have at least one aspherical surface, which is rotationally asymmetric, and whose shape can be expressed by the following equation:

$z = C02y^2 + C20x^2 + C03y^3 + C21x^2y + C04y^4 + C22x^2y^2 + C40x^4 + C05y^5 + C23x^2y^3 + C41x^4y + C06y^6 + C24x^2y^4 + C42x^4y^2 + C60x^6$

In this curved surface equation, all x's have even exponents, so that the curved surface given by this curved surface equation is plane symmetric with the yz plane as the symmetry plane. Moreover, if the following condition is satisfied, then the above equation expresses a shape which is symmetric with respect to the xz plane:

C03=C21=C05=C23=C41=t=0

Moreover, if
C02=C20
C04=C40=C22/2 and
C06=C60=C24/3=C42/3 are satisfied, then the above equation expresses a rotationally symmetric shape. If these conditions are not satisfied, then it expresses a rotationally asymmetric shape.

Figure 54:
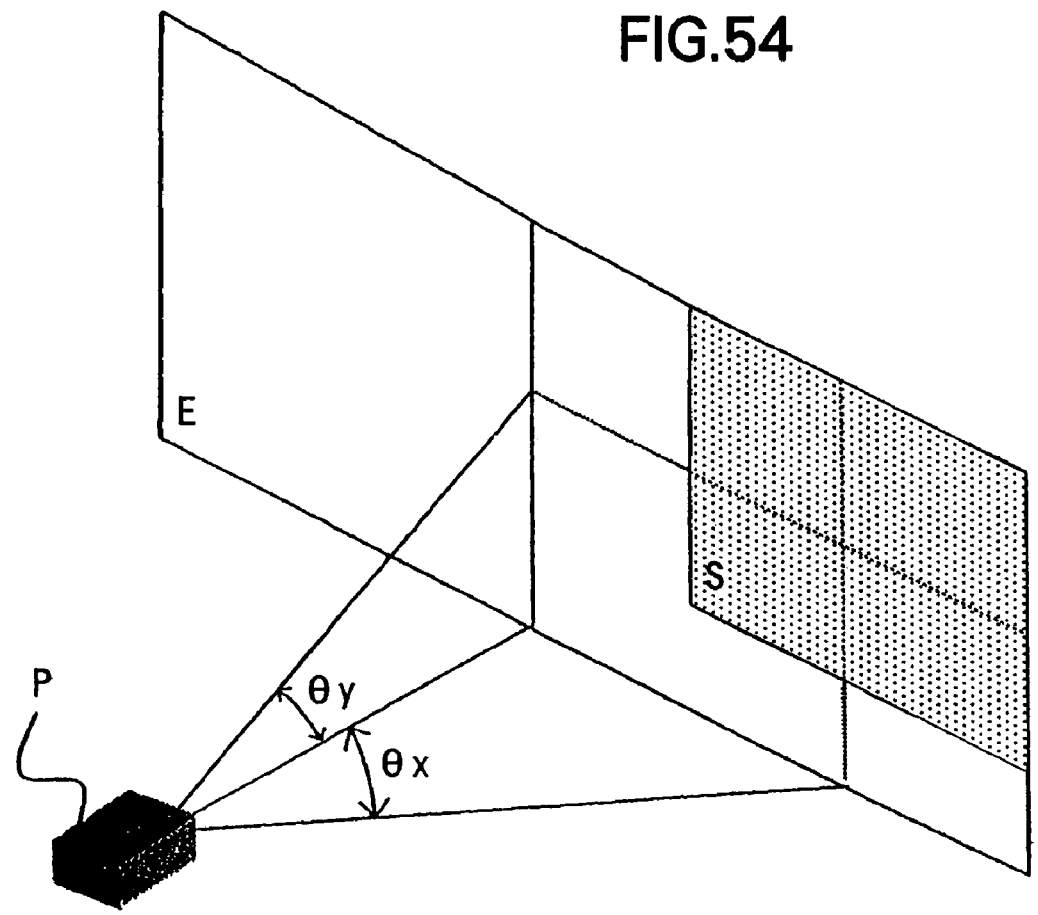
FIG. 54 is a diagram illustrating the projection angle in the present embodiments.

Next, the projection angle of the optical system for moving (parallel movement or tilting of) the image surface is defined. FIG. 54 illustrates the positional relationship between a screen and an image surface. P denotes a projection optical system and an image projection apparatus according to the present embodiments, S denotes an image surface on which the actual image display is performed, E denotes a region through which the image surface S can be moved while maintaining a favorable image-forming performance. This region E is referred to as the effective projection region on the screen. In the following description, the symbol E is also added to the screen. The position of the image surface S within the effective projection region E is expressed by the angle formed by the normal on the screen surface and the x and y components of the reference axis reaching the center of the image surface S from the center of the exit pupil SSa of the projection optical system P, and is given by the projection angle θx, θy.

Figure 50:
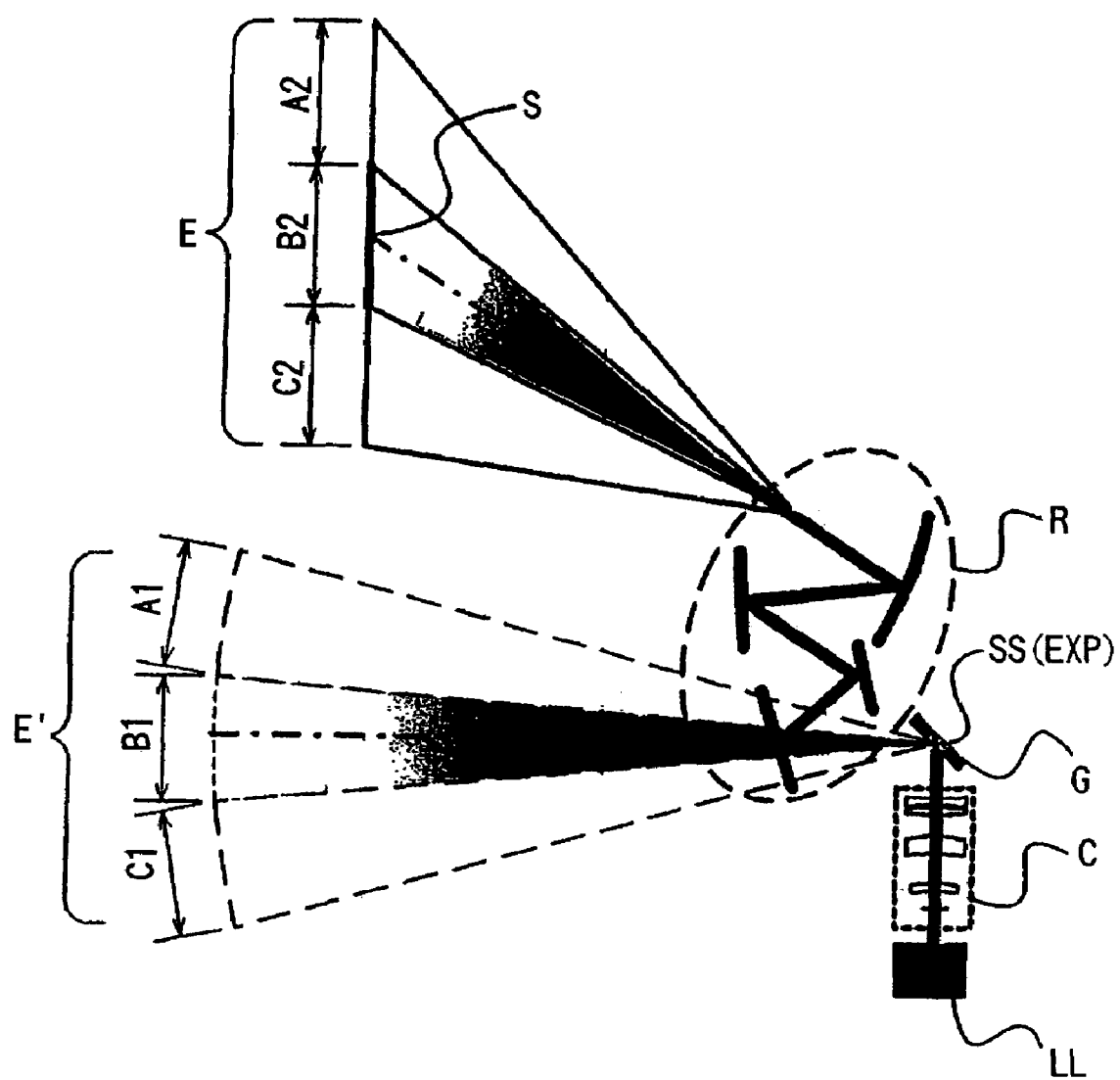
FIG. 50 is a diagram illustrating the principle for varying the projection angle in accordance with the present invention.

The basic principle for realizing a projection angle variation while maintaining a favorable optical performance with the image projection apparatuses of the present embodiments is explained using FIG. 50.

In FIG. 50, although not shown in detail, LL denotes an image display panel system comprising a light valve (image display panel: image forming element) using a liquid crystal, a reflective dot matrix liquid crystal or a digital micro-mirror device or the like, and an illumination system illuminating light onto the light valve. C denotes a first optical system having image-forming capability, which forms an image on a spherical surface B1, whose curvature center is at an exit pupil EXP at an aperture stop SS of the first optical system C, after reflection at a rotatable mirror G. Needless to say, the first optical system C should have the capability to form an image onto the spherical surface B1, so that it may be an optical system with coaxial rotational symmetry, or an optical system including a curved reflective surface as a structural element. Moreover, the aperture stop of the first optical system C does not necessarily have to coincide with the exit pupil EXP, in which case the rotatable mirror G is disposed at the position of the exit pupil EXP.

Moreover, the surface on which the first optical system C forms an image does not necessarily have to be a spherical surface, and there may also be a discrepancy from a spherical surface, within a range which is determined by the depth of focus. However, it is preferable that the first optical system C has the ability to form an image on a curved surface which is concave with respect to the light valve LL.

In this situation, when the rotatable mirror G is rotated in the paper plane of the figure, the image on the spherical surface B1 moves to A1 or C1 while maintaining the optical performance, that is to say, it is moved continuously over the region E'.

Next, by placing a second optical system R including curved reflective surfaces as structural elements in front of the rotatable mirror Gas shown in FIG. 50, the image of the first optical system C is guided to the second optical system R. In this situation, the second optical system R is designed such that the image on the spherical surface (A1, B1 or C1) is image-formed with favorable optical performance on the screen (effective projection region E)

Moreover, by using a second optical system R comprising curved reflective surfaces as structural elements, it is possible to project an image obliquely onto the screen E, due to the characteristics of the off-axial optical system.

Consequently, the image of the image display panel system LL is displayed at a region B2 on the screen E, after passing through the first optical system C, the rotatable mirror G and the second optical system R. The images A1, B1 and C1 on the region E' can be respectively imaged onto A2, B2 and C2 on the screen by rotating the rotatable mirror G as mentioned above. Therefore, the projection optical system of the present embodiments can perform image display at any projection angle within a region E at which a favorable optical performance is ensured by the second optical system R. However, the member rotating around the exit pupil EXP of the first optical system C on the panel side is not limited to the rotatable mirror G, and it is also possible that the first optical system C and the image display panel system LL are rotated together, or that the second optical system R on the image side is rotated. These are relative rotations of the members, so that rotations of any of the members including the optical systems are optically equivalent.

Moreover, image B1 on the region E' does not necessarily have to be imaged onto a spherical surface. That is to say, the region E' does not have to form a spherical surface. In other words, as can be seen from the above-described principle, in order to vary the projection angle, the image B1 of the first optical system C on the panel side has to be continuously moved on the region E' while maintaining a favorable optical performance, and this is best realized by making the region E' a spherical surface. In actuality, however, there is some latitude in the tolerances of the optical performance, such as depth of focus and distortion, so that as long as the tolerances are met, the region E' may be of any surface shape, and does not necessarily have to be spherical.

Furthermore, to explain the image-forming of the first optical system C on the panel side, when the projection optical systems P of the present embodiments vary the position of the image surface S two-dimensionally on the screen E, if the aberrations of the entire field angle in respective azimuth directions are uniform, then they do not need to be sufficiently corrected. This is because, if the aberrations are uniform for the entire field angle, then they can be corrected by the second optical system R on the image side, which includes curved reflective surfaces as structural elements. Moreover, when the position of the image surface S is varied one-dimensionally in only a single direction (moving direction) on the screen, if the aberrations for the entire field angle of the moving direction are uniform, then the imaging performance in directions that are not the moving direction does not need to be favorable. This is also because it can be corrected by the second optical system R on the image side, which includes curved reflective surfaces as structural elements.

Moreover, the above-described principle was explained only in the paper plane, but it is the same also for three-dimensional space. However, a two-dimensional movement of the image on the screen with rotatable mirrors as the only members rotating around the exit pupil of the first optical system C on the panel side can be easily accomplished using a total of two rotatable mirrors G1 and G2 which are responsible for rotation in horizontal direction and rotation in vertical direction, respectively.

This is because, when the rotatable mirror G in FIG. 50 is rotated in the direction perpendicular to the paper plane, then the image display panel of the image display panel system LL and the rotatable mirror G are in a skewed positional relation, so that even though the reference axis ray on the screen E is imaged onto the desired location, the image surface S is rotated on the screen. However, arranging a plurality of rotatable mirrors G1 and G2 at the exit pupil EXP of the first optical system C on the panel side is physically impossible, so that even if the rotatable mirrors G1 and G2 are strictly speaking not arranged at the exit pupil EXP, they may be arranged near the exit pupil EXP at such a spacing that they do not interfere with one another, as long as the image on the region E' is within the range of tolerances of optical performance as noted above. When two rotatable mirrors are used in the present embodiments of the invention, the rotatable mirror with the larger rotation angle is arranged at the exit pupil EXP, and the other rotatable mirror is arranged at such a spacing that there is no interference.

Needless to say, moving the image two-dimensionally on the screen E in this manner can also be accomplished with a single rotatable mirror which is arranged at the exit pupil EXP of the first optical system C on the panel side, because it is conceivable that there is a means for rotating the panel such that the rotation of the image S is canceled, in order to prevent the above-mentioned rotation of the image S on the screen E.

Embodiment 1

Figure 1:
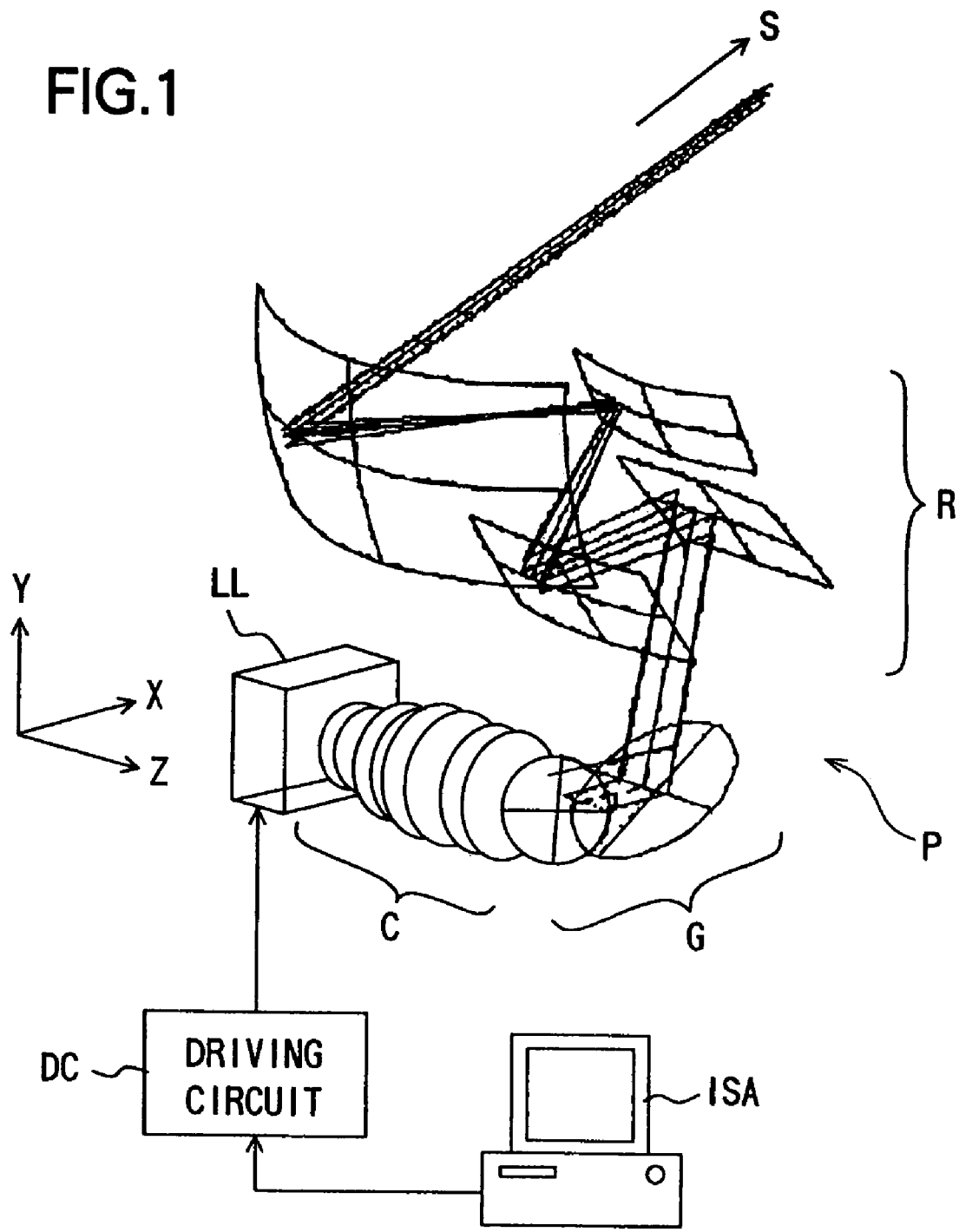
FIG. 1 is a diagram of an image projection apparatus using a projection optical system according to Embodiment 1 of the present invention.
Figure 2:
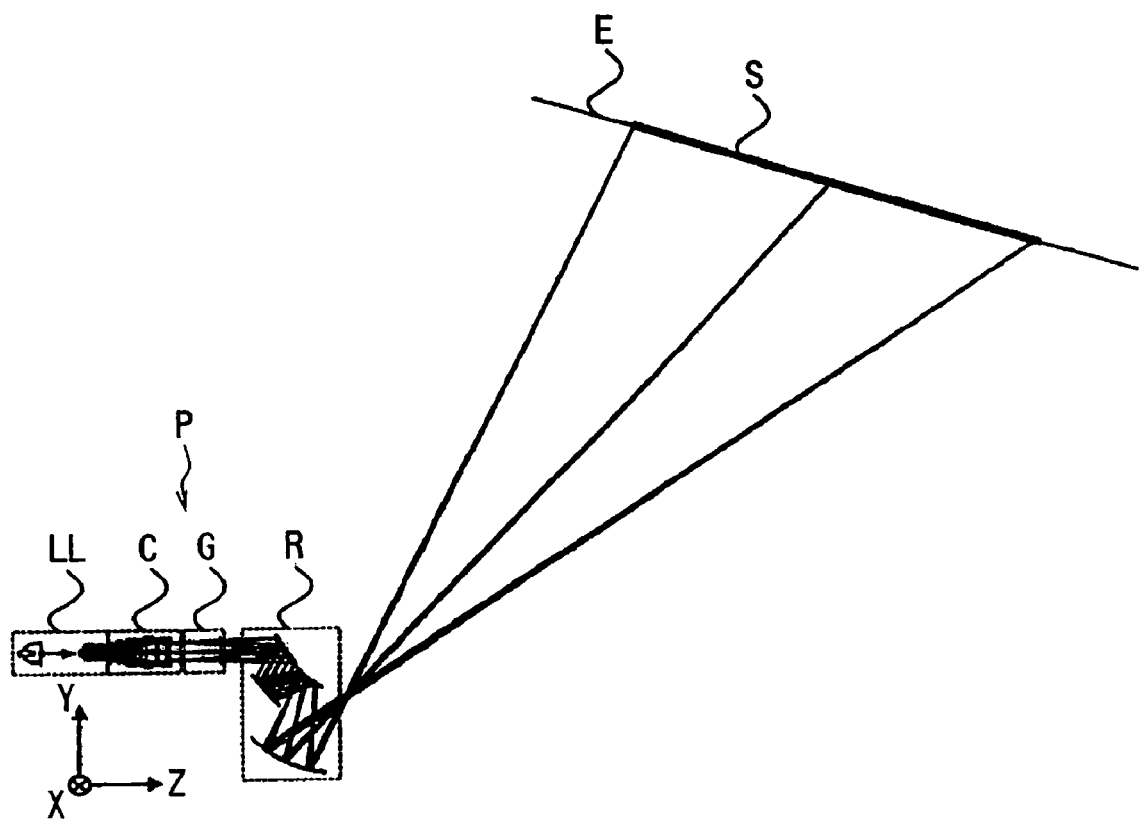
FIG. 2 is a diagram of an image projection apparatus using the projection optical system of Embodiment 1.

FIG. 1 is a birds-eye view of a projection optical system P according to Embodiment 1 of the present invention. FIG. 2 is a diagram in which the reference axis bent by the rotatable mirror G in FIG. 1 has been stretched out. While details have been omitted in FIG. 1, LL denotes an image display panel system comprising three light valves (image display panels: image forming elements) using a liquid crystal for RGB colors, a dichroic optical element performing color combination of RGB color light components from the light valves, and an illumination system illuminating light onto the light valves. Although in this embodiment and the following Embodiments 2 and 5, three light valves are provided, only one light valve is shown in the figures for simplicity. The illumination system is made of a lamp, a condenser lens, and wavelength-selective filters, not shown in the figures.

Each of the light valves is connected to a driver circuit DC, and this driver circuit DC is supplied with image information by an image information supply apparatus ISA, such as a computer, a DVD-player, a video-deck, or a TV tuner. The driver circuit DC drives the light valve in accordance with the supplied image information and forms an original image on the light valve. Thus, an image display system is constituted (this is also the same in the other embodiments).

The projection optical system P uses an off-axial system in which a rotationally symmetric coaxial lens system (first optical system) C, a rotatable mirror G, and a reflective second optical system (second optical system) R comprising off-axial reflective surfaces guide light which has been optically modulated by the light valve to the screen (effective projection region) E shown in FIG. 2, and form an image S on the screen E. The size of the screen E is 1300×3020 mm, the size of the image surface S is 60 inches (914.4×1219.2 mm) with an aspect ratio of 3:4, the corrective projection angle range as expressed by the angle formed by the normal on the screen E and the reference axis is θx: −30.96° to 30.96°, θy: 16.96° to 29.33°.

Figure 3A:
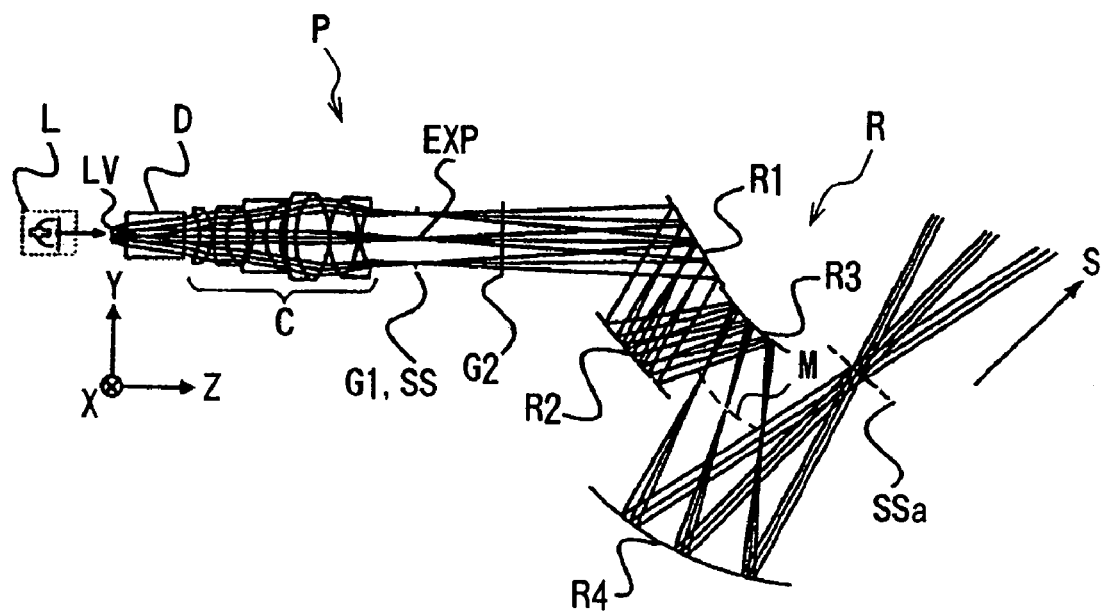
FIG. 3A is a diagram showing the image display panel system, the dichroic optical element, the coaxial and rotationally symmetric system, the rotatable mirrors and the reflective second optical system R of the projection optical system according to Embodiment 1.

FIG. 3 shows enlarged views of the projection optical systems C, R, rotatable mirror G, and the image display panel system LL in FIGS. 1 and 2. In FIG. 3A, LV denotes a light valve using a liquid crystal, and L denotes an illumination system illuminating light onto the light valve LV. The size of the light valve LV (size of the effective display surface) is 10.668×14.224 mm. D denotes a dichroic optical element performing color combination of RGB color light components from the light valves, but FIG. 3A is a simplified light path diagram for only one panel. C denotes a refractive optical system (first optical system) made of coaxial and rotationally symmetric spherical surfaces C1 to C14, and G1 denotes a rotatable mirror placed at the position of an aperture stop SS. G2 denotes a rotatable mirror placed near the aperture stop SS at such a distance to the rotatable mirror G1 that there is no interference between the two. R1 to R4 denote off-axial reflective surfaces constituting a reflective optical system (second optical system) R.

Figure 3B:
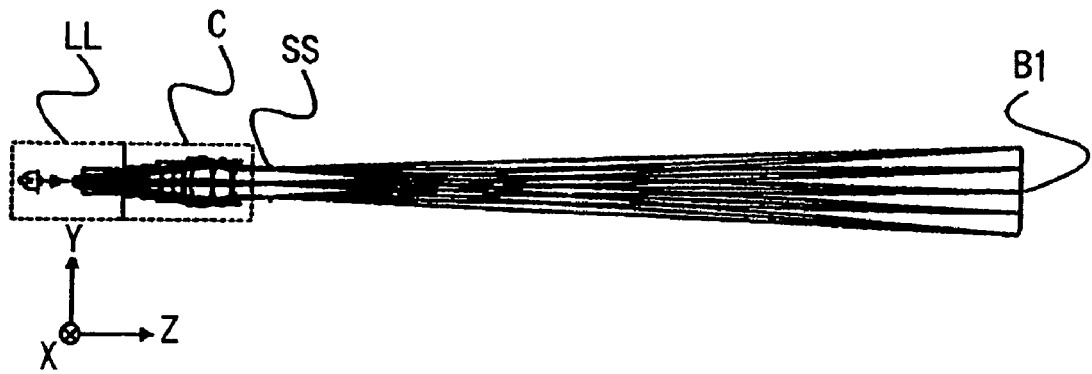
FIG. 3B is a diagram showing the image display panel system, the dichroic optical element, the coaxial and rotationally symmetric system, and the image in the screen for the projection optical system according to Embodiment 1.

FIG. 3B illustrate how the first optical system C in FIGS. 1, 2 and 3A forms an image B1 on the screen E. The distance from the exit pupil EXP (aperture stop SS) to the screen E is 1000 mm, and the image B1 is formed on a spherical surface whose curvature center is the exit pupil EXP. Also in the following Embodiments 2 to 5, the image formation of the first optical system C on the panel side is in principle the same, although the image-formation conditions required by each of the embodiments may differ somewhat.

Figure 4:
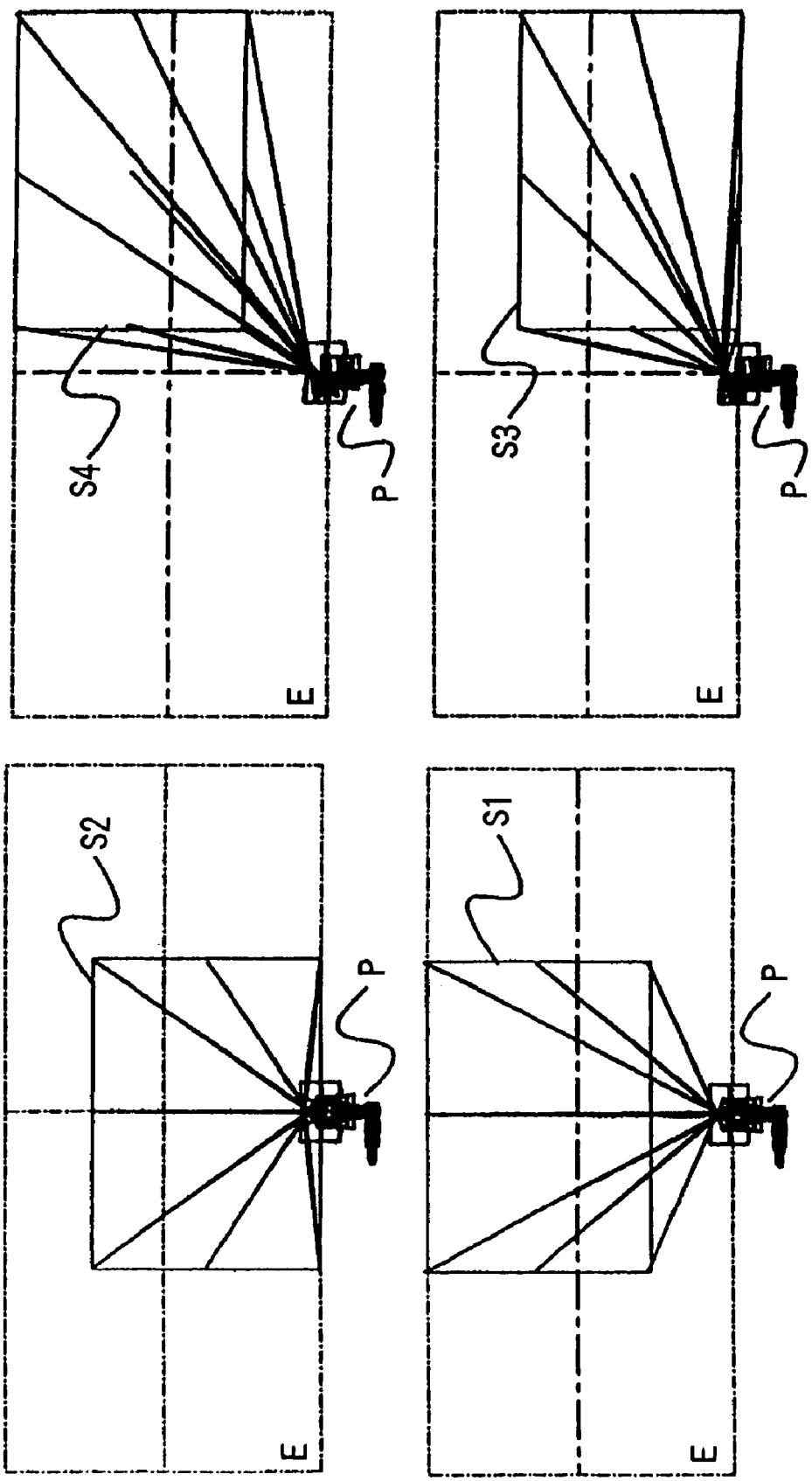
FIG. 4 illustrates how the projection angle can be changed in the image projection apparatus using the projection optical system according to Embodiment 1.

FIG. 4 illustrates the possibility of moving or tilting the position of the image surface S on the screen (effective projection region E), which is a characteristic feature of the projection optical system P of the present embodiment. S1 to S4 denote representative positions of the image surface S which can be moved continually over the region E by rotating the rotatable mirrors G1 and G2 substantially around the center of the exit pupil EXP of the lens system C.

The following lists the structural data of the reflective optical system R used in the present embodiment:

numerical aperture on the object side: 0.25 variable projection angle range:
  θx: −30.96° to 30.96°,
  θy: 16.96° to 29.33°

| surf. | Xi | Yi | Zi | Di | θxb, i | θyb, i | Ndi | νdi | |
|---|---|---|---|---|---|---|---|---|---|
| 1 | 0.00 | 0.00 | 0.00 | 44.00 | 0.00 | 0.00 | 1.755199 | 27.51 | transm. surf. |
| 2 | 0.00 | 0.00 | 44.00 | 11.92 | 0.00 | 0.00 | | | transm. surf. |
| 3 | 0.00 | 0.00 | 55.92 | 10.00 | 0.00 | 0.00 | 1.618000 | 63.33 | transm. surf. |
| 4 | 0.00 | 0.00 | 65.92 | 1.26 | 0.00 | 0.00 | | | transm. surf. |
| 5 | 0.00 | 0.00 | 67.18 | 10.00 | 0.00 | 0.00 | 1.740769 | 27.79 | transm. surf. |
| 6 | 0.00 | 0.00 | 77.18 | 16.57 | 0.00 | 0.00 | 1.618000 | 63.33 | transm. surf. |
| 7 | 0.00 | 0.00 | 93.75 | 3.85 | 0.00 | 0.00 | | | transm. surf. |
| 8 | 0.00 | 0.00 | 97.61 | 10.00 | 0.00 | 0.00 | 1.620041 | 36.26 | transm. surf. |
| 9 | 0.00 | 0.00 | 107.61 | 11.61 | 0.00 | 0.00 | 1.622992 | 58.16 | transm. surf. |
| 10 | 0.00 | 0.00 | 119.22 | 3.11 | 0.00 | 0.00 | | | transm. surf. |
| 11 | 0.00 | 0.00 | 122.33 | 7.92 | 0.00 | 0.00 | 1.581439 | 40.75 | transm. surf. |
| 12 | 0.00 | 0.00 | 130.25 | 26.52 | 0.00 | 0.00 | 1.755199 | 27.51 | transm. surf. |
| 13 | 0.00 | 0.00 | 156.77 | 0.10 | 0.00 | 0.00 | | | transm. surf. |
| 14 | 0.00 | 0.00 | 156.87 | 22.29 | 0.00 | 0.00 | 1.618000 | 63.33 | transm. surf. |
| 15 | 0.00 | 0.00 | 179.16 | 2.40 | 0.00 | 0.00 | 1.639799 | 34.46 | transm. surf. |
| 16 | 0.00 | 0.00 | 181.56 | 45.00 | 0.00 | 0.00 | | | transm. surf. |
| 17 | 0.00 | 0.00 | 226.56 | 69.00 | 0.00 | 45.00 | | | aperture stop, rotatable mirror |
| 18 | 69.00 | 0.00 | 226.56 | 150.00 | 53.79 | 0.00 | | | galv. mirror |
| 19 | 114.30 | 142.99 | 226.56 | 109.00 | 31.64 | 0.00 | | | refl. surf. |
| 20 | 6.69 | 125.68 | 226.56 | 99.00 | −23.00 | 0.00 | | | refl. surf. |
| 21 | 63.27 | 206.91 | 226.56 | 205.00 | 29.00 | 0.00 | | | refl. surf. |
| 22 | −141.47 | 217.14 | 226.56 | 1819.16 | −13.14 | 0.00 | | | refl. surf. |
| 23 | 1527.82 | 940.50 | 226.56 | | 23.42 | 0.00 | | | image surf. | spherical curvature radii
  surface 1 (D1) planar surface
  surface 2 (D2) planar surface
  surface 3 (C1) −45.579
  surface 4 (C2) −36.382
  surface 5 (C3) 116.297
  surface 6 (C4) 32.179
  surface 7 (C5) −78.222
  surface 8 (C6) −41.377
  surface 9 (C7) 38.113
  surface 10 (C8) 79.760
  surface 11 (C9) 143.753
  surface 12 (C10) 63.597
  surface 13 (C11) −65.092
  surface 14 (C12) 60.688
  surface 15 (C13) −62.650
  surface 16 (C14) 46.288
  surface 17 (G1) planar surface
  surface 18 (G2) planar surface aspherical surface coefficients:

surface 19 (R1)
  C02=−3.34627e−004, C20=−4.61252e−004
  C03=2.23745e−006, C21=2.76715e−006
  C04=6.70885e−009, C22=1.73598e−008, C40=7.10187e−009
  C05=5.79161e−011, C23=1.61542e−010, C41=1.41955e−010
  C06=−8.84837e−013, C24=1.36684e−012, C42=5.95360e−013
  C60=−5.85308e−013
  C07=−2.28937e−014, C25=−8.11508e−015, C43=−3.20820e−014
  C61=−1.53876e−014
  C08=−2.31906e−016, C26=−5.52636e−017, C44=−6.69636e−016
  C62=−3.05739e−016
  C80=3.53649e−018 surface 20 (R2)
  C02=6.23351e−004, C20=6.20891e−004
  C03=5.94521e−006, C21=6.09989e−006
  C04=−1.08502e−008, C22=9.06585e−010, C40=5.49583e−009
  C05=−2.51601e−011, C23=−2.10187e−010, C41=−3.05184e−011
  C06=−2.65374e−012, C24=1.96467e−012, C42=−5.95440e−013
  C60=−9.54950e−013
  C07=4.72288e−015, C25=1.45278e−014, C43=8.37905e−015
  C61=−1.48399e−015
  C08=−3.80650e−016, C26=3.75782e−016, C44=−7.45419e−016
  C62=−1.28335e−016
  C80=−1.22431e−017 surface 21 (R3)
  C02=2.15389e−003, C20=2.13068e−003
  C03=3.76710e−006, C21=1.33732e−006
  C04=−2.81173e−008, C22=−4.26703e−008, C40=−1.89475e−008
  C05=−8.09417e−010, C23=−2.91023e−009, C41=−1.61773e−009
  C06=−1.46650e−011, C24=−1.78656e−011, C42=−2.55800e−011
  C60=−1.25734e−011
  C07=−4.15287e−013, C25=3.10824e−013, C43=1.96887e−013
  C61=1.14163e−013
  C08=−1.15460e−014, C26=8.27649e−015, C44=7.90915e−016
  C62=1.92887e−015
  C80=5.66114e−016 surface 22 (R4)
  C02=1.97749e−003, C20=2.24885e−003
  C03=−6.73980e−007, C21=−9.41737e−007
  C04=6.60684e−009, C22=1.41999e−008, C40=6.95582e−009
  C05=−6.99603e−012, C23=−8.35864e−012, C41=−9.10228e−012
  C06=8.97555e−015, C24=−1.05530e−013, C42=−3.16960e−014

C60=2.27547e−014

C07=−1.80495e−016, C25=2.86454e−016, C43=−4.23080e−016

C61=−9.96799e−017

C08=−2.29867e−018, C26=1.00632e−017, C44=1.15352e−017

C62=6.55540e−018

C80=1.58467e−018 rotatable members:

surface 17 (G1)

$\theta y, i$: ±3.6666° rotation center: (Xi,Yi,Zi)=(0.00 0.00 226.56) (EXP in FIG. 3)

surface 18 (G2)

$\theta x, i$: ±0.850045° rotation center: (Xi,Yi,Zi)=(114.30 142.99 226.56)

The following is an explanation of the optical action of the present embodiment. The light generated by the light source (illumination system L) illuminates the light valve LV, the image of an original image formed by the light valve LV is magnified by the projection optical system P including the reflective second optical system R, and is projected onto the screen E.

Figure 55:
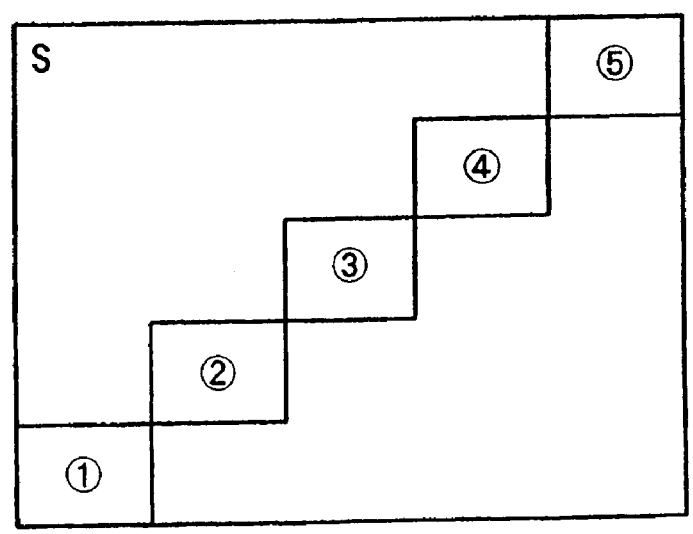
FIG. 55 is a diagram showing evaluation positions for evaluation of the image-forming performance in the present embodiments.

The projection optical system P of the present embodiment is characterized in that it can move or tilt the image surface on the screen E. FIG. 55 shows the evaluation positions on the various image surfaces for evaluating the lateral aberration at the image surface positions S1 to S4 shown in FIG. 4.

Figure 5:
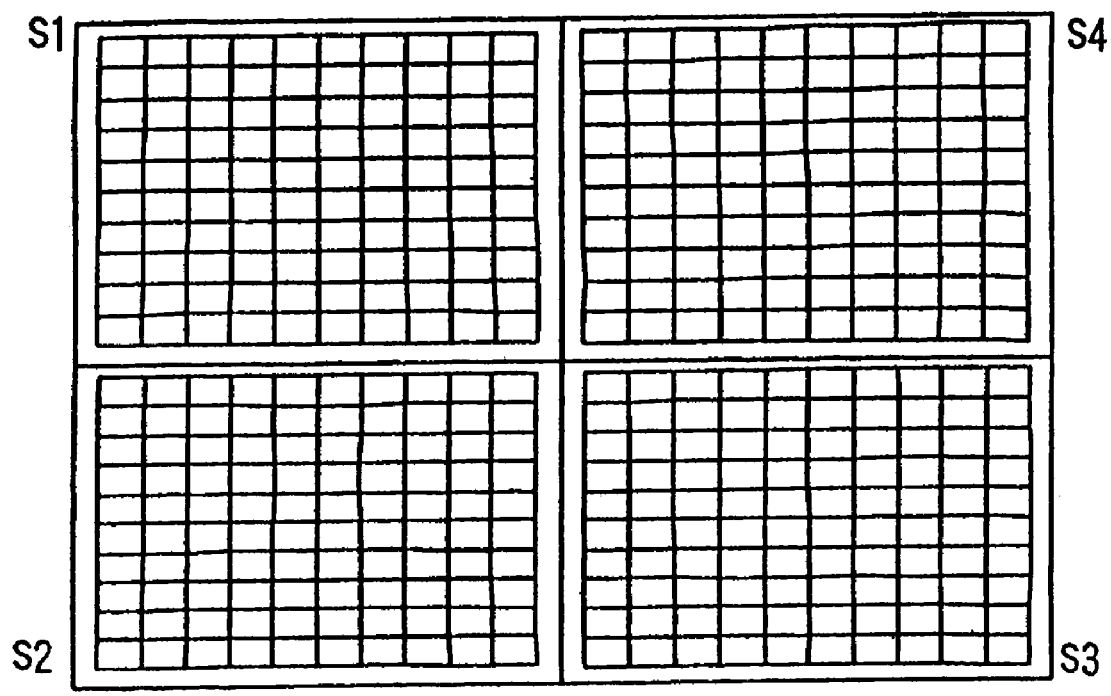
FIG. 5 is a diagram showing the distortion of the projection optical system according to Embodiment 1.
Figure 6:
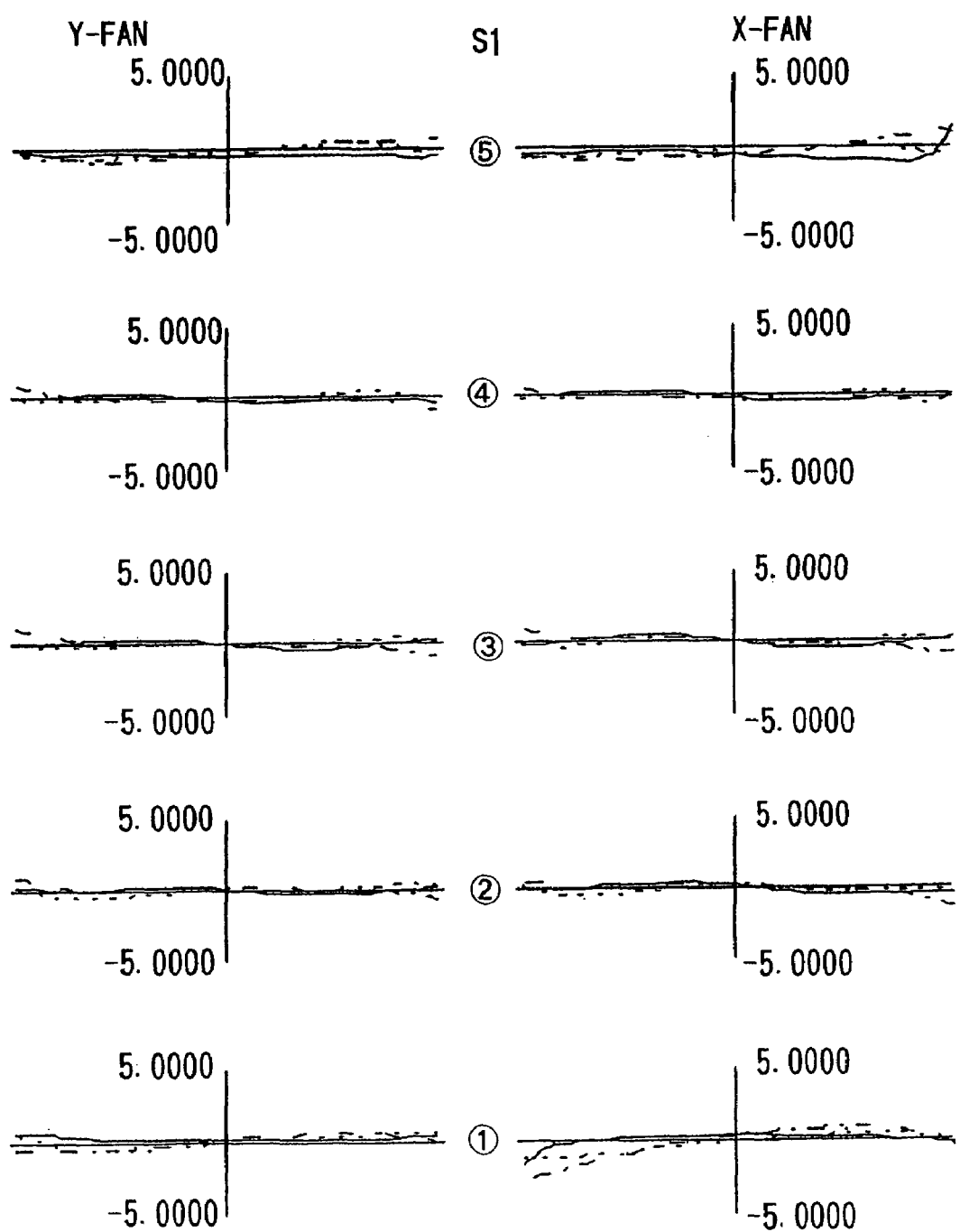
FIG. 6 is a diagram showing the lateral aberration of the projection optical system of Embodiment 1.
Figure 7:
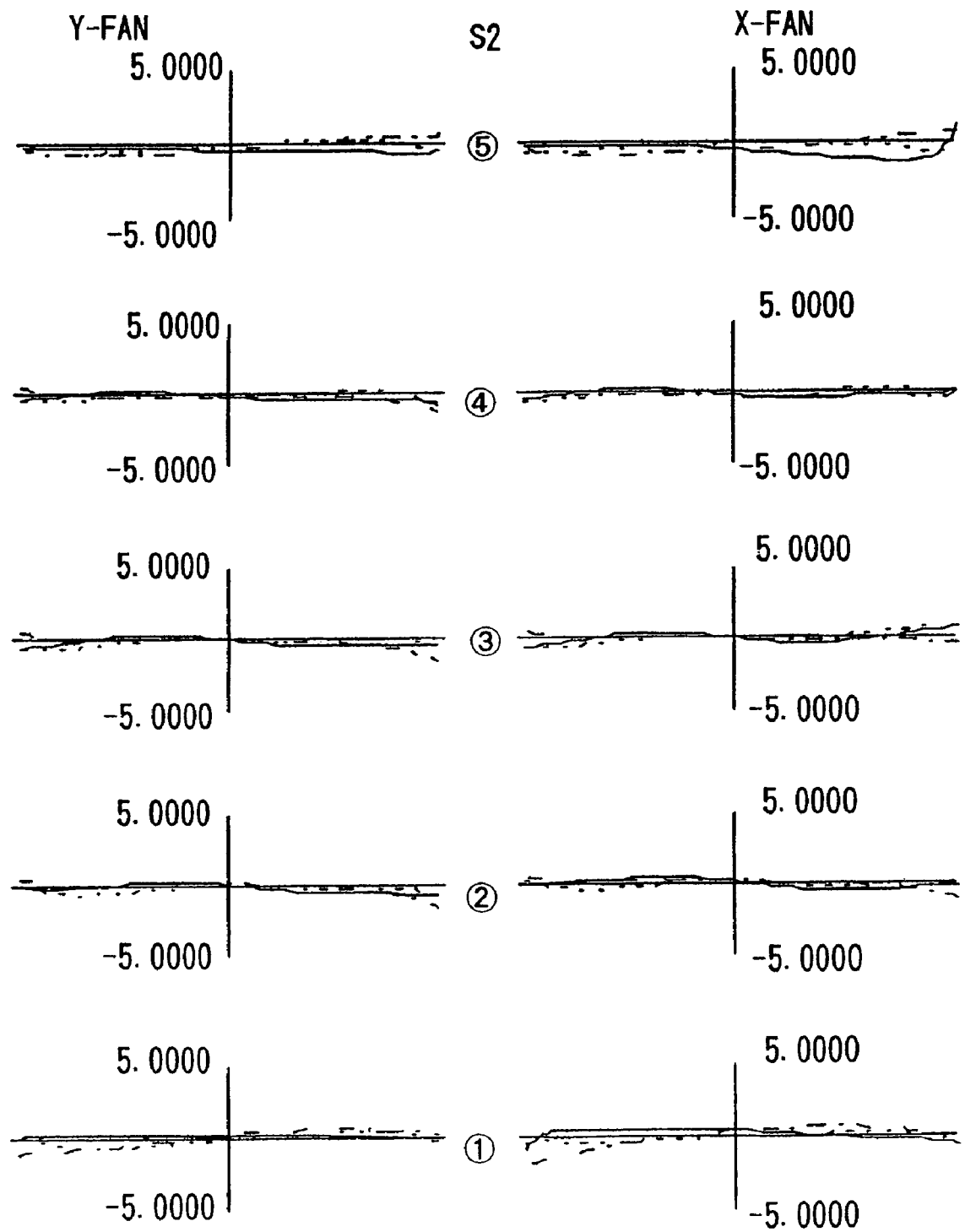
FIG. 7 is a diagram showing the lateral aberration of the projection optical system of Embodiment 1.
Figure 8:
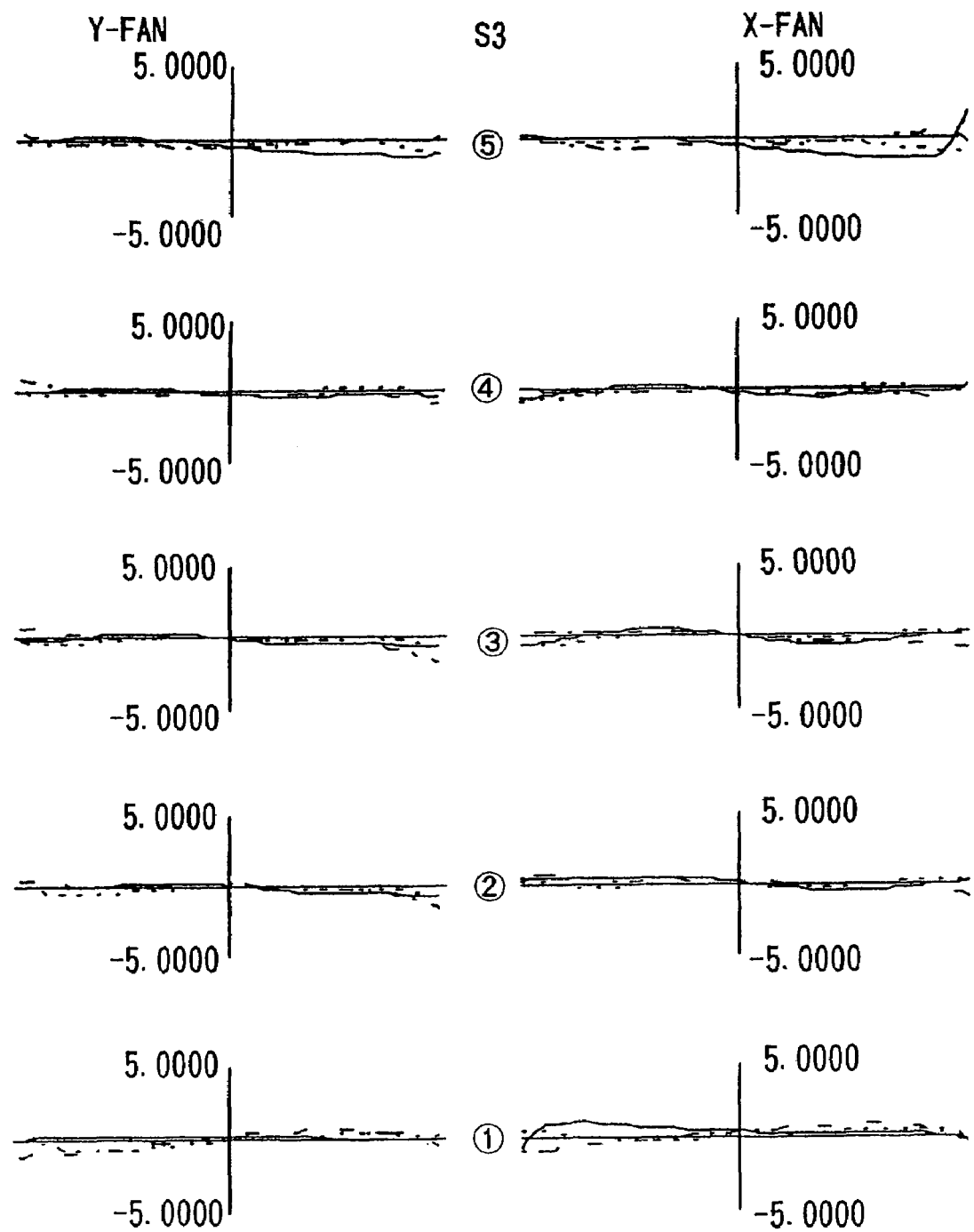
FIG. 8 is a diagram showing the lateral aberration of the projection optical system of Embodiment 1.
Figure 9:
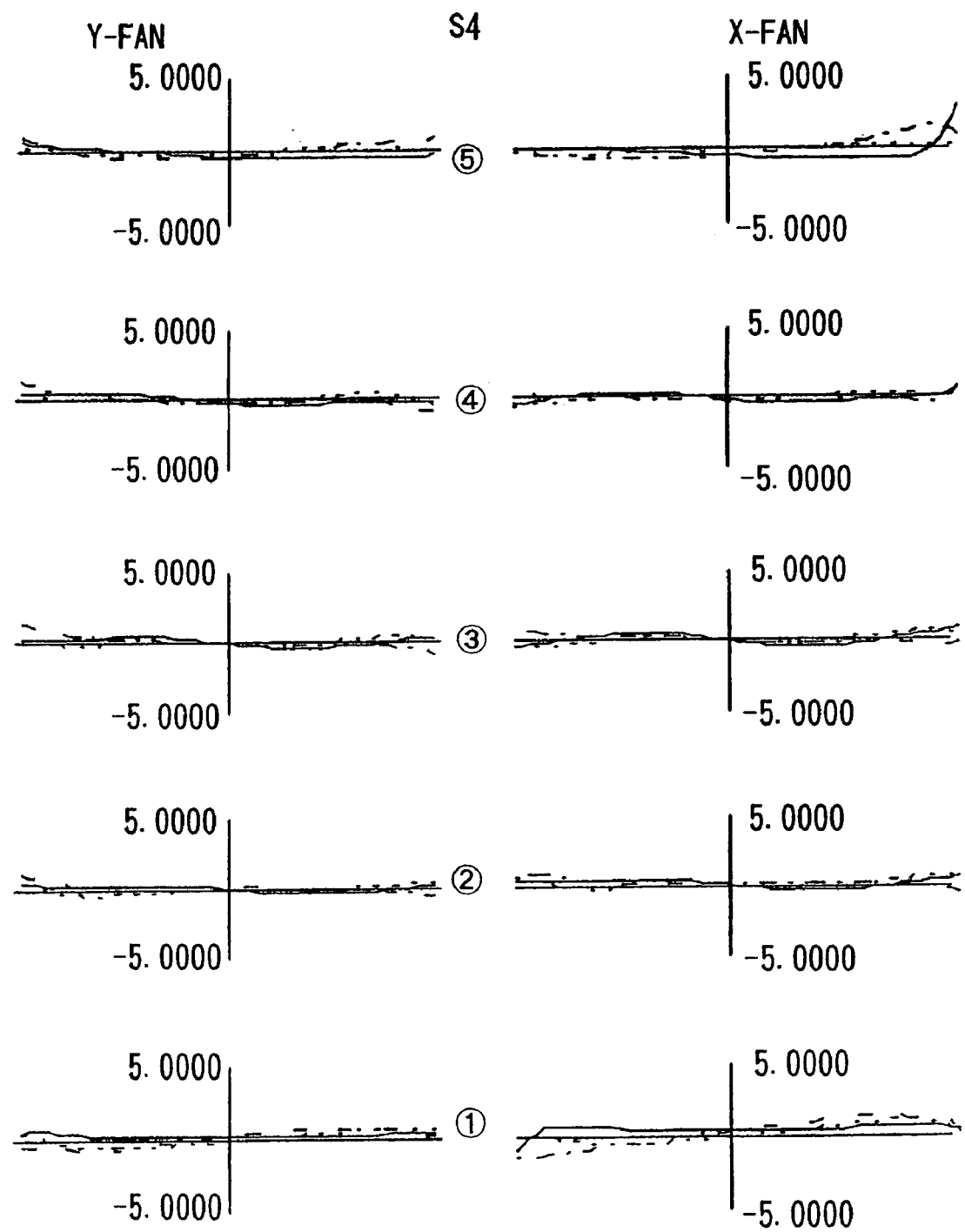
FIG. 9 is a diagram showing the lateral aberration of the projection optical system of Embodiment 1.

FIG. 5 shows the state of the distortion for the image surface positions S1 to S4 with the projection optical system P of the present embodiment, FIGS. 6 to 9 show lateral aberration charts for the evaluation positions (1) through (5) (marked by the circled numbers in the figures; same in the following) of the image surface positions S1 to S4 (see FIG. 55). As can be seen from FIG. 5, there is no large distortion in the present embodiment, and also the asymmetric distortion is small.

As for the definition of the axes in the lateral aberration charts in FIGS. 6 to 9, the horizontal axis marks the x axis or the y axis on the pupil plane, and the vertical axis marks the aberration amount on the screen E. From these figures, it can be seen that excellent image formation is attained at each of the image surface positions S1 to S4.

Figure 10:
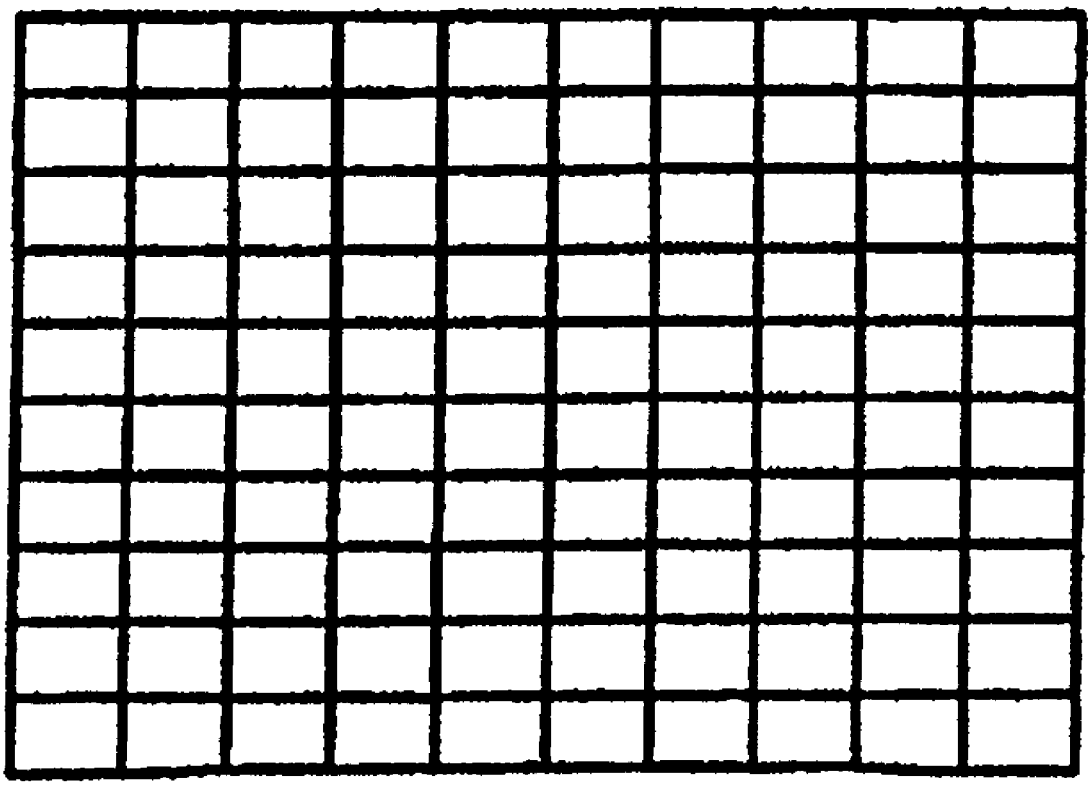
FIG. 10 is a diagram showing the distortion of the coaxial and rotationally symmetric system of Embodiment 1.
Figure 11:
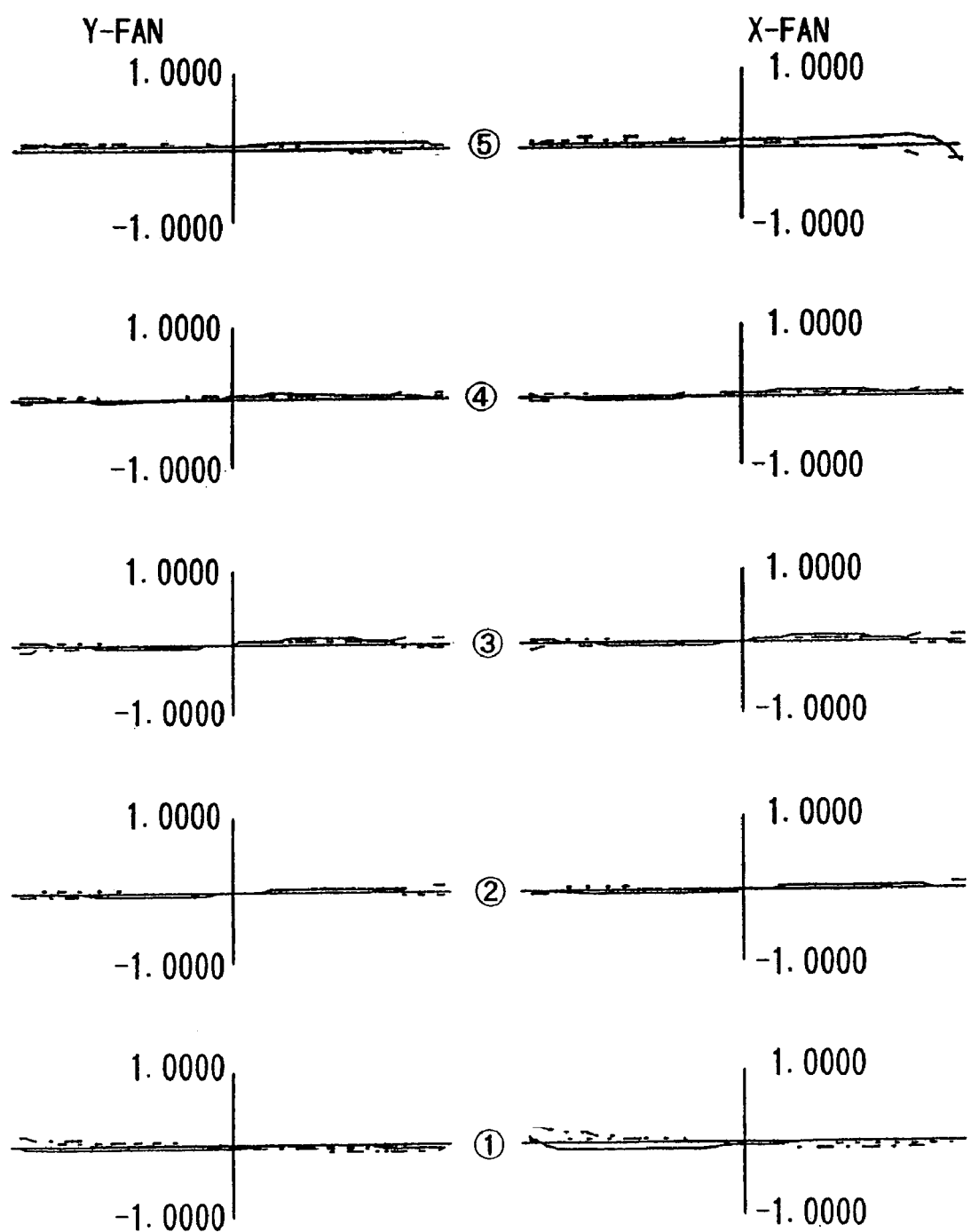
FIG. 11 is a diagram showing the lateral aberration of the coaxial and rotationally symmetric system of Embodiment 1.

In the present embodiment, as mentioned above, the first optical system C on the panel side has the capability to form an image on a spherical surface. FIG. 10 shows the state of the distortion of the first optical system C. FIG. 11 shows lateral aberration charts at the evaluation positions (1) through (5). As can be seen from FIG. 10, there is no large distortion. And as can be seen from FIG. 11, the image formation is excellent. It should be noted that the focal length of the first optical system C on the panel side is 82.7432 mm.

Embodiment 2

Figure 12:
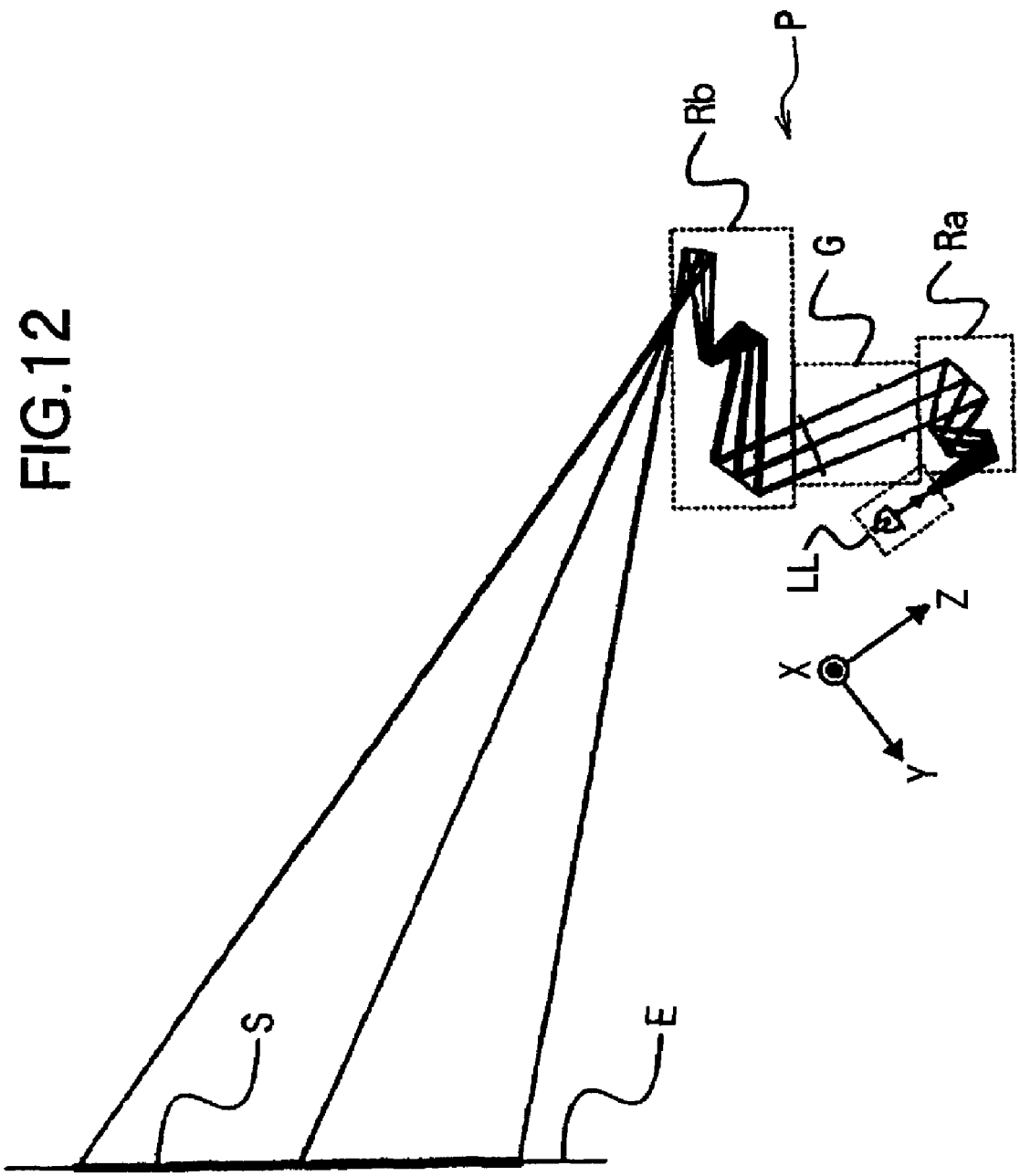
FIG. 12 is a diagram of an image projection apparatus using a projection optical system according to Embodiment 2 of the present invention.

FIG. 12 is a diagram in which the reference axis bent by the rotatable mirror G of the projection optical system P according to Embodiment 2 of the present invention has been stretched out. While details have been omitted in FIG. 12, LL denotes an image display panel system comprising three light valves (image display panels) using a liquid crystal, a dichroic optical element performing color combination of RGB color light components from the light valves, and an illumination system illuminating light onto the light valves. The illumination system is made of a lamp, a condenser lens, and wavelength-selective filters, which are not shown. Ra denotes a first reflective optical system placed closer to the light valves than the aperture stop SS, and Rb is a second optical system placed closer to the screen (effective projection region E) than the aperture stop SS, as shown in an enlarged view in FIG. 13.

The projection optical system uses an off-axial system, in which the off-axial reflective system Ra and Rb and a rotatable mirror G guide light which has been optically modulated by the light valve LV to the screen (effective projection region) E shown in FIG. 12, and form an image S on the screen.

The size of the screen E is 1300×3020 mm, the size of the image surface S is 60 inches (914.4×1219.2 mm) with an aspect ratio of 3:4, the corrective projection angle range as expressed by the angle formed by the normal on the screen E and the reference axis is $\theta x$: −30.96° to 30.96°, $\theta y$: 16.96° to 29.33°.

Figure 13:
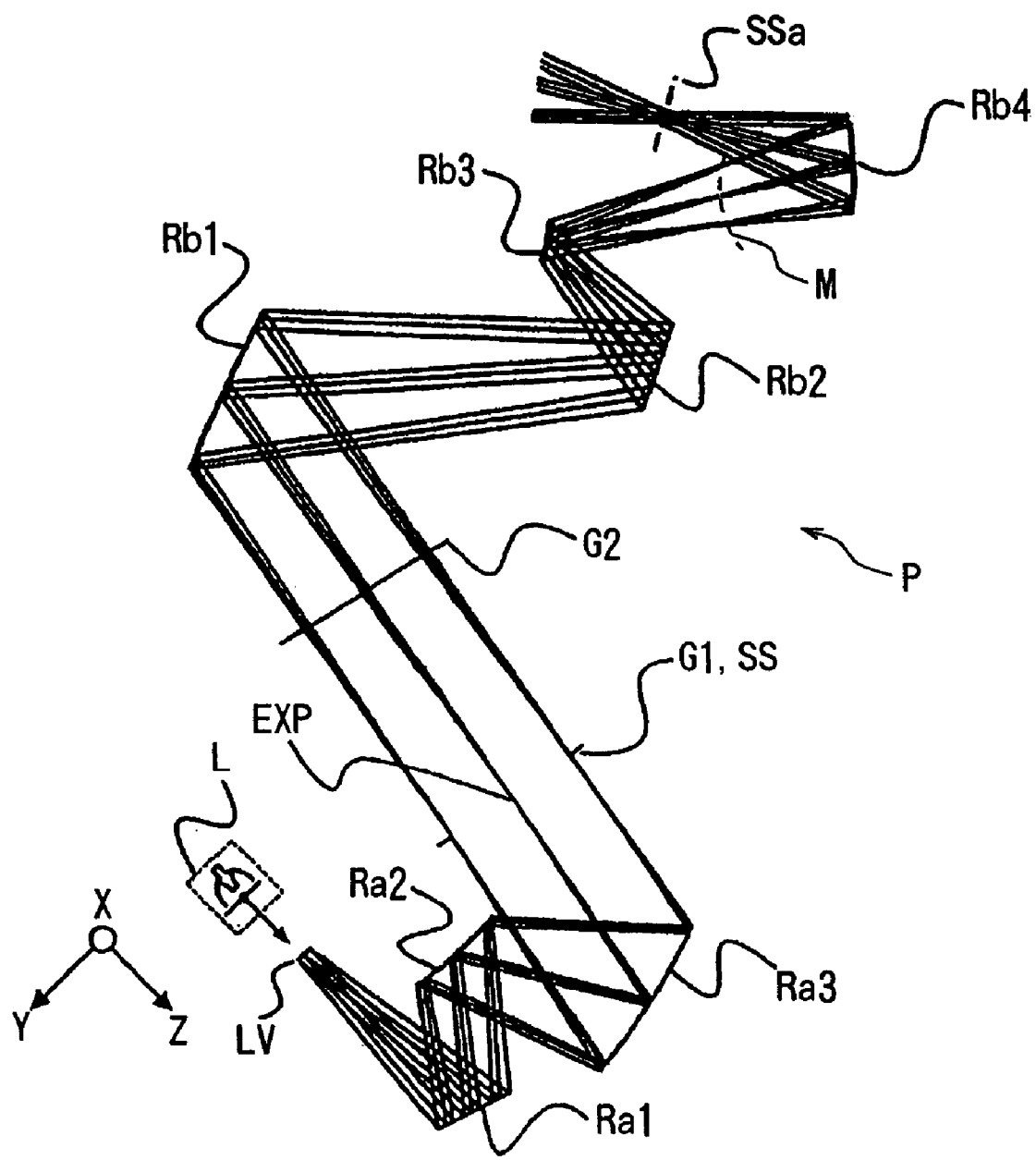
FIG. 13 is diagram showing the image display panel system, the reflective optical system, the rotatable mirrors, and the reflective optical system of the projection optical system according to Embodiment 2.

In FIG. 13, LV denotes the light valve (image display panel) using a liquid crystal, L denotes the illumination system illuminating light onto the light valve LV. The size of the light valve LV is 10.668×14.224 mm. The illumination system is made of a lamp, a condenser lens, and wavelength-selective filters, not shown in the figure.

Ra1 to Ra3 denote off-axial reflective surfaces constituting the first reflective optical system Ra. G1 denotes a rotatable mirror placed at the position of an aperture stop SS, and G2 denotes a rotatable mirror placed near the aperture stop SS at such a distance to the rotatable mirror G1 that there is no interference between the two. Rb1 to Rb4 denote off-axial reflective surfaces constituting the second reflective optical system Rb. A dichroic optical element (not shown in the figure) is inserted between the light valve LV and a first reflective surface R1.

Figure 14:
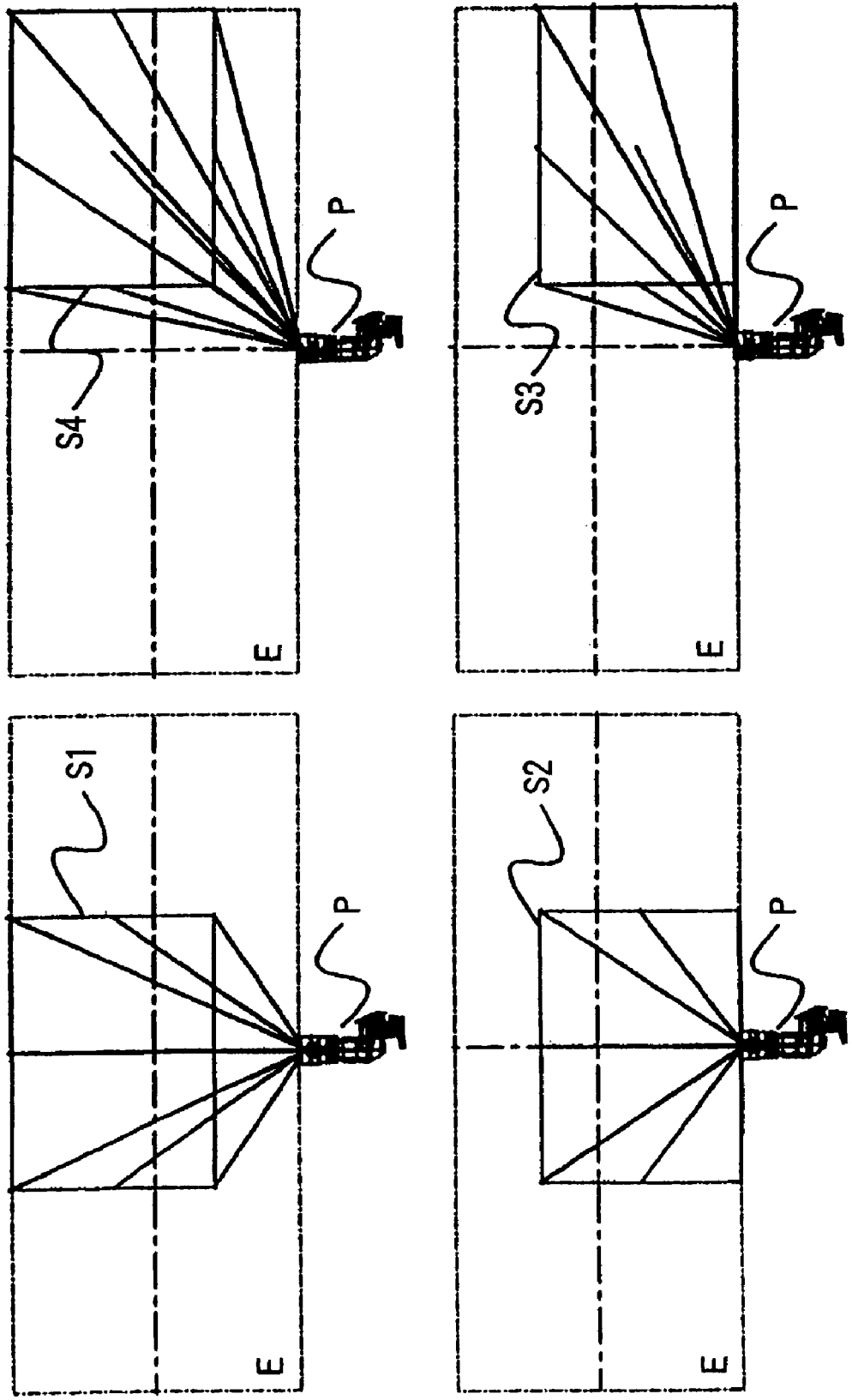
FIG. 14 illustrates how the projection angle can be changed in the image projection apparatus using the projection optical system according to Embodiment 2.

FIG. 14 illustrates the possibility of moving or tilting the position of the image surface S on the screen E, which is a characteristic feature of the projection optical system P of the present embodiment. S1 to S4 denote representative positions of the image surface S which can be moved continually over the screen E by rotating the mirrors G1 and G2 substantially around the center of the exit pupil EXP of the first reflective optical system Ra.

The following lists the structural data of the reflective optical system P used in the present embodiment:

numerical aperture on the object side: 0.13 variable projection angle range:

$\theta x$: −30.96° to 30.96°, $\theta y$: 16.96° to 29.33°

| surf. | Xi | Yi | Zi | Di | θx, i | θy, i | |
|---|---|---|---|---|---|---|---|
| 1 | 0.00 | 0.00 | 0.00 | 102.32 | 21.00 | 0.00 | refl. surf. |
| 2 | 0.00 | −36.67 | −95.53 | 125.00 | −34.62 | 0.00 | refl. surf. |
| 3 | 0.00 | −129.91 | −12.27 | 150.00 | 19.80 | 0.00 | refl. surf. |
| 4 | 0.00 | −107.40 | −160.57 | 152.85 | 0.00 | 45.00 | aperture stop, rotatable mirror |
| 5 | −150.00 | −110.21 | −160.99 | 151.28 | 45.03 | 0.00 | galv. mirror |
| 6 | −150.00 | −258.51 | −183.51 | 273.24 | −30.20 | 0.00 | refl. surf. |
| 7 | −385.71 | −123.96 | −163.08 | 100.93 | 25.40 | 0.00 | refl. surf. |
| 8 | −368.25 | −221.90 | −177.95 | 200.21 | −30.29 | 0.00 | refl. surf. |
| 9 | −556.18 | −154.27 | −167.68 | 1819.23 | 13.56 | 0.00 | refl. surf. |
| 10 | 684.92 | −1470.00 | −367.37 | | 23.42 | 0.00 | image surf. | aspherical surface coefficients:

surface 1 (Ra1)
  $C02=-1.03240e-003$, $C20=-1.45854e-003$
  $C03=-2.14774e-006$, $C21=-3.05918e-006$
  $C04=-1.64324e-008$, $C22=1.44519e-008$, $C40=2.11600e-008$
  $C05=-1.71110e-010$, $C23=2.31416e-010$, $C41=2.29026e-010$
  $C06=1.87531e-012$, $C24=-9.91888e-013$, $C42=4.29442e-012$
  $C60=6.64142e-013$ surface 2 (Ra2)
  $C02=-1.42318e-003$, $C20=-2.33908e-003$
  $C03=-4.48265e-006$, $C21=-8.57822e-006$
  $C04=-3.45545e-008$, $C22=1.42283e-008$, $C40=7.84260e-008$
  $C05=-3.33993e-010$, $C23=2.40677e-010$, $C41=7.65170e-010$
  $C06=-4.96946e-013$, $C24=7.54609e-013$, $C42=1.01548e-011$
  $C60=2.30734e-013$ surface 3 (Ra3)
  $C02=-1.06763e-003$, $C20=-1.23805e-003$
  $C03=-6.43467e-007$, $C21=-1.04293e-006$
  $C04=-3.48111e-009$, $C22=-2.68222e-010$, $C40=3.38307e-009$
  $C05=-9.26305e-012$, $C23=-5.99924e-012$, $C41=-2.60159e-013$
  $C06=3.52181e-014$, $C24=-3.21958e-015$, $C42=1.47839e-013$
  $C60=7.28860e-014$ surface 6 (Rb1)
  $C02=4.06880e-004$, $C20=4.85339e-004$
  $C03=-3.78483e-007$, $C21=-8.56533e-007$
  $C04=-1.68390e-009$, $C22=-3.69914e-010$, $C40=5.74012e-009$
  $C05=-8.74076e-013$, $C23=4.72985e-012$, $C41=1.14003e-011$
  $C06=9.40266e-015$, $C24=5.14686e-014$, $C42=1.65459e-013$
  $C60=-8.34469e-015$ surface 7 (Rb2)
  $C02=-3.90570e-004$, $C20=-2.55225e-004$
  $C03=-3.13570e-006$, $C21=-4.38507e-006$
  $C04=5.15483e-009$, $C22=4.27334e-008$, $C40=9.15955e-008$
  $C05=1.44166e-010$, $C23=1.66786e-010$, $C41=-2.39643e-010$
  $C06=-8.58155e-013$, $C24=-7.38103e-013$, $C42=5.55934e-012$
  $C60=6.46727e-012$ surface 8 (Rb3)
  $C02=-4.09554e-003$, $C20=-2.41353e-003$
  $C03=3.63446e-006$, $C21=7.97128e-006$
  $C04=1.13785e-007$, $C22=5.31203e-007$, $C40=5.90295e-007$
  $C05=2.32366e-009$, $C23=3.08228e-009$, $C41=-1.16106e-009$
  $C06=-5.69240e-012$, $C24=-8.79701e-012$, $C42=-2.27620e-011$
  $C60=-5.71763e-011$ surface 9 (Rb4)
  $C02=-3.20759e-003$, $C20=-4.28751e-003$
  $C03=4.15538e-006$, $C21=7.37215e-006$
  $C04=-1.59913e-008$, $C22=-2.47376e-008$, $C40=-5.80558e-009$
  $C05=-2.37002e-011$, $C23=-5.75017e-011$, $C41=-2.40564e-011$
  $C06=-3.64671e-013$, $C24=-1.11816e-012$, $C42=-1.89215e-012$
  $C60=-1.14179e-012$ rotatable members:

surface 4 (G1)
  $θy,i: ±0.90666$
  rotation center: $(Xi,Yi,Zi)=(0.00\ -107.40\ -160.57)$
  (EXP in FIG. 13)

surface 5 (G2)
  $θy,i: ±0.18492$
  rotation center: $(Xi,Yi,Zi)=(-150.00\ -110.21\ -160.99)$ The following is an explanation of the optical action of the present embodiment. The light generated by the light source (illumination system L) illuminates the light valve LV, the image of an original image at the light valve LV is magnified by the projection optical system P including the reflective second optical system R (Ra and Rb), and is projected onto the screen E.

The projection optical system P of the present embodiment is characterized in that it can move or tilt the image surface on the screen E. FIG. 55 shows the evaluation positions on the various image surfaces for evaluating the lateral aberration at the image surface positions S1 to S4 shown in FIG. 14.

Figure 15:
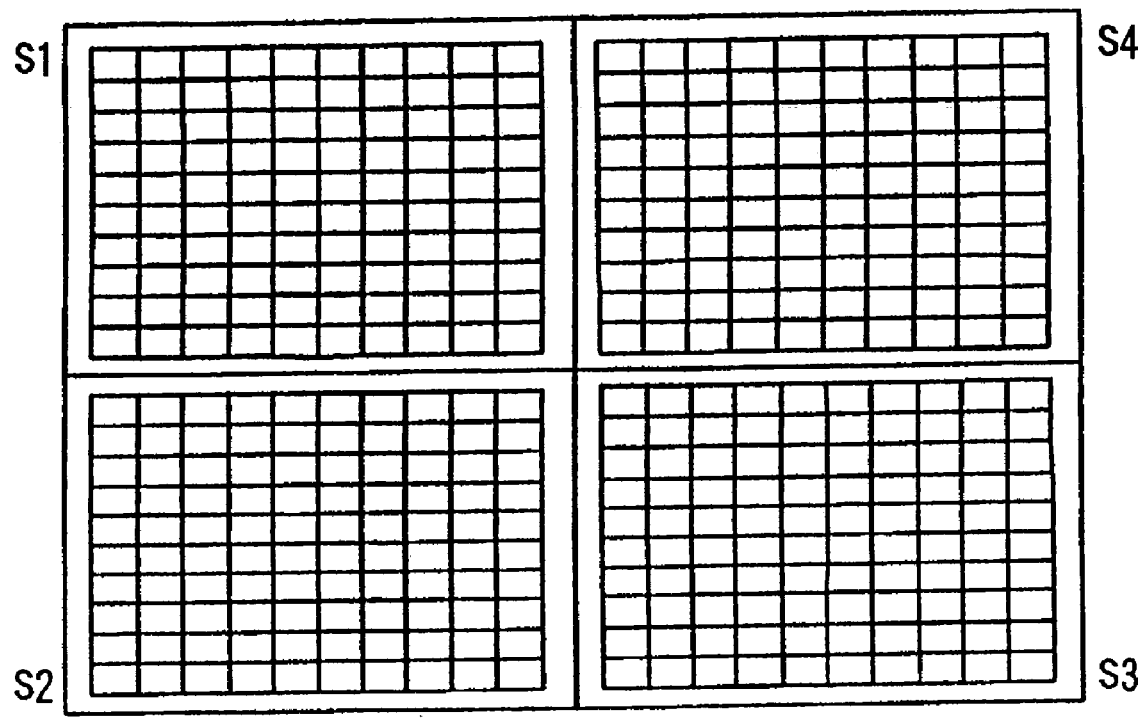
FIG. 15 is a diagram showing the distortion of the projection optical system according to Embodiment 2.
Figure 16:
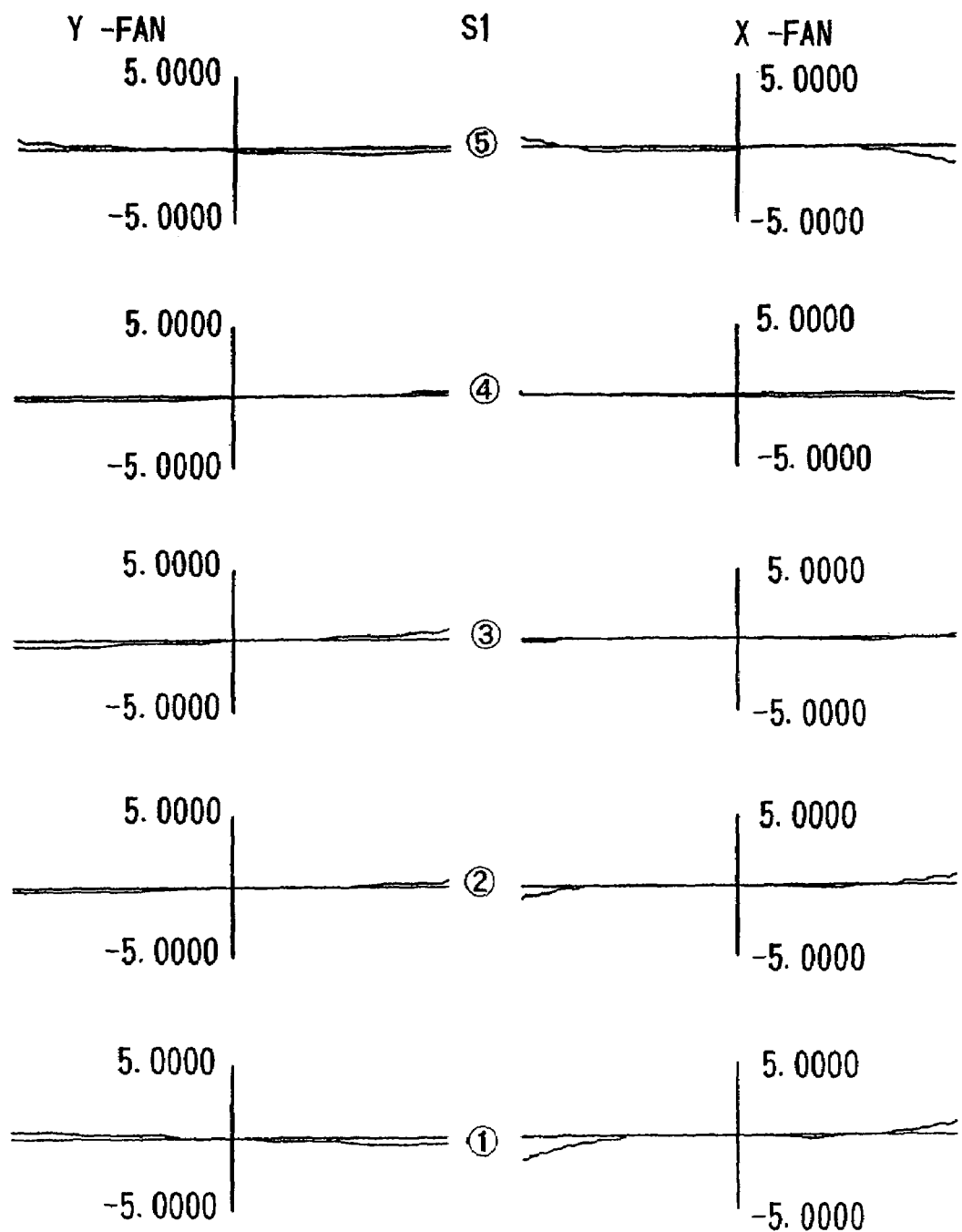
FIG. 16 is a diagram showing the lateral aberration of the projection optical system of Embodiment 2.
Figure 17:
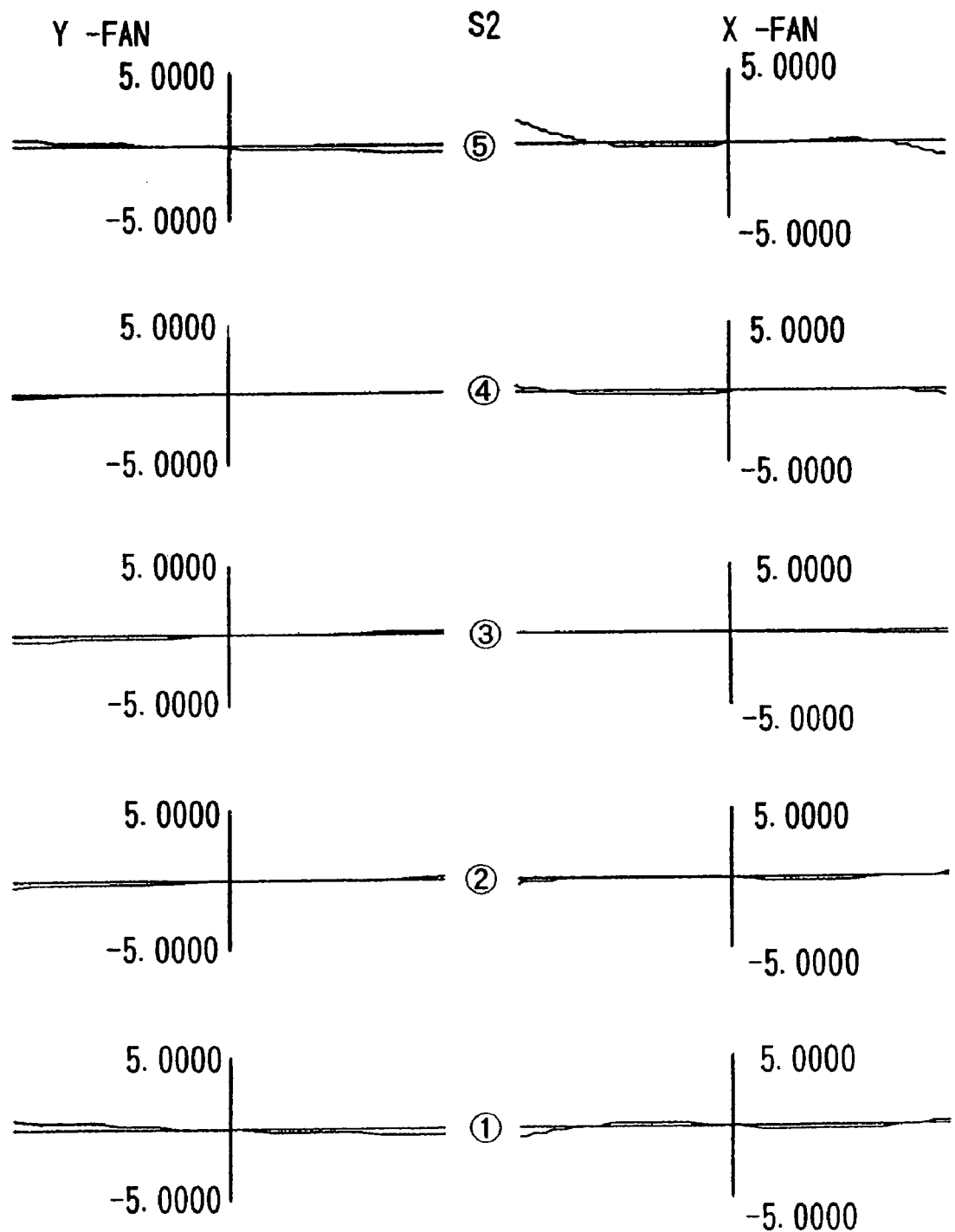
FIG. 17 is a diagram showing the lateral aberration of the projection optical system of Embodiment 2.
Figure 18:
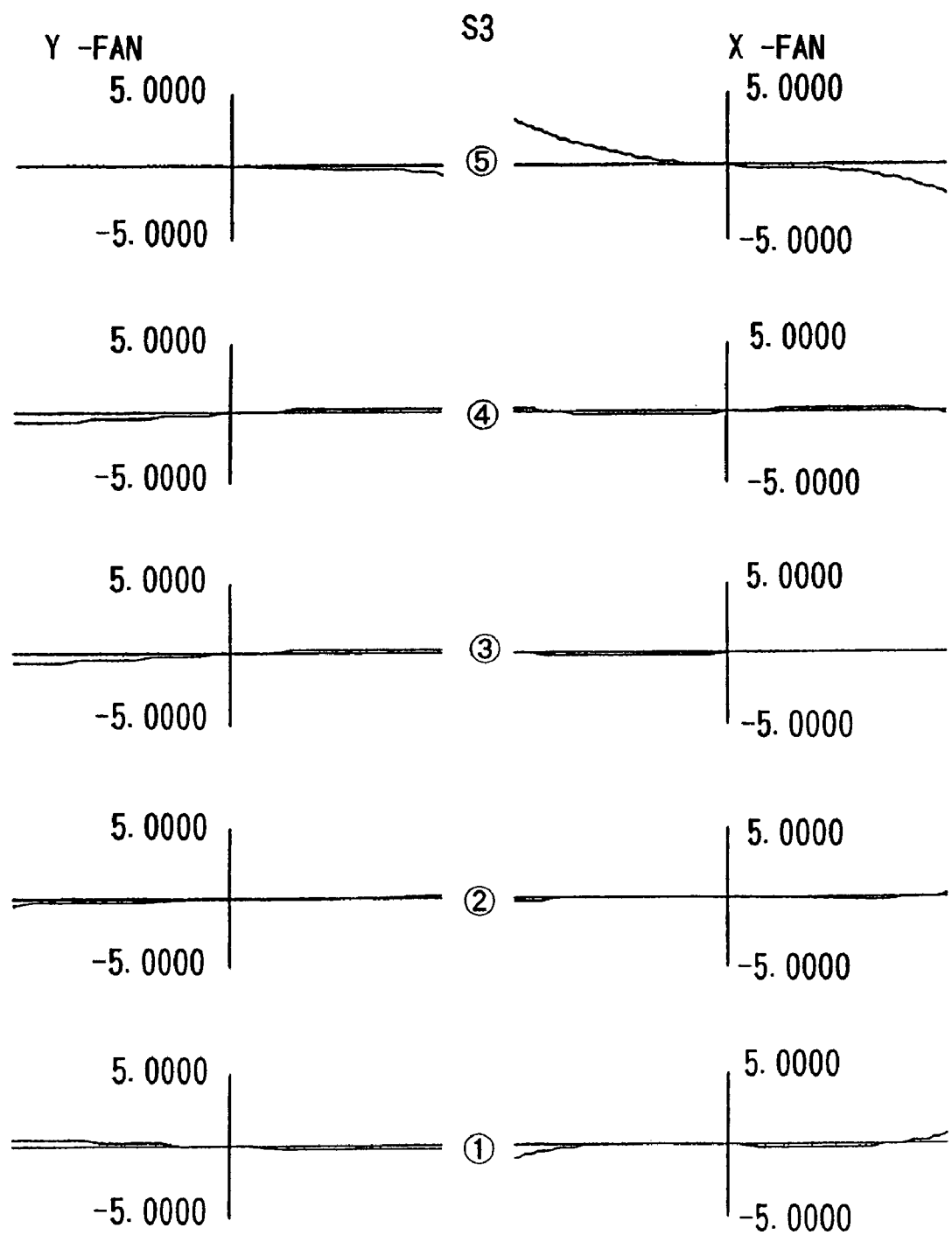
FIG. 18 is a diagram showing the lateral aberration of the projection optical system of Embodiment 2.
Figure 19:
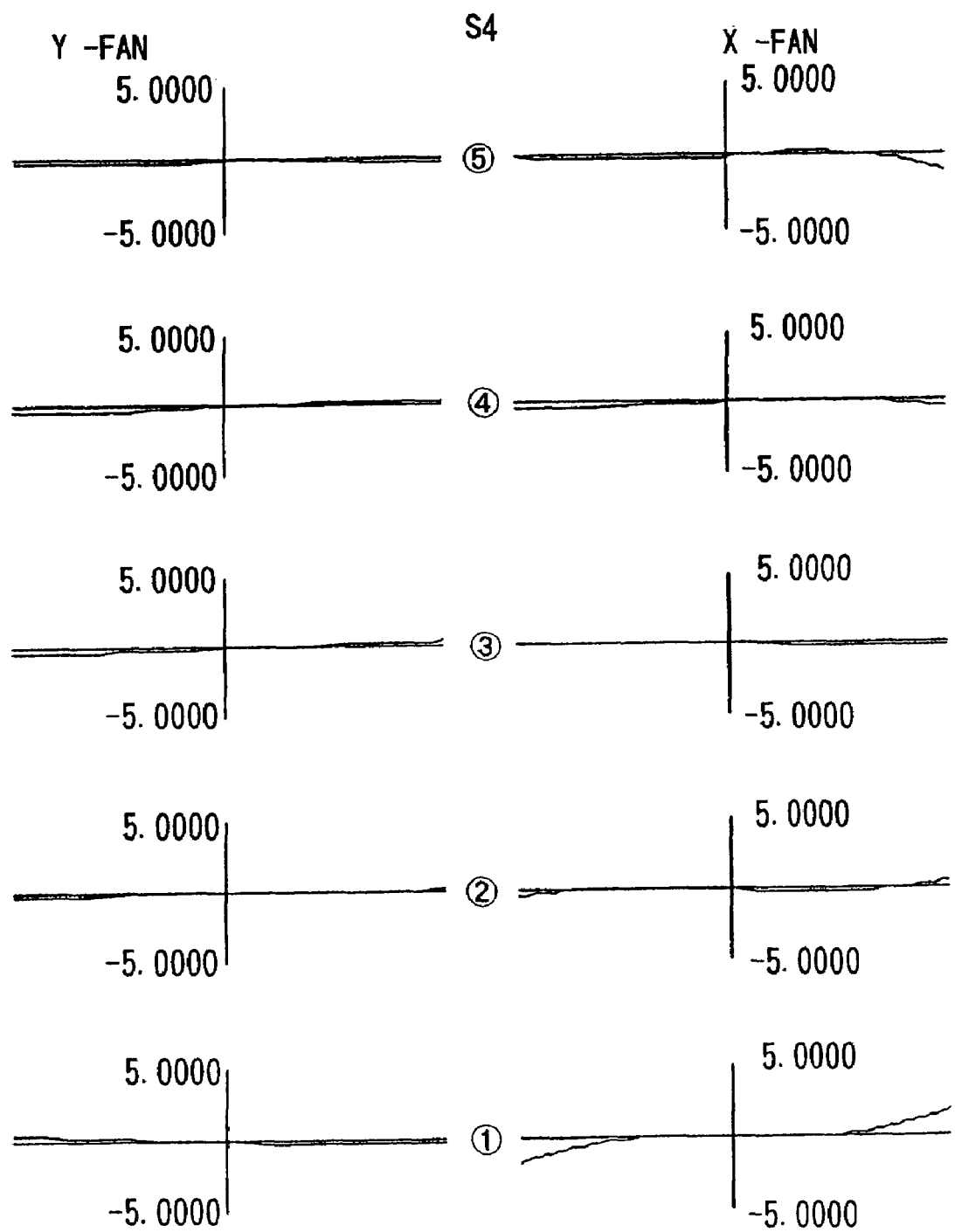
FIG. 19 is a diagram showing the lateral aberration of the projection optical system of Embodiment 2.

FIG. 15 shows the state of the distortion for the image surface positions S1 to S4 with the projection optical system of the present embodiment, and FIGS. 16 to 19 show lateral aberration charts for the evaluation positions (1) through (5) of the image surface positions S1 to S4. As can be seen from FIG. 15, there is no large distortion in the present embodiment, and also the asymmetric distortion is small. As for the definition of the axes in the lateral aberration charts in FIGS. 16 to 19, the horizontal axis marks the x axis or the y axis on the pupil plane, and the vertical axis marks the aberration amount on the screen E. From these figures, it can be seen that excellent image formation is attained at each of the image surface positions S1 to S4.

Figure 20:
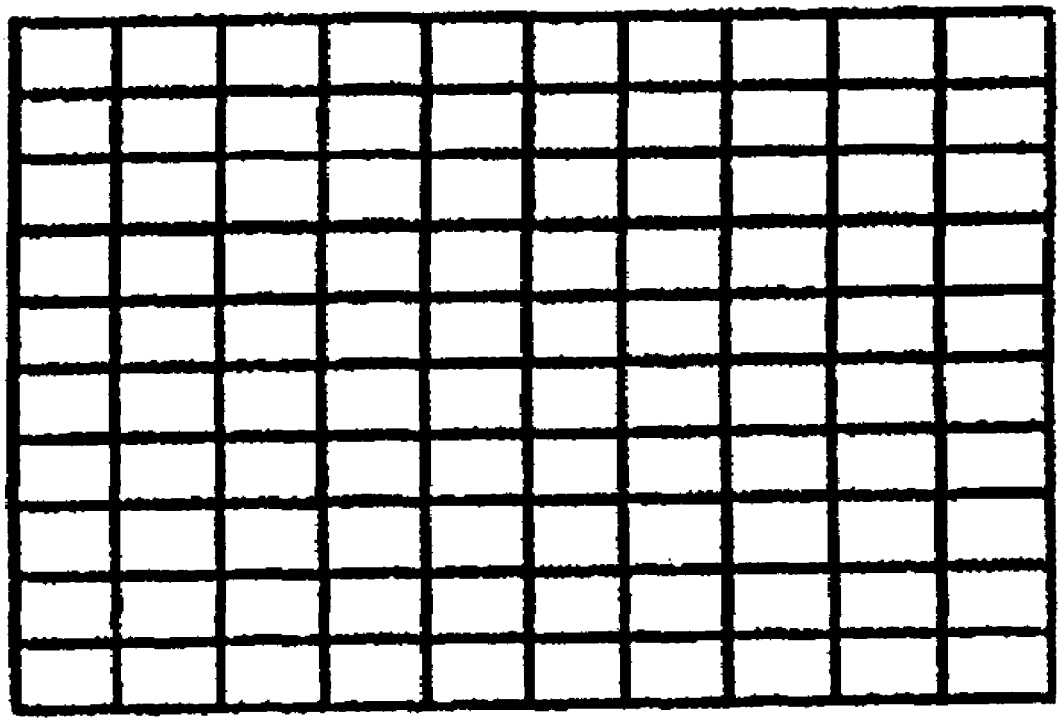
FIG. 20 is a diagram showing the distortion of the reflective optical system of Embodiment 2.
Figure 21:
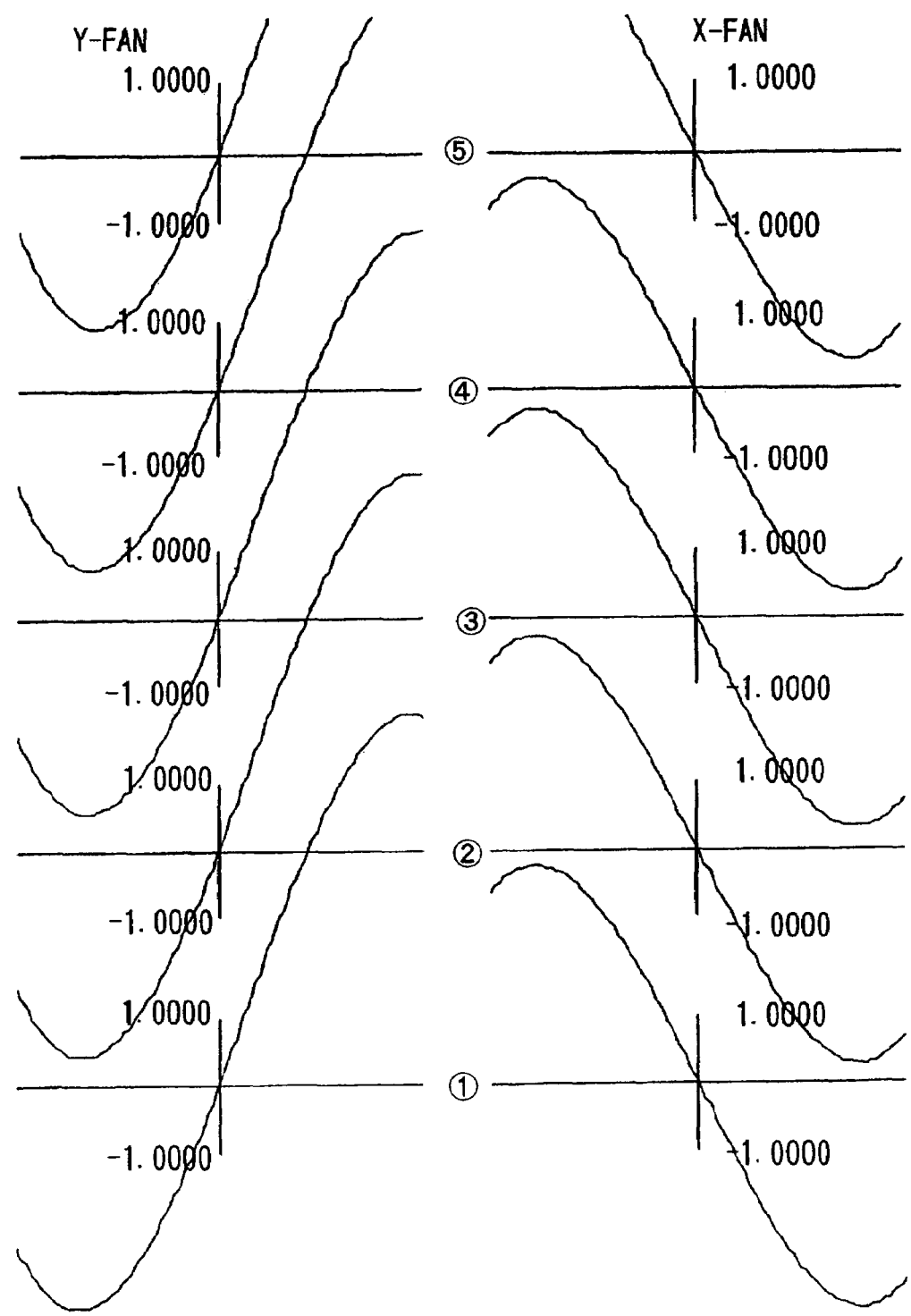
FIG. 21 is a diagram showing the lateral aberration of the reflective optical system of Embodiment 2.
Figure 22:
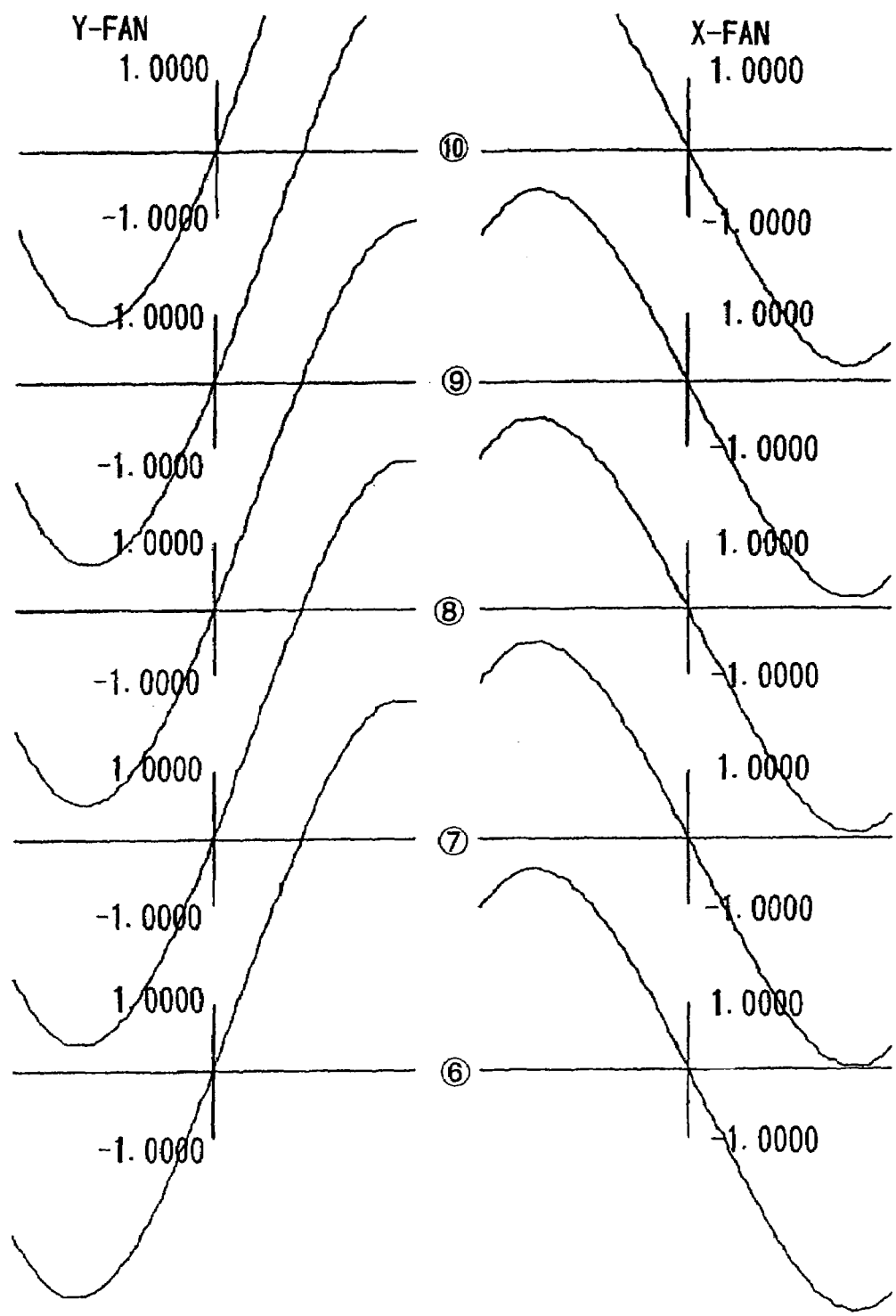
FIG. 22 is a diagram showing the lateral aberration of the reflective optical system of Embodiment 2.
Figure 56:
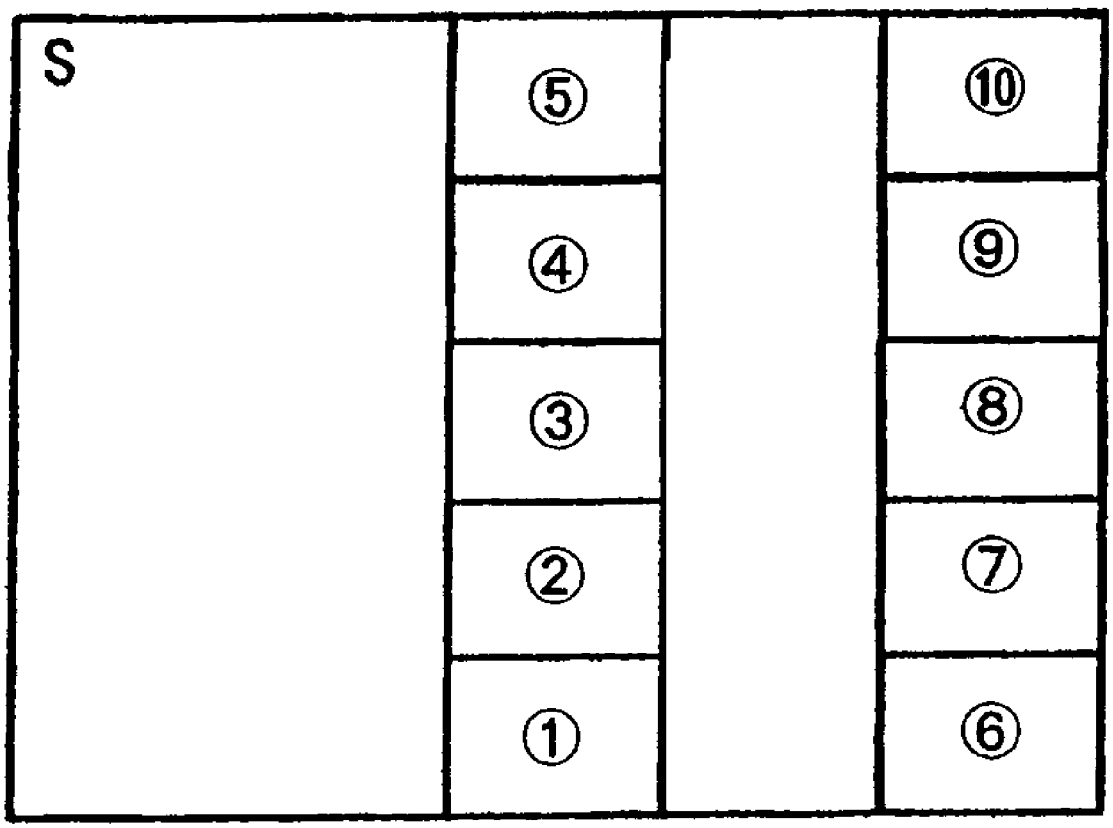
FIG. 56 is a diagram showing evaluation positions for evaluation of the image-forming performance in the present embodiments.

In this Embodiment 2, as described above, the first reflective optical system Ra on the panel side causes aberrations which are uniform for the entire field angle in respective azimuth directions, and which are corrected by the second reflective optical system Rb on the image surface side. FIG. 20 shows the state of the distortion of the optical system Ra. FIGS. 21 and 22 show lateral aberration charts at the evaluation positions (1) through (10) shown in FIG. 56. As can be seen from FIG. 20, there is no large distortion. And as can be seen from FIGS. 21 and 22, uniform aberrations are generated for each direction on the reference axis as well as off-axis, even though the aberrations in horizontal direction and vertical direction do not coincide with each other. Consequently, as noted above, a correction is possible with which excellent images can be attained on the screen E with the second reflective optical system Rb on the image side.

It should be noted that the focal length of the first reflective optical system Ra on the panel side is 362.307 mm.

Embodiment 3

Figure 23:
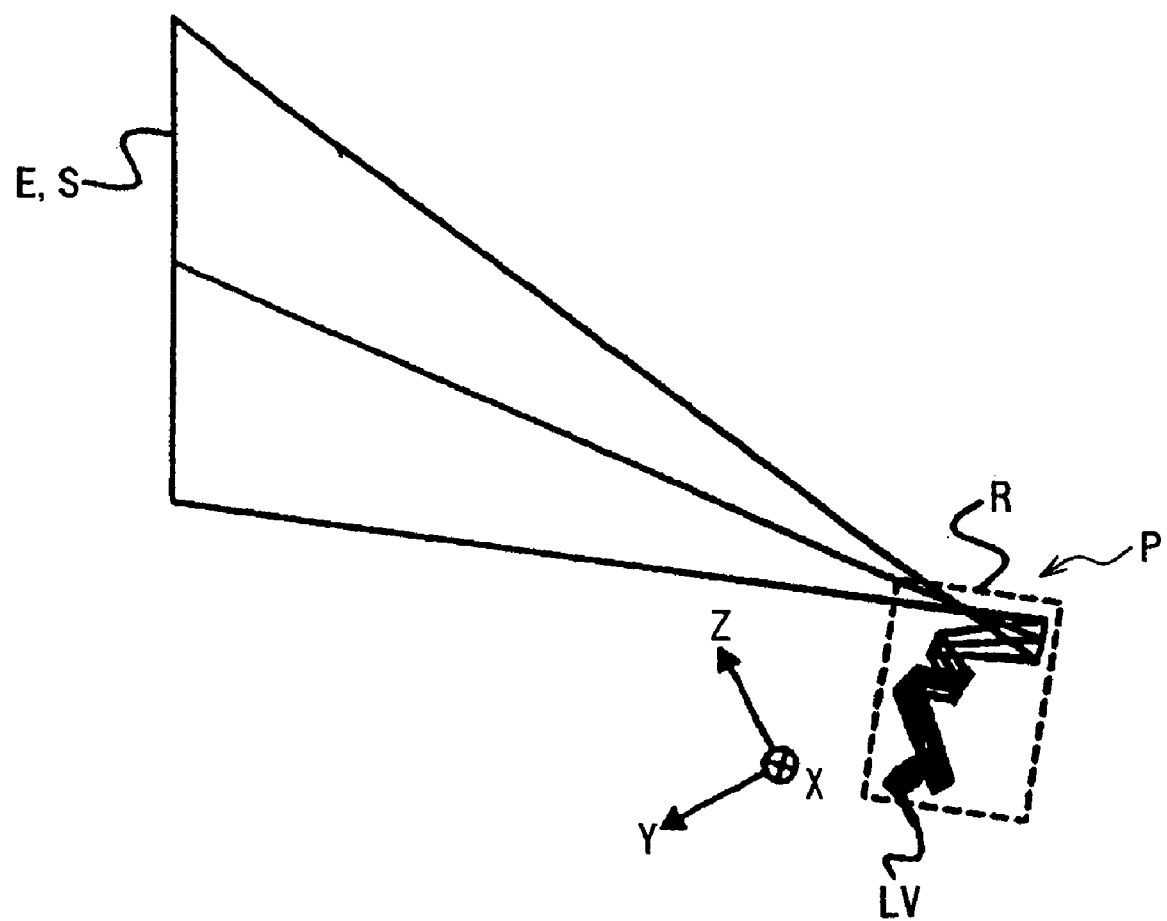
FIG. 23 is a diagram of an image projection apparatus using a projection optical system according to Embodiment 3 of the present invention.

FIG. 23 shows the structure of a projection optical system P according to Embodiment 3 of the present invention. The projection optical system P in FIG. 23 uses an off-axial system, in which the off-axial reflective surfaces guide light which has been optically modulated by the light valve LV to the screen (effective projection region) E, and form an image S on the screen E.

Figure 24:
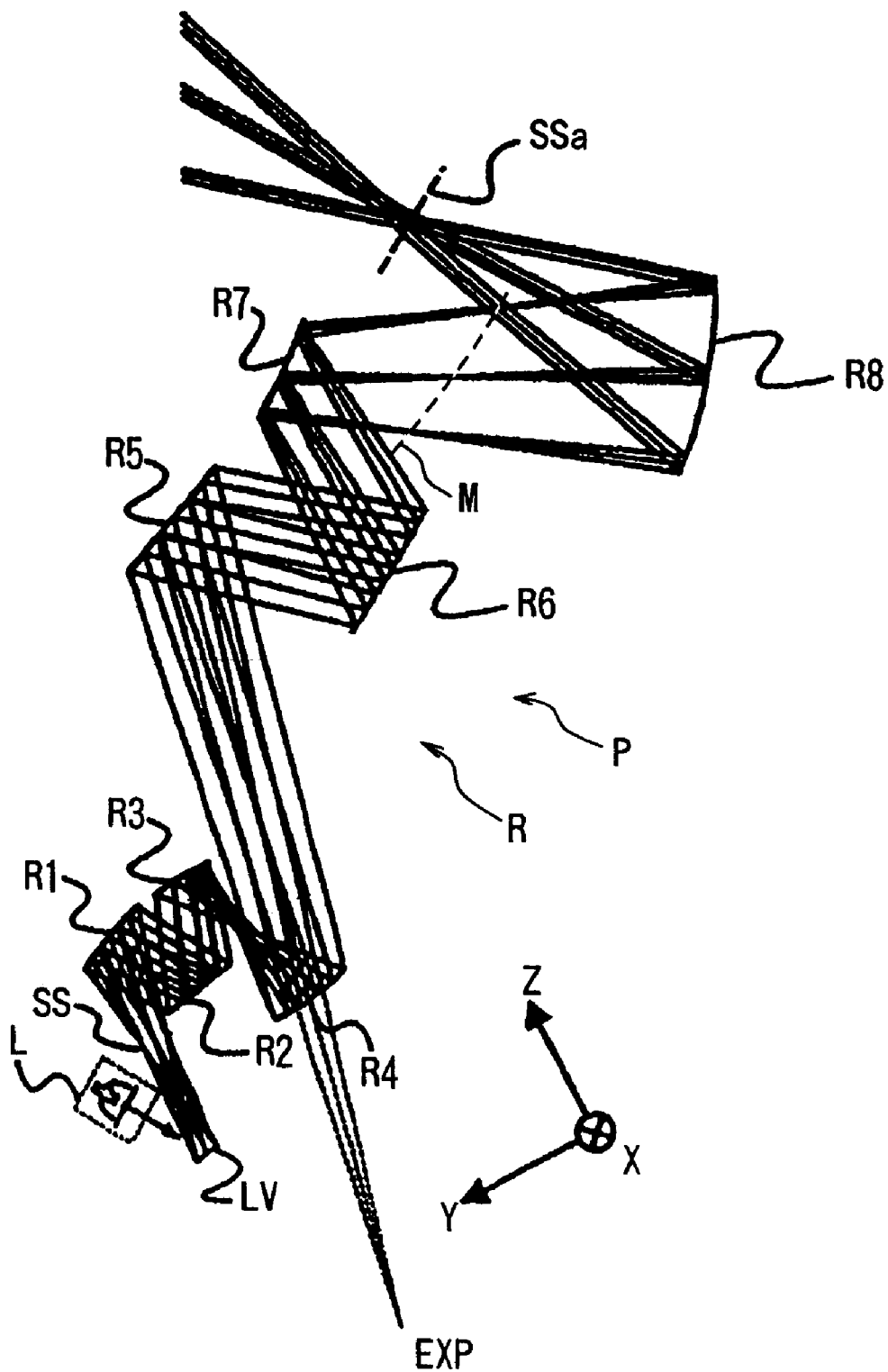
FIG. 24 is a diagram of the light valve and the reflective optical system of the projection optical system of Embodiment 3.

FIG. 24 is an enlarged view of the projection optical system P in FIG. 23. In FIG. 23, LV denotes a light valve (image display panel) using a dot-matrix liquid crystal or digital micro-mirror device or the like, L denotes an illumination system illuminating light onto the light valve LV. The size of the light valve LV is 12.192×16.256 mm. The illumination system is made of a lamp, a condenser lens, and wavelength-selective filters, not shown in the figures. R1 to R8 denote off-axial reflective surfaces constituting the reflective optical system R.

The size of the screen E is 914.4×3020 mm, the size of the image surface S is 60 inches (914.4×1219.2 mm) with an aspect ratio of 3:4, and the corrective projection angle range as expressed by the angle formed by the normal on the screen E and the reference axis is θx: −30.96° to 30.96°, θy: 23.43°.

Figure 25:
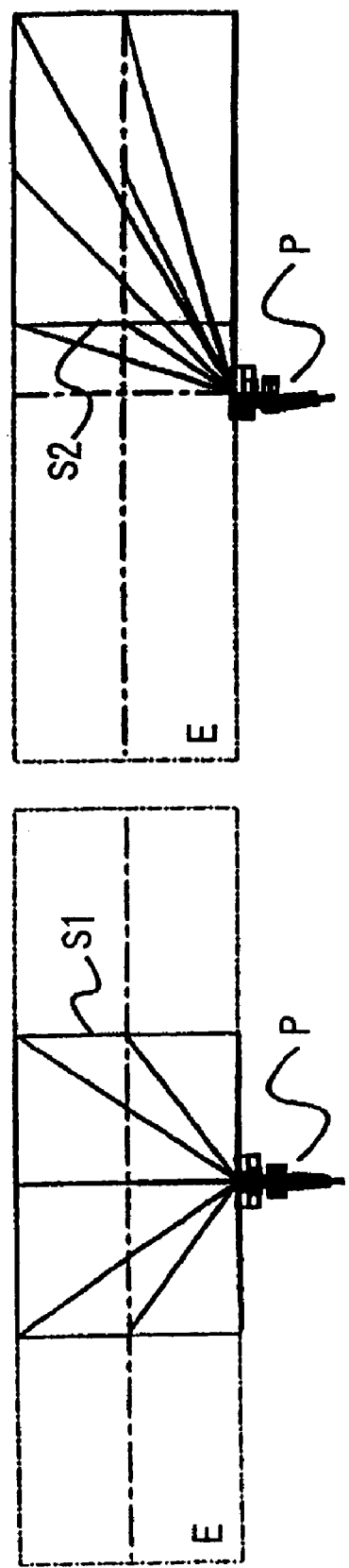
FIG. 25 illustrates how the projection angle can be changed in the image projection apparatus using the projection optical system according to Embodiment 3.

FIG. 25 illustrates the possibility of moving the position of the image surface S on the screen E (that is, parallel moving or tilting), which is a characteristic feature of the projection optical system P of the present embodiment. The image surface S can be continually moved by rotating the reflective surfaces R5 to R8 substantially around the center of the exit pupil EXP of the reflective surfaces R1 to R4. The following lists the structural data of the reflective optical system R used in the present embodiment:

entrance pupil diameter: 13 mm variable projection angle range:
  θx: −30.96° to 30.96°,
  θy: 23.43°

| surf. | Xi | Yi | Zi | Di | θx, i | |
|---|---|---|---|---|---|---|
| 1 | 0.00 | 0.00 | 0.00 | 50.00 | 0.00 | aperture stop |
| 2 | 0.00 | 0.00 | 50.00 | 50.00 | 20.00 | refl. surf. |
| 3 | 0.00 | −32.14 | 11.70 | 50.00 | −30.00 | refl. surf. |
| 4 | 0.00 | −49.24 | 58.68 | 78.95 | 20.00 | refl. surf. |
| 5 | 0.00 | −76.24 | −15.51 | 220.00 | −15.00 | refl. surf. |
| 6 | 0.00 | −114.45 | 201.15 | 109.00 | 31.64 | refl. surf. |
| 7 | 0.00 | −201.82 | 135.98 | 99.00 | −23.00 | refl. surf. |
| 8 | 0.00 | −189.27 | 234.18 | 205.00 | 29.00 | refl. surf. |
| 9 | 0.00 | −375.49 | 148.45 | 1819.28 | −13.14 | refl. surf. |
| 10 | 0.00 | 769.22 | 1562.46 | 23.43 | | image surf. | aspherical surface coefficients:

surface 2 (R1)
  $C02=-3.25998e-003$, $C20=-6.90086e-003$
  $C03=1.41381e-005$, $C21=-1.95773e-005$
  $C04=-2.05742e-007$, $C22=4.50838e-007$, $C40=-3.67778e-007$
  $C05=1.18939e-009$, $C23=6.33971e-009$, $C41=-1.83234e-009$
  $C06=-2.62309e-011$, $C24=1.56107e-010$, $C42=2.45239e-011$
  $C60=-4.12034e-011$ surface 3 (R2)
  $C02=4.95762e-004$, $C20=3.41582e-003$
  $C03=-8.24393e-006$, $C21=4.41156e-005$
  $C04=2.18058e-008$, $C22=-1.91260e-006$, $C40=-3.76944e-006$
  $C05=3.65888e-009$, $C23=4.65171e-010$, $C41=-1.02006e-007$
  $C06=1.18156e-010$, $C24=-1.28201e-011$, $C42=6.41833e-009$
  $C60=-2.52792e-009$ surface 4 (R3)
  $C02=-6.28009e-003$, $C20=-4.27970e-003$
  $C03=2.66468e-005$, $C21=-4.90068e-005$
  $C04=-1.29824e-007$, $C22=-7.96476e-007$, $C40=-5.63879e-008$
  $C05=8.80497e-010$, $C23=-2.55320e-009$, $C41=-8.31151e-009$
  $C06=1.43667e-010$, $C24=-6.29776e-010$, $C42=3.71567e-010$
  $C60=3.88043e-012$ surface 5 (R4)
  $C02=4.81418e-003$, $C20=1.57392e-003$
  $C03=-9.59877e-006$, $C21=2.34354e-005$
  $C04=-3.67975e-007$, $C22=8.37738e-007$, $C40=-4.10206e-008$
  $C05=-4.21037e-009$, $C23=3.31306e-009$, $C41=1.67042e-009$
  $C06=-9.48563e-011$, $C24=2.88014e-011$, $C42=8.88942e-011$
  $C60=-5.25553e-013$ surface 6 (R5)
  $C02=-2.71798e-004$, $C20=-6.87849e-004$
  $C03=-4.32341e-006$, $C21=3.32927e-006$
  $C04=6.71967e-008$, $C22=1.91790e-008$, $C40=4.48290e-009$
  $C05=-1.00900e-010$, $C23=-1.07249e-010$, $C41=-4.59171e-011$
  $C06=8.93194e-012$, $C24=2.17778e-012$, $C42=-1.39463e-014$
  $C60=5.29477e-014$ surface 7 (R6)
   $C02=6.10818e-004$, $C20=3.78002e-004$
   $C03=1.45274e-006$, $C21=1.02433e-005$
   $C04=8.94503e-008$, $C22=-2.15932e-009$, $C40=-4.01602e-009$
   $C05=8.94389e-011$, $C23=-8.24123e-010$, $C41=-4.06032e-010$
   $C06=-1.03983e-012$, $C24=2.25939e-012$, $C42=3.04242e-012$
   $C60=3.61656e-013$ surface 8 (R7)
   $C02=1.76831e-003$, $C20=2.61055e-003$
   $C03=1.54236e-005$, $C21=1.70996e-005$
   $C04=7.60359e-008$, $C22=-1.46758e-007$, $C40=-7.12061e-008$
   $C05=-4.71421e-010$, $C23=-5.50805e-010$, $C41=-2.50296e-009$
   $C06=-7.87391e-011$, $C24=3.23097e-011$, $C42=-1.86863e-011$
   $C60=-6.46858e-012$ surface 9 (R8)
   $C02=2.15655e-003$, $C20=2.60973e-003$
   $C03=-1.89367e-006$, $C21=-2.53014e-006$
   $C04=2.63036e-008$, $C22=2.28068e-008$, $C40=8.15850e-009$
   $C05=-7.50451e-011$, $C23=-7.34461e-011$, $C41=1.07527e-012$
   $C06=-1.92884e-012$, $C24=3.20510e-013$, $C42=1.46855e-013$
   $C60=1.16684e-013$ rotatable member, surfaces 6 to 9 (R5 to R8)

optical system, $\theta x, i$: ±2.46156 rotation center: (Xi,Yi,Zi)=(0.00 −58.88 −113.99) (EXP in FIG. 24)

The following is an explanation of the optical action of the present embodiment. The light generated by the light source (illumination system L) illuminates the light valve LV, the image of an original image at the light valve LV is magnified by the projection optical system P including the reflective second optical system R, and is projected onto the screen E.

The projection optical system P of the present embodiment is characterized in that it can move or tilt the image surface on the screen E. FIG. 55 shows the evaluation positions on the various image surfaces for evaluating the lateral aberration at the image surface positions S1 and S2 shown in FIG. 25.

Figure 26:
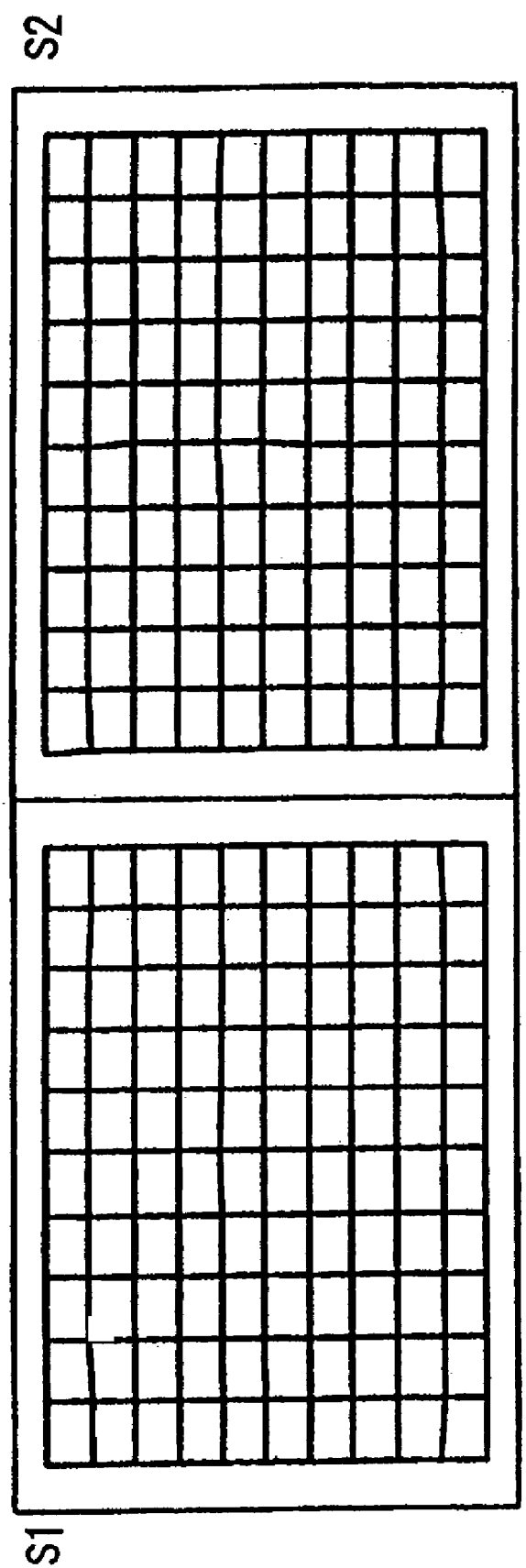
FIG. 26 is a diagram showing the distortion of the projection optical system according to Embodiment 3.
Figure 27:
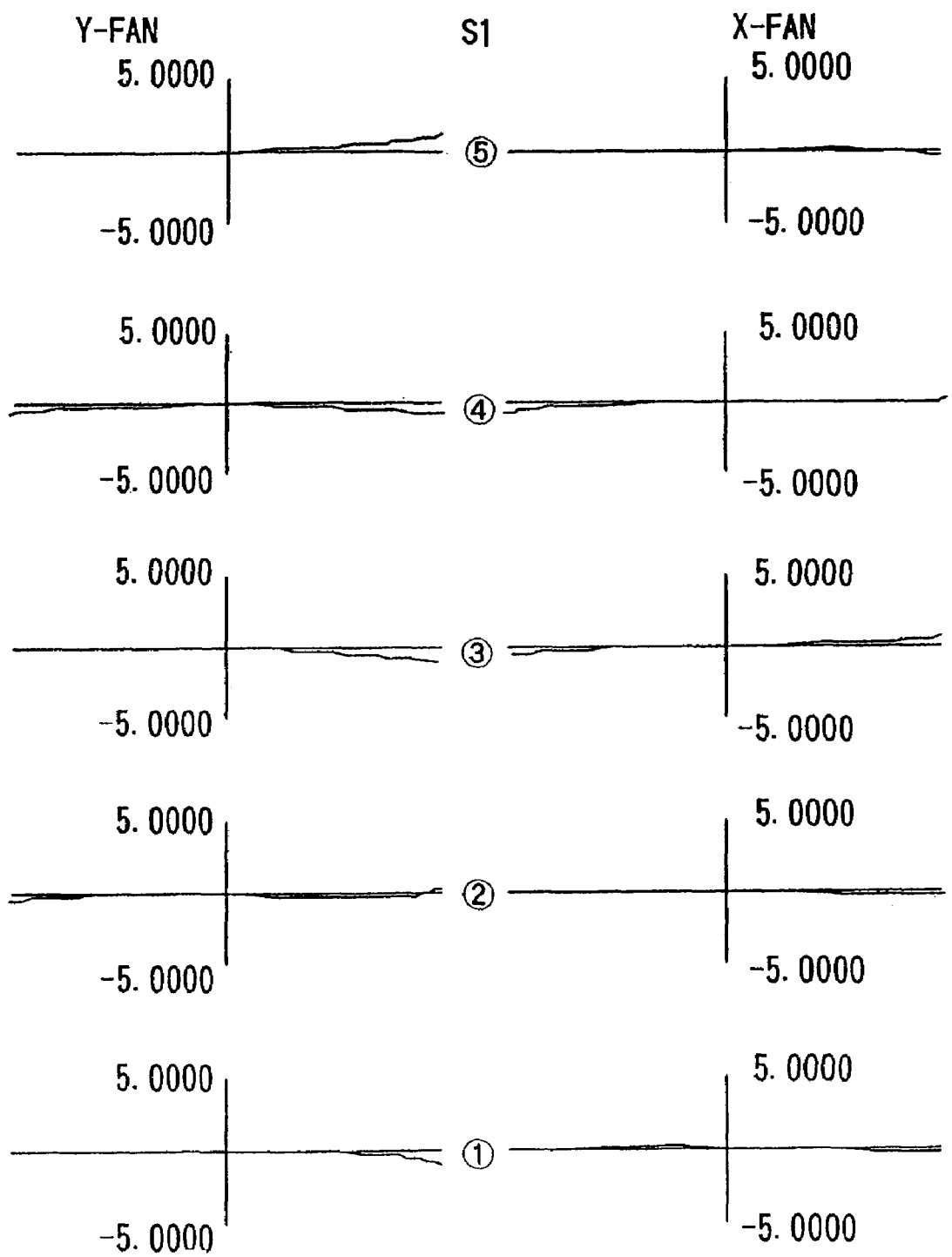
FIG. 27 is a diagram showing the lateral aberration of the projection optical system of Embodiment 3.
Figure 28:
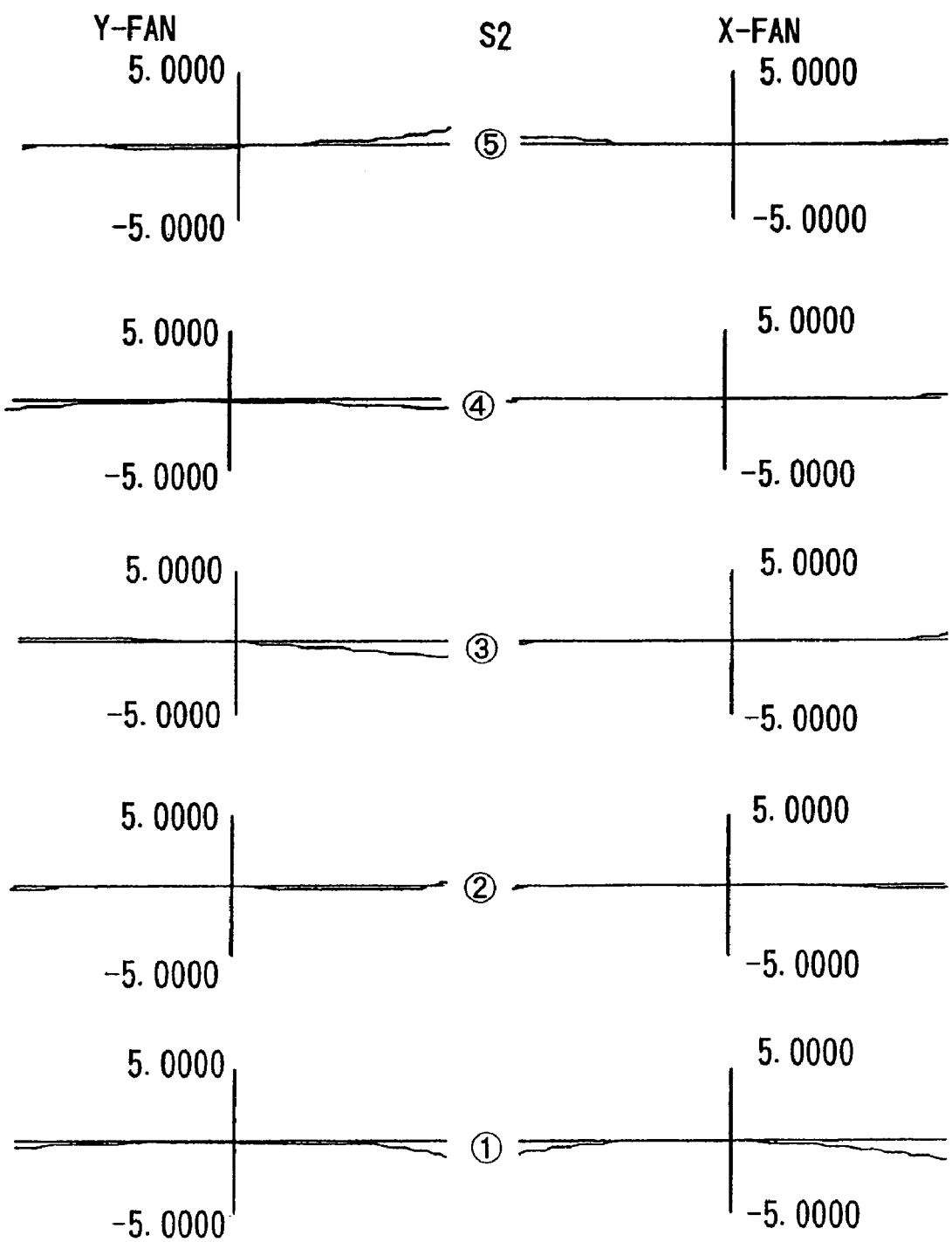
FIG. 28 is a diagram showing the lateral aberration of the projection optical system of Embodiment 3.

FIG. 26 shows the state of the distortion for the image surface positions S1 and S2 with the projection optical system of the present embodiment, and FIGS. 27 to 28 show lateral aberration charts for the evaluation positions (1) through (5) of the image surface positions S1 and S2. As can be seen from FIG. 26, there is no large distortion in the present embodiment, and also the asymmetric distortion is small. As for the definition of the axes in the lateral aberration charts in FIGS. 27 and 28, the horizontal axis marks the x axis or the y axis on the pupil plane, and the vertical axis marks the aberration amount on the screen E. From these figures, it can be seen that excellent image formation is attained at each of the image surface positions S1 and S2.

In this Embodiment 3, the image surface S is moved only in the horizontal direction on the screen E, so that a first optical system constituted by the reflective surfaces R1 to R4 on the panel side in the reflective optical system R makes the aberrations uniform in the horizontal direction, and the aberrations are then corrected by a second optical system constituted by the reflective surfaces R5 to R8 on the image surface side in the reflective optical system R.

Figure 29:
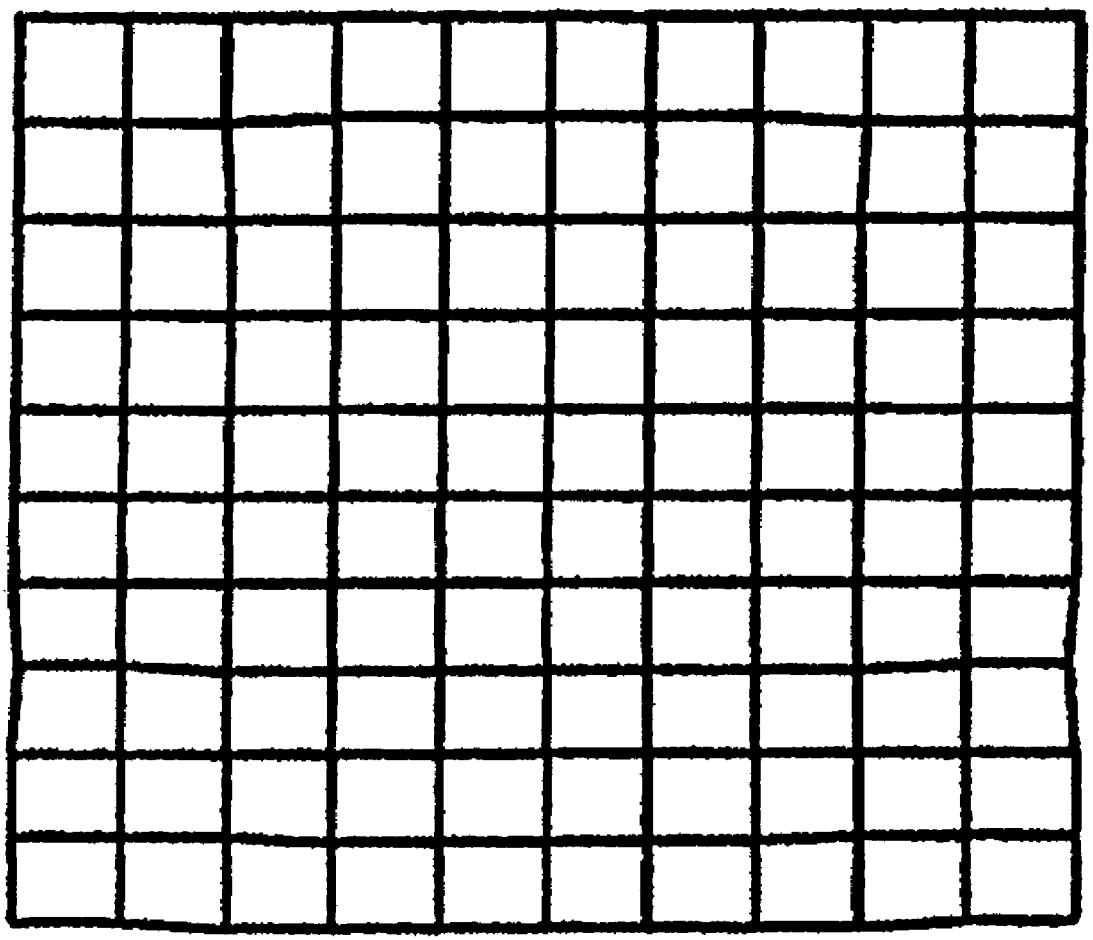
FIG. 29 is a diagram showing the distortion of the reflective optical system of Embodiment 3.
Figure 30:
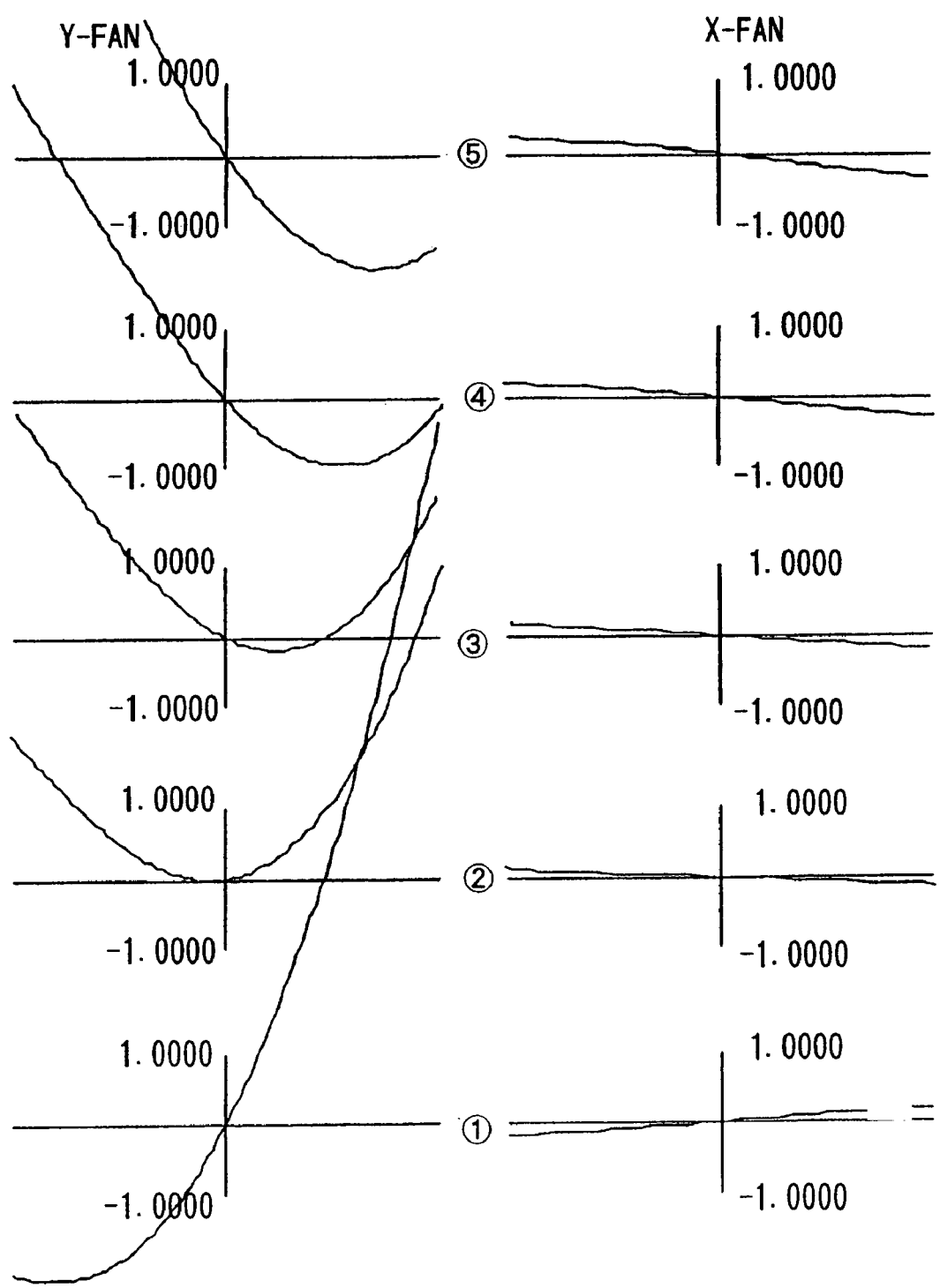
FIG. 30 is a diagram showing the lateral aberration of the reflective optical system of Embodiment 3.

FIG. 29 shows the state of the distortion of the optical system R1 to R4. FIG. 30 shows lateral aberration charts at the evaluation positions (1) through (5) shown in FIG. 55. As can be seen from FIG. 29, there is no large distortion. And as can be seen from FIG. 30, aberrations in the horizontal direction are favorably corrected, even though aberrations of the vertical direction are not corrected. Consequently, as noted above, a correction is possible with which excellent images can be attained on the screen E with the second optical system (R5 to R8) on the image surface side.

It should be noted that the focal length of the first optical system (R1 to R4) on the panel side is 97.0044 mm.

Embodiment 4

Figure 31:
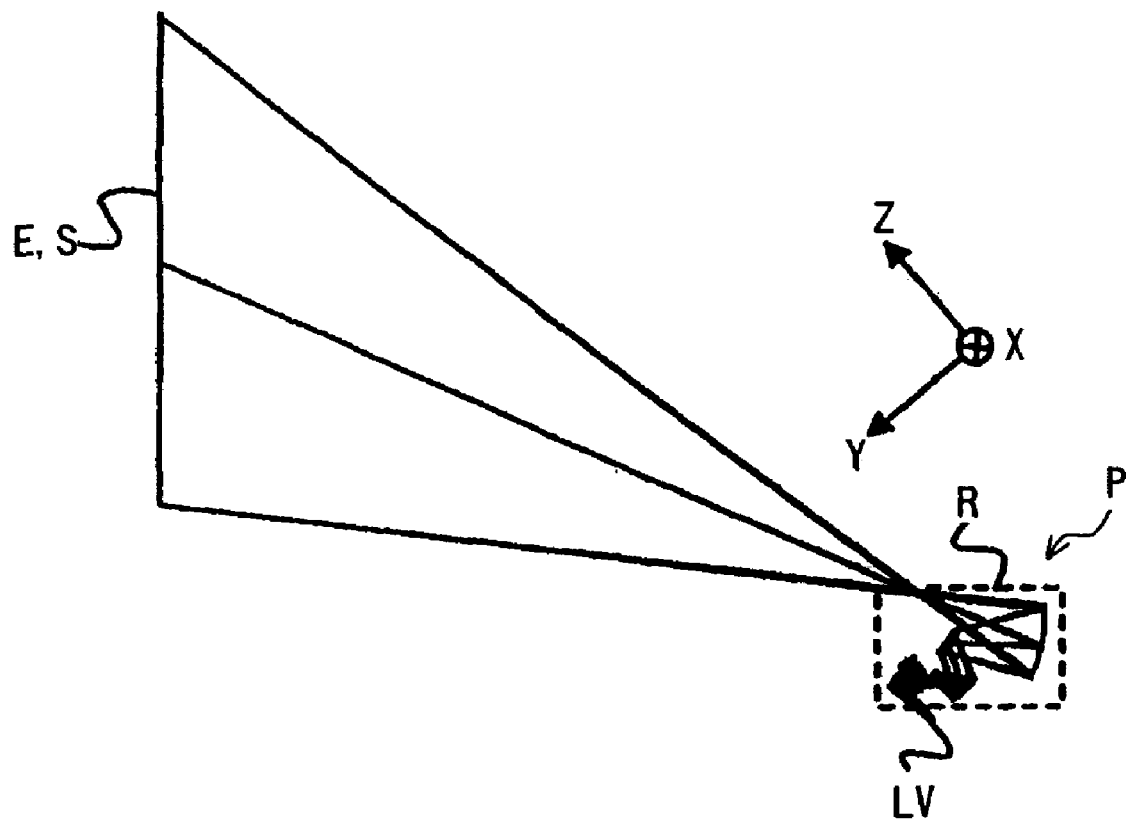
FIG. 31 is a diagram of an image projection apparatus using a projection optical system according to Embodiment 4 of the present invention.

FIG. 31 shows the structure of a projection optical system P according to Embodiment 4 of the present invention. The projection optical system P in FIG. 31 uses an off-axial system, in which the off-axial reflective surfaces guide light which has been optically modulated by the light valve LV to the screen (effective projection region) E, and form an image S on the screen E.

Figure 32:
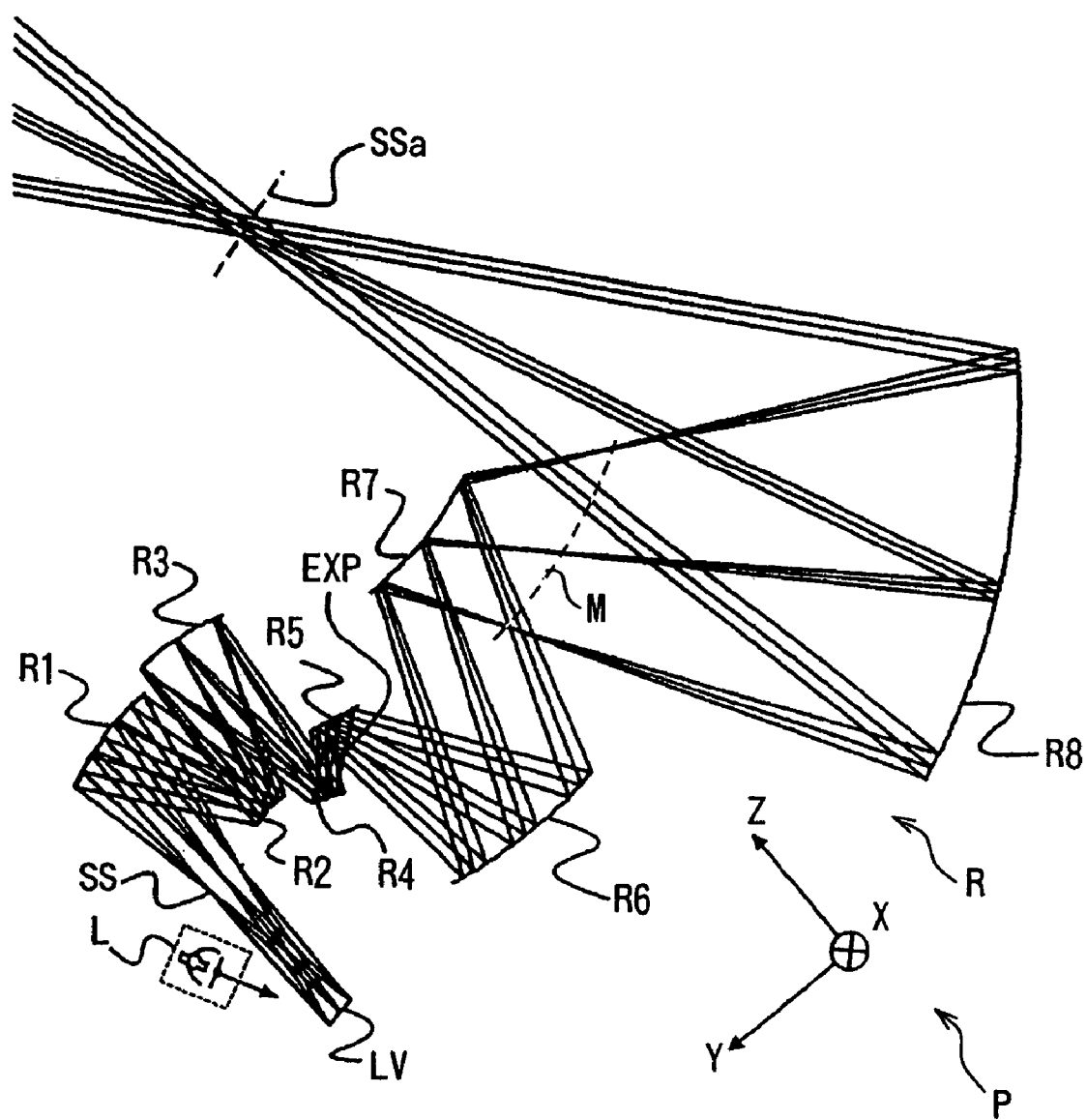
FIG. 32 is a diagram of the light valve and the reflective optical system of the projection optical system of Embodiment 4.

FIG. 32 is an enlarged view of the projection optical system P in FIG. 31. In FIG. 32, LV denotes a light valve (image display panel) using a dot-matrix liquid crystal or digital micro-mirror device or the like, and L denotes an illumination system illuminating light onto the light valve LV. The size of the light valve LV is 10.668×14.224 mm. The illumination system is made of a lamp, a condenser lens, and wavelength-selective filters, not shown in the figure. R1 to R8 denote off-axial reflective surfaces constituting the reflective optical system R.

The size of the screen E is 914.4×2438.4 mm, the size of the image surface S is 60 inches (914.4×1219.2 mm) with an aspect ratio of 3:4, and the corrective projection angle range as expressed by the angle formed by the normal on the screen E and the reference axis is $\theta x$: −22.12° to 22.12°, $\theta y$: 23.43°.

Figure 33:
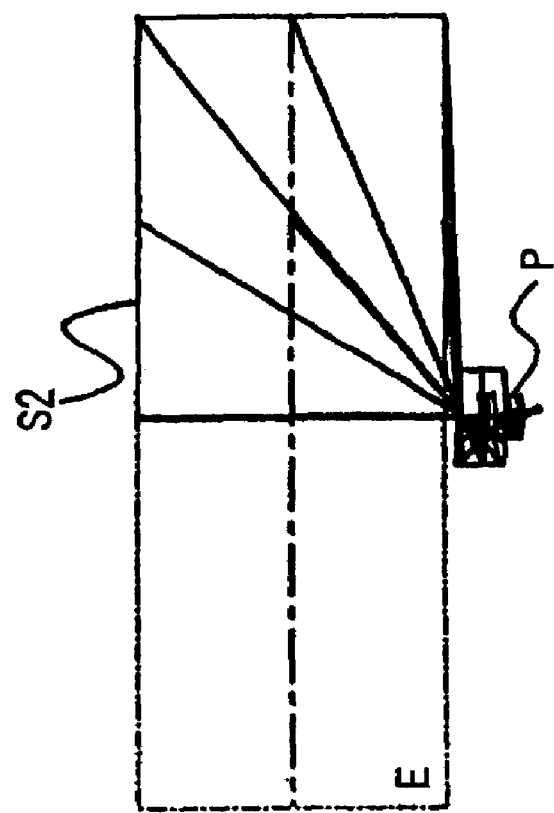
FIG. 33 illustrates how the projection angle can be changed in a projection display apparatus using the projection optical system according to Embodiment 4.
Figure 33:
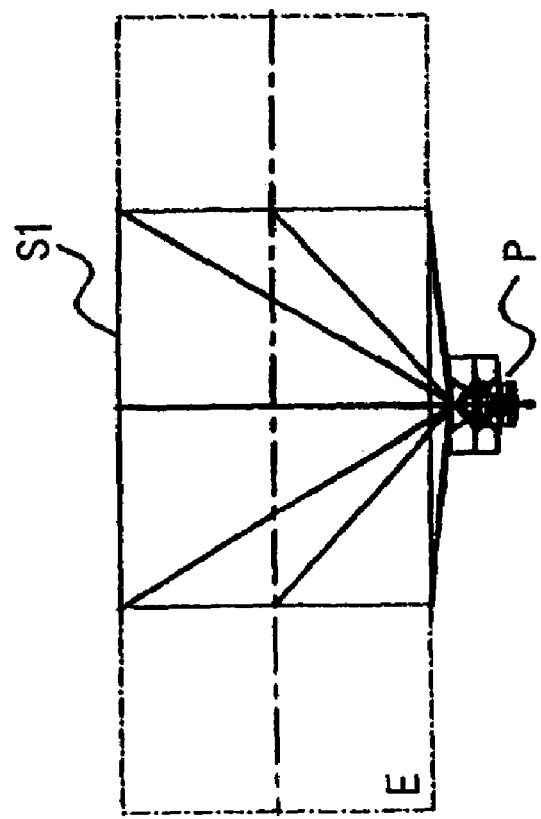

FIG. 33 illustrates the possibility of moving or tilting the position of the image surface S on the screen E, which is a characteristic feature of the projection optical system P of the present embodiment. The image surface S can be continually moved by rotating the reflective surfaces R5 to R8 substantially around the center of the exit pupil EXP of the reflective surfaces R1 to R4.

The following lists the structural data of the reflective optical system used in the present embodiment:

entrance pupil diameter: 13 mm variable projection angle range:
   $\theta x$: −22.12° to 22.12°,
   $\theta y$: 23.43°

| surf. | Xi | Yi | Zi | Di | $\theta x, i$ | |
|---|---|---|---|---|---|---|
| 1 | 0.00 | 0.00 | 0.00 | 57.62 | 0.00 | aperture stop |
| 2 | 0.00 | 0.00 | 57.62 | 55.88 | 14.10 | refl. surf. |
| 3 | 0.00 | −26.41 | 8.38 | 60.33 | −19.90 | refl. surf. |
| 4 | 0.00 | −38.54 | 67.48 | 67.52 | 7.45 | refl. surf. |
| 5 | 0.00 | −42.44 | 0.08 | 24.00 | −21.72 | refl. surf. |
| 6 | 0.00 | −57.91 | 18.43 | 69.98 | 30.49 | refl. surf. |
| 7 | 0.00 | −82.81 | −46.97 | 99.72 | −21.69 | refl. surf. |

-continued

| surf. | Xi | Yi | Zi | Di | θx, i | |
|---|---|---|---|---|---|---|
| 8 | 0.00 | −121.03 | 45.13 | 180.56 | 34.45 | refl. surf. |
| 9 | 0.00 | −251.72 | −79.47 | 1819.28 | −10.76 | refl. surf. |
| 10 | 0.00 | 512.89 | 1571.33 | 23.43 | | image surf. | aspherical surface coefficients:

surface 2 (R1)
C02=−5.67352e−003, C20=−6.18067e−003
C03=1.81500e−006, C21=2.02973e−006
C04=−2.30946e−007, C22=−4.78406e−007, C40=−2.50224e−007
C05=−1.13478e−010, C23=2.90876e−010, C41=2.11069e−010
C06=−4.92788e−012, C24=−2.76967e−011, C42=−6.79110e−012
C60=−7.03353e−012 surface 3 (R2)
C02=−1.28852e−002, C20=−1.76953e−002
C03=1.30884e−004, C21=1.60909e−004
C04=−1.03604e−005, C22=−2.16544e−005, C40=−1.19191e−005
C05=8.12163e−008, C23=3.60597e−007, C41=1.30476e−007
C06=−1.31063e−009, C24=−3.28922e−008, C42=7.56681e−009
C60=−2.42765e−009 surface 4 (R3)
C02=−6.29389e−003, C20=−6.47218e−003
C03=6.67987e−008, C21=4.46386e−007
C04=−2.63167e−007, C22=−5.10874e−007, C40=−3.10274e−007
C05=−2.11146e−009, C23=−2.14865e−010, C41=1.41925e−009
C06=7.00858e−012, C24=−2.05288e−010, C42=−7.64844e−012
C60=1.32474e−011 surface 5 (R4)
C02=3.51643e−003, C20=2.92520e−003
C03=1.18039e−004, C21=1.50201e−004
C04=−6.89874e−006, C22=−1.29296e−005, C40=−4.68096e−006
C05=7.02866e−008, C23=1.55597e−007, C41=9.91682e−008
C06=−1.14045e−008, C24=1.95700e−008, C42=1.59223e−008
C60=7.03234e−009 surface 6 (R5)
C02=1.99546e−003, C20=1.02818e−003
C03=2.17400e−005, C21=1.60633e−005
C04=−7.88942e−007, C22=6.72894e−007, C40=3.44264e−008
C05=−7.99308e−008, C23=5.40936e−008, C41=7.26358e−008
C06=−6.30208e−009, C24=5.84475e−009, C42=1.46759e−009
C60=3.27548e−010 surface 7 (R6)
C02=3.07938e−003, C20=2.56738e−003
C03=3.82416e−006, C21=3.85793e−006
C04=1.30295e−008, C22=5.67066e−008, C40=3.66501e−008
C05=−1.41121e−009, C23=1.05170e−009, C41=5.85957e−010
C06=−5.79058e−011, C24=3.18207e−011, C42=2.68712e−012
C60=5.23217e−013 surface 8 (R7)
C02=4.10051e−003, C20=1.93021e−003
C03=−7.82095e−006, C21=−2.77065e−006
C04=−1.16010e−008, C22=−3.09078e−007, C40=2.28082e−008
C05=−1.11294e−008, C23=2.56977e−009, C41=6.68538e−010
C06=−1.03197e−009, C24=1.64297e−010, C42=2.03538e−011
C60=2.61965e−015 surface 9 (R8)
C02=1.89688e−003, C20=1.99417e−003
C03=−2.78275e−007, C21=−8.98419e−007
C04=1.72673e−008, C22=1.76298e−008, C40=5.85989e−009
C05=−1.05212e−011, C23=−4.09196e−011, C41=−1.27669e−011
C06=−5.63347e−013, C24=1.90521e−013, C42=1.18997e−013
C60=6.95721e−014 rotatable member: surfaces 6 to 9 (R5 to R8)

optical system, θx,i: ±8.85312 rotation center: (Xi,Yi,Zi)=(0.00 −48.24 6.96) (EXP in FIG. 32)

The following is an explanation of the optical action of the present embodiment. The light generated by the light source (illumination system L) illuminates the light valve LV, the image of an original image at the light valve LV is magnified by the projection optical system P including the reflective second optical system R, and is projected onto the screen E.

The projection optical system P of the present embodiment is characterized in that it can move or tilt the image surface on the screen E. FIG. 55 shows the evaluation positions on the various image surfaces for evaluating the lateral aberration at the image surface positions S1 and S2 shown in FIG. 33.

Figure 34:
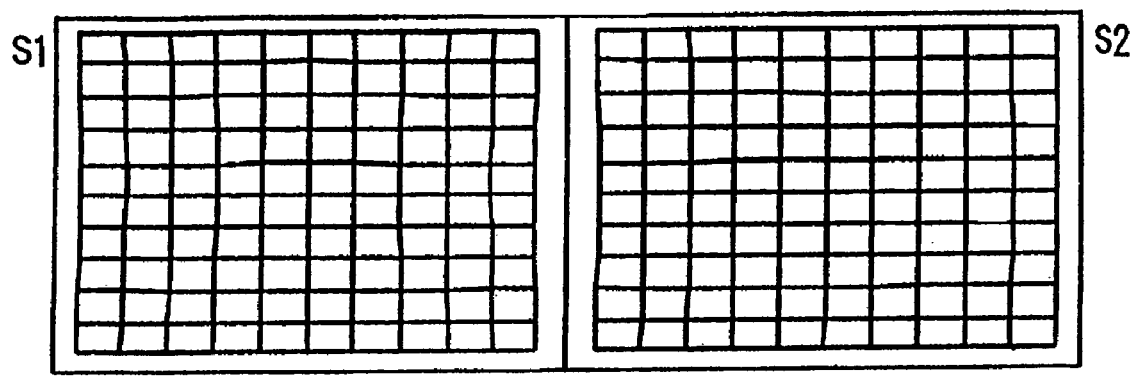
FIG. 34 is a diagram showing the distortion of the projection optical system according to Embodiment 4.
Figure 35:
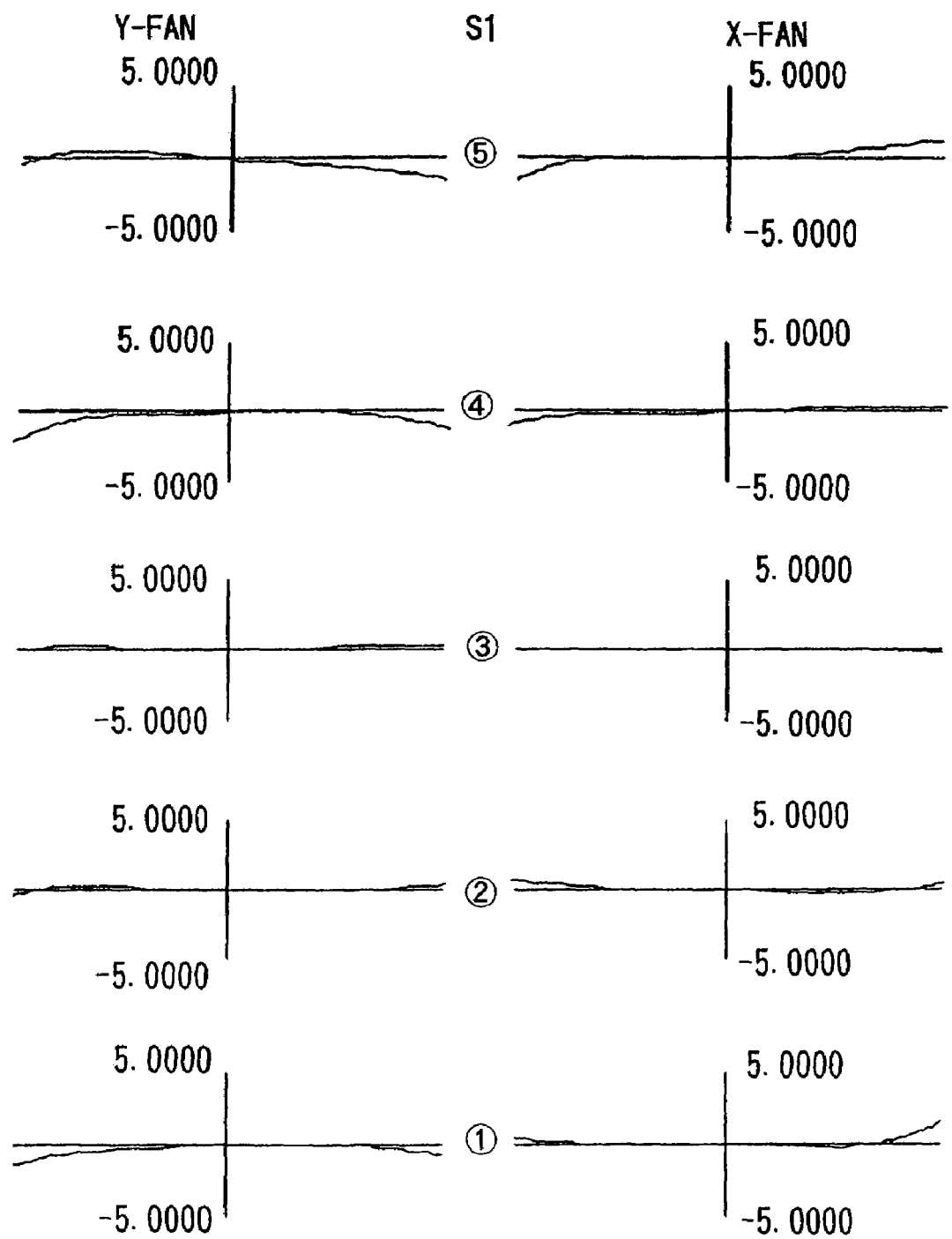
FIG. 35 is a diagram showing the lateral aberration of the projection optical system of Embodiment 4.
Figure 36:
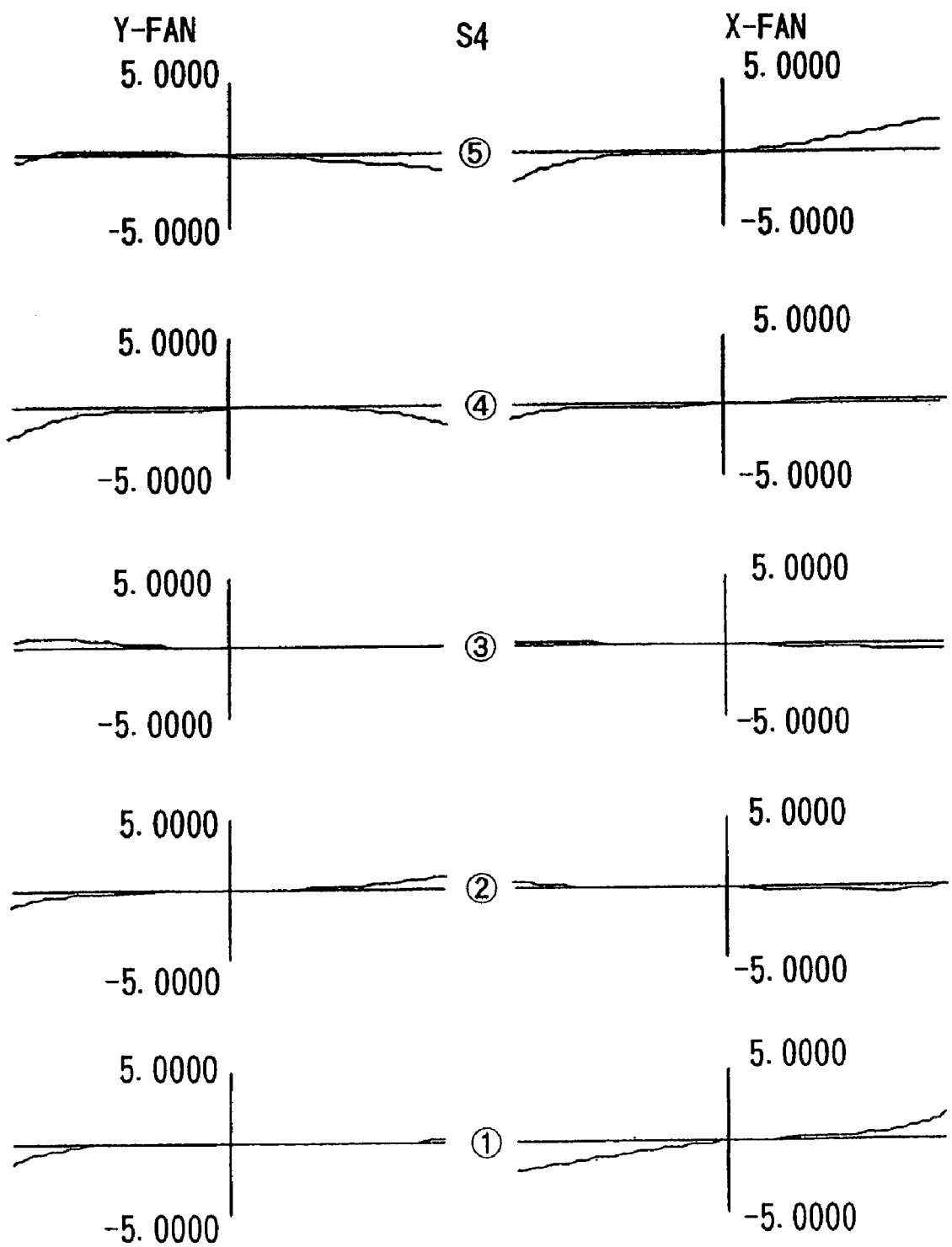
FIG. 36 is a diagram showing the lateral aberration of the projection optical system of Embodiment 4.

FIG. 34 shows the state of the distortion for the image surface positions S1 and S2 with the projection optical system P of the present embodiment, and FIGS. 35 to 36 show lateral aberration charts for the evaluation positions (1) through (5) of the image surface positions S1 and S2. As can be seen from FIG. 34, there is no large distortion in the present embodiment, and also the asymmetric distortion is small. As for the definition of the axes in the lateral aberration charts in FIGS. 35 and 36, the horizontal axis marks the x axis or the y axis on the pupil plane, and the vertical axis marks the aberration amount on the screen E. From these figures, it can be seen that excellent image formation is attained at each of the image surface positions S1 and S2.

Figure 37:
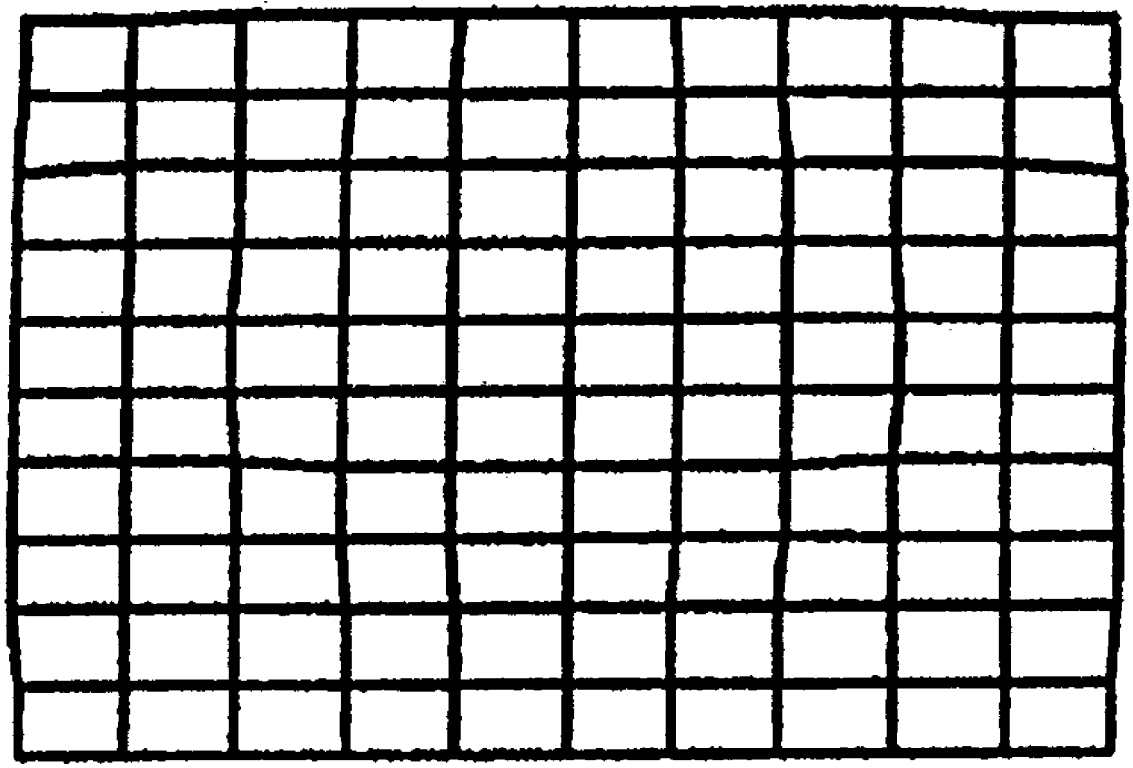
FIG. 37 is a diagram showing the distortion of the reflective optical system of Embodiment 4.
Figure 38:
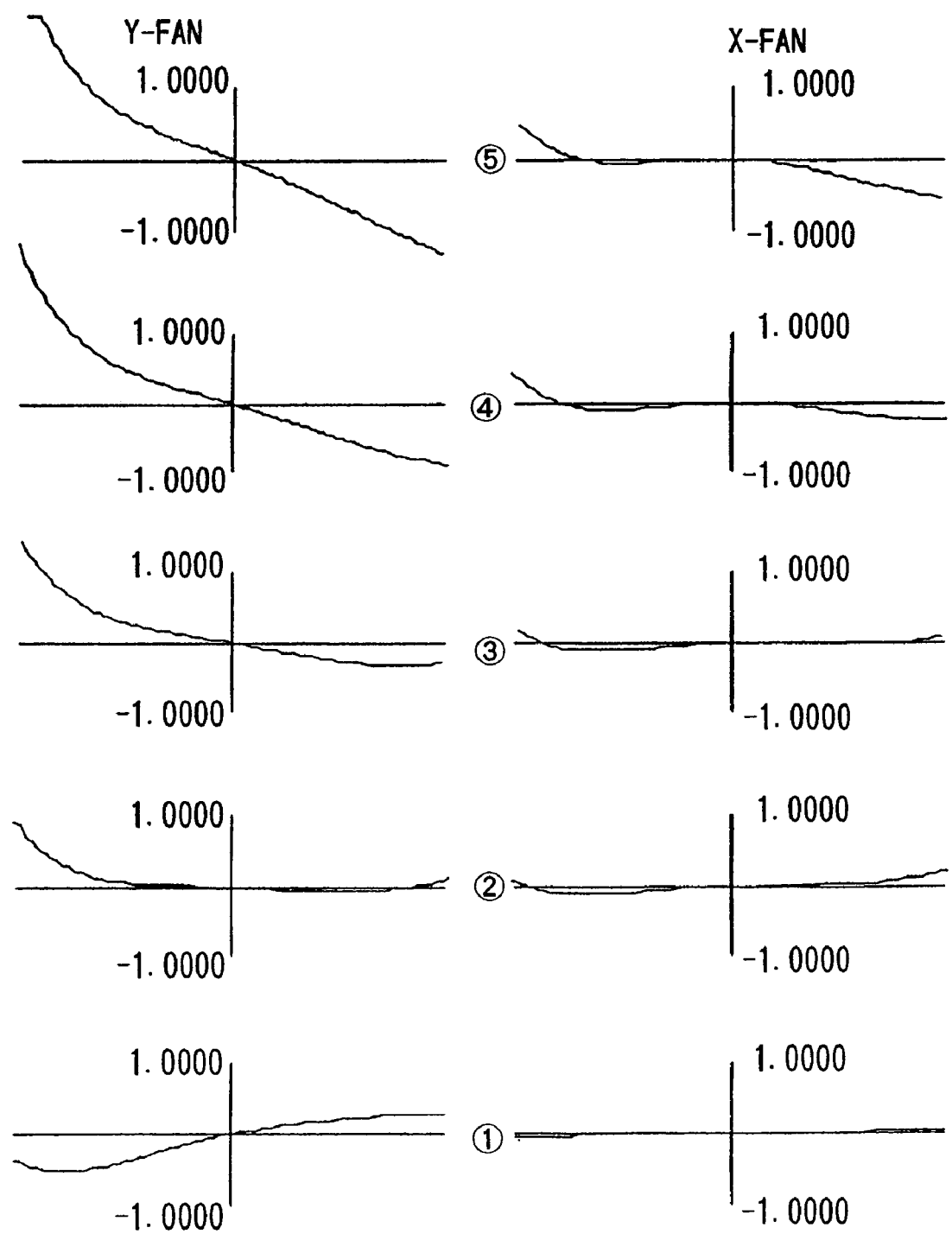
FIG. 38 is a diagram showing the lateral aberration of the reflective optical system of Embodiment 4.

In this Embodiment 4, the image surface S is moved only in the horizontal direction on the screen E, so that a first optical system constituted by the reflective surfaces R1 to R4 on the panel side in the reflective optical system R makes the aberrations uniform in the horizontal direction, and the aberrations are then corrected by a second optical system constituted by the reflective surfaces R5 to R8 on the image surface side in the reflective optical system R. FIG. 37 shows the state of the distortion of the first optical system (R1 to R4). FIG. 38 shows lateral aberration charts at the evaluation positions (1) through (5) shown in FIG. 55. As can be seen from FIG. 37, there is no large distortion. And as can be seen from FIG. 38, aberrations in the horizontal direction are favorably corrected, even though aberrations of the vertical direction are not corrected. Consequently, as noted above, a correction is possible with which excellent images can be attained on the screen E with the second optical system (R5 to R8) on the image surface side.

It should be noted that the focal length of the first optical system (R1 to R4) on the panel side is 24.5256 mm.

Embodiment 5

Figure 39:
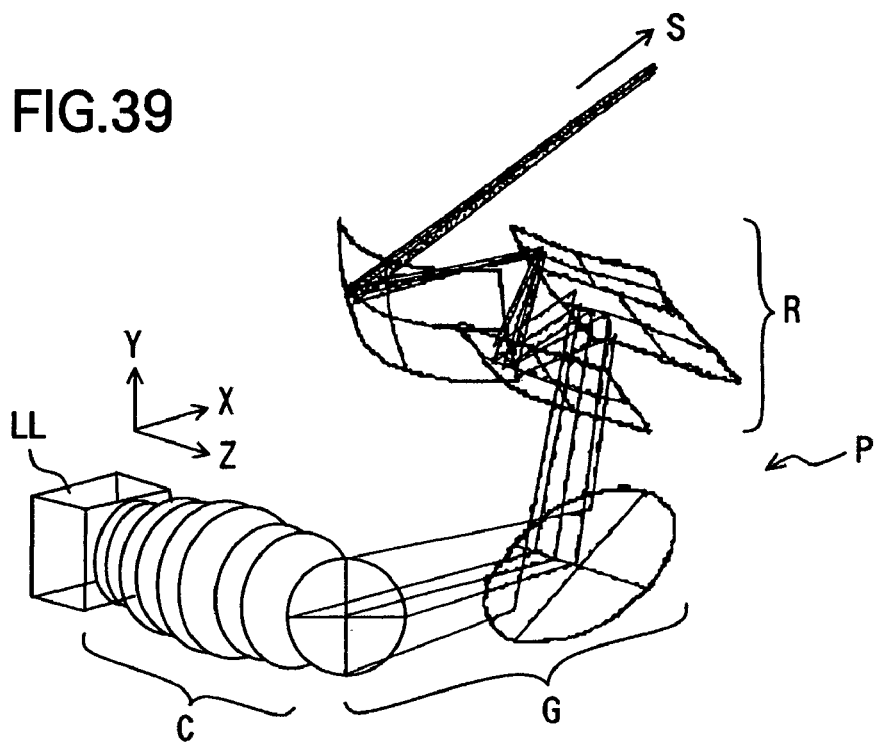
FIG. 39 is a diagram of an image projection apparatus using a projection optical system according to Embodiment 5 of the present invention.
Figure 40:
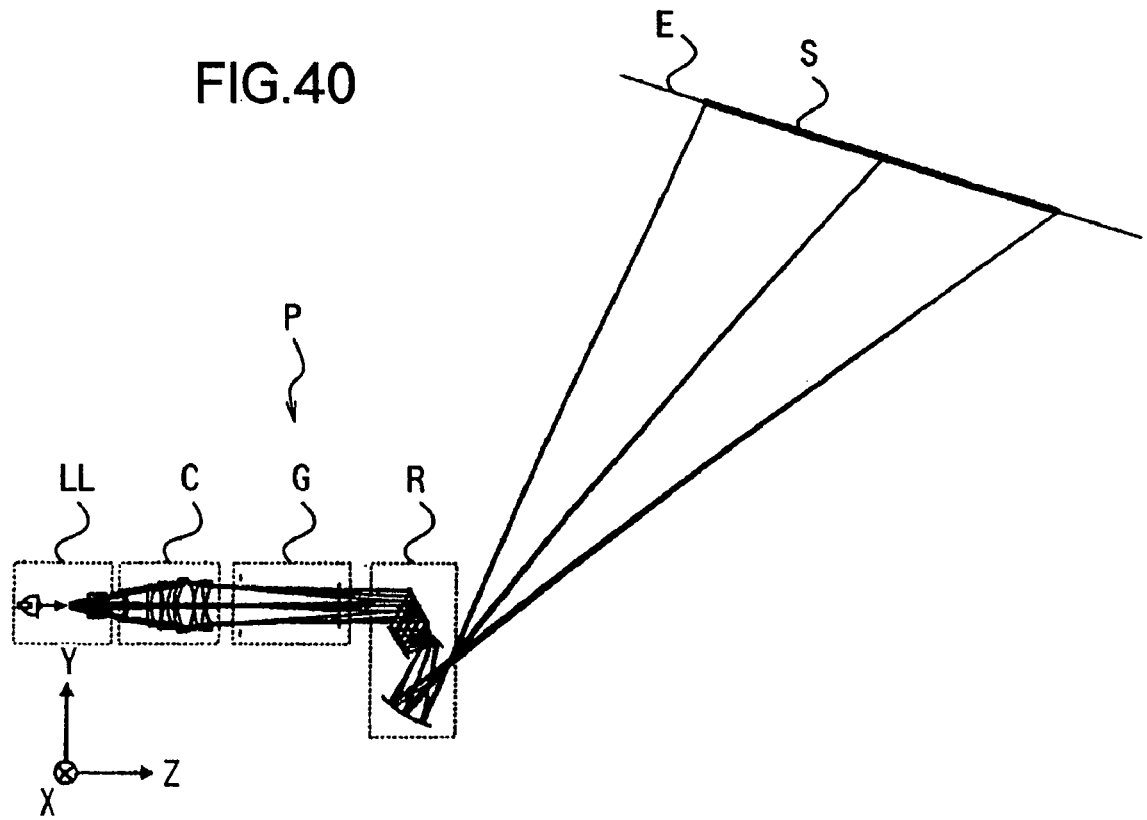
FIG. 40 is a diagram of an image projection apparatus using the projection optical system of Embodiment 5.

FIG. 39 is a birds-eye view of a projection optical system P according to Embodiment 5 of the present invention. FIG. 40 is a diagram in which the reference axis bent by the rotatable mirror G in FIG. 39 has been stretched out. While details have been omitted in FIG. 39, LL denotes an image display panel system comprising three light valves (image display panels) using a liquid crystal for RGB colors, a dichroic optical element performing color combination of RGB color light components from the light valves, and an illumination system illuminating light onto the light valves.

The illumination system is made of a lamp, a condenser lens, and wavelength-selective filters, not shown in the figure. The projection optical system P uses an off-axial system in which a rotationally symmetric coaxial lens system (first optical system) C, a rotatable mirror G, and a reflective second optical system (second optical system) R comprising off-axial reflective surfaces guide light which has been optically modulated by the light valves to the screen (effective projection region) E shown in FIG. 40, and form an image S on the screen E. The size of the screen E is 1300×3020 mm, the size of the image surface S is 60 inches (914.4×1219.2 mm) with an aspect ratio of 3:4, and the corrective projection angle range as expressed by the angle formed by the normal on the screen E and the reference axis is θx: −30.96° to 30.96°, θy: 16.96° to 29.33°.

Figure 41:
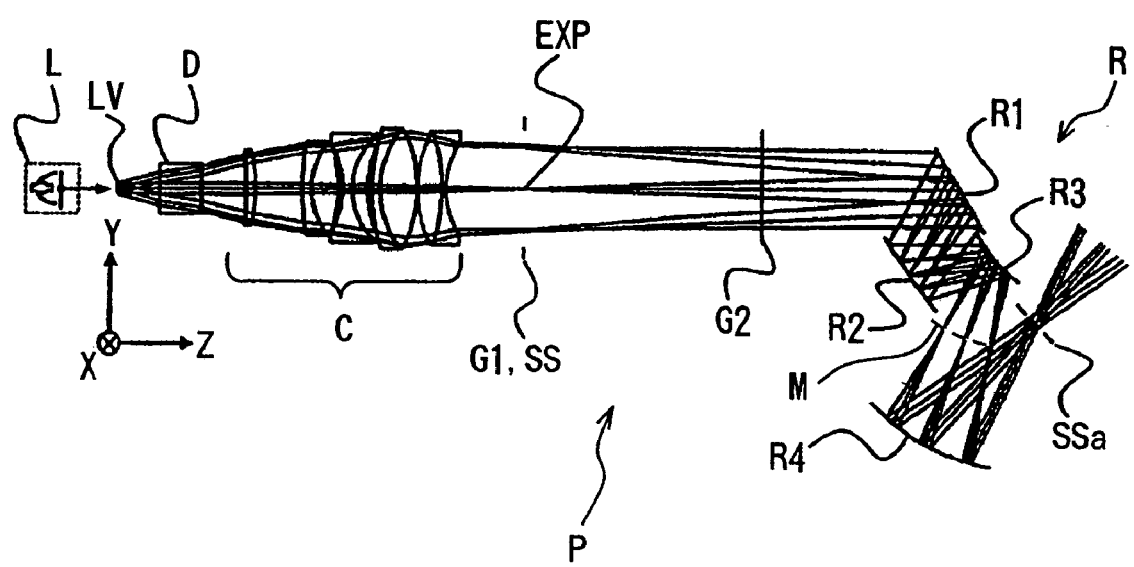
FIG. 41 is a diagram of the image display panel system, the dichroic optical element, the coaxial and rotationally symmetric system, the rotatable mirrors and the reflective optical system of the projection optical system according to Embodiment 5.

FIG. 41 shows an enlarged view of the projection optical systems C, R, rotatable mirror G and the image display panel system LL in FIGS. 39 and 40.

In FIG. 41, LV denotes three light valves (image display panels) using a liquid crystal for RGB colors, and L denotes an illumination system illuminating light onto the light valve LV. The size of the light valve LV is 10.668×14.224 mm. D denotes a dichroic optical element performing color combination of RGB color light components from the light valves LV.

C denotes a refractive optical system made of coaxial and rotationally symmetric spherical surfaces C1 to C14. G1 denotes a rotatable mirror placed at the position of an aperture stop SS, and G2 denotes a rotatable mirror placed near the aperture stop SS at such a distance to the rotatable mirror G1 that there is no interference between the two. R1 to R4 denote a reflective optical system made of off-axial reflective surfaces.

Figure 42:
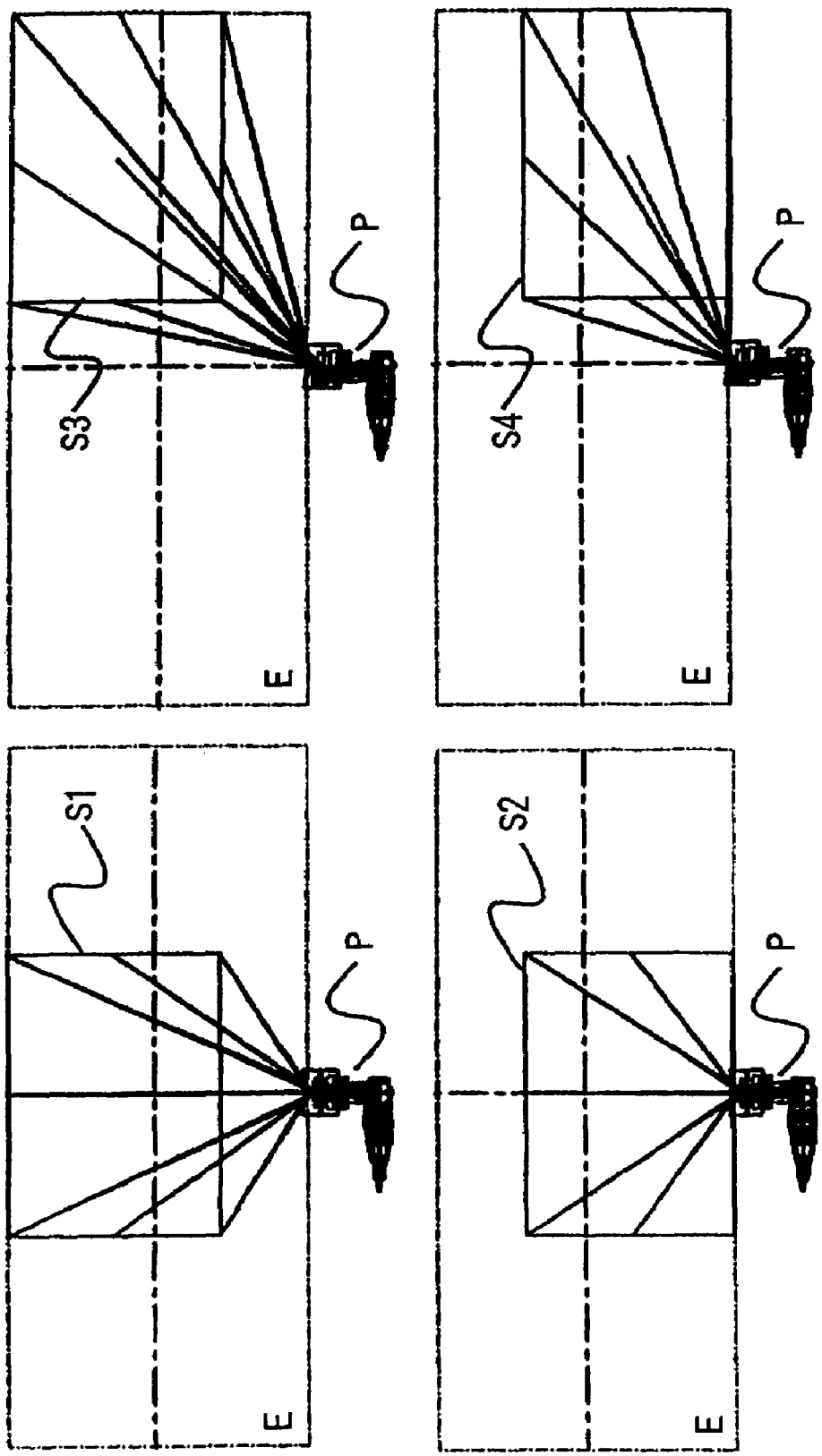
FIG. 42 illustrates how the projection angle can be changed in the image projection apparatus using the projection optical system according to Embodiment 5.

FIG. 42 illustrates the possibility of moving or tilting the position of the image surface S on the screen E, which is a characteristic feature of the projection optical system P of the present embodiment. S1 to S4 denote representative positions of the image surface S which can be moved continually over the screen E by rotating the rotatable mirrors G1 and G2 substantially around the center of the exit pupil EXP of the lens system C.

The following lists the structural data of the reflective optical system used in the present embodiment:

| surf. | Xi | Yi | Zi | Di | θx, i | θy, i | Ndi | vdi | |
|---|---|---|---|---|---|---|---|---|---|
| 1 | 0.00 | 0.00 | 0.00 | 44.00 | 0.00 | 0.00 | 1.755199 | 27.51 | transm. surf. |
| 2 | 0.00 | 0.00 | 44.00 | 44.40 | 0.00 | 0.00 | | | transm. surf. |
| 3 | 0.00 | 0.00 | 88.40 | 10.00 | 0.00 | 0.00 | 1.618000 | 63.33 | transm. surf. |
| 4 | 0.00 | 0.00 | 98.40 | 47.72 | 0.00 | 0.00 | | | transm. surf. |
| 5 | 0.00 | 0.00 | 146.12 | 10.00 | 0.00 | 0.00 | 1.740769 | 27.79 | transm. surf. |
| 6 | 0.00 | 0.00 | 156.12 | 26.99 | 0.00 | 0.00 | 1.618000 | 63.33 | transm. surf. |
| 7 | 0.00 | 0.00 | 183.11 | 4.30 | 0.00 | 0.00 | | | transm. surf. |
| 8 | 0.00 | 0.00 | 187.41 | 9.42 | 0.00 | 0.00 | 1.620041 | 36.26 | transm. surf. |
| 9 | 0.00 | 0.00 | 196.83 | 16.20 | 0.00 | 0.00 | 1.622992 | 58.16 | transm. surf. |
| 10 | 0.00 | 0.00 | 213.03 | 4.29 | 0.00 | 0.00 | | | transm. surf. |
| 11 | 0.00 | 0.00 | 217.32 | 7.49 | 0.00 | 0.00 | 1.581439 | 40.75 | transm. surf. |
| 12 | 0.00 | 0.00 | 224.81 | 38.39 | 0.00 | 0.00 | 1.755199 | 27.51 | transm. surf. |
| 13 | 0.00 | 0.00 | 263.20 | 0.10 | 0.00 | 0.00 | | | transm. surf. |
| 14 | 0.00 | 0.00 | 263.30 | 26.15 | 0.00 | 0.00 | 1.618000 | 63.33 | transm. surf. |
| 15 | 0.00 | 0.00 | 289.44 | 4.20 | 0.00 | 0.00 | 1.639799 | 34.46 | transm. surf. |
| 16 | 0.00 | 0.00 | 293.64 | 80.00 | 0.00 | 0.00 | | | transm. surf. |
| 17 | 0.00 | 0.00 | 373.64 | 249.74 | 0.00 | 45.00 | | | aperture stop, rotatable mirror |
| 18 | 249.74 | 0.00 | 373.64 | 200.01 | 53.79 | 0.00 | | | galv. mirror |
| 19 | 310.14 | 190.66 | 373.64 | 101.39 | 30.00 | 0.00 | | | refl. surf. |
| 20 | 211.12 | 168.85 | 373.64 | 87.92 | −25.00 | 0.00 | | | refl. surf. |
| 21 | 251.82 | 246.78 | 373.64 | 203.27 | 30.01 | 0.00 | | | refl. surf. |
| 22 | 48.74 | 238.19 | 373.64 | 1818.84 | −10.38 | 0.00 | | | refl. surf. |
| 23 | 1721.11 | 954.41 | 373.64 | | 23.39 | 0.00 | | | image surf. | spherical curvature radii
surface 1 (D1) planar surface
surface 2 (D2) planar surface
surface 3 (C1) −375.917
surface 4 (C2) −141.592
surface 5 (C3) 264.516
surface 6 (C4) 79.671
surface 7 (C5) −148.444
surface 8 (C6) −98.046
surface 9 (C7) 71.674
surface 10 (C8) 128.720
surface 11 (C9) 196.215
surface 12 (C10) 94.612 surface 13 (C11) −135.284
surface 14 (C12) 114.801
surface 15 (C13) −175.679
surface 16 (C14) 88.288
surface 17 (C15) planar surface
surface 18 (C16) planar surface aspherical surface coefficients surface 19 (R1)
C02=−5.30060e−004, C20=−6.48158e−004
C03=2.38117e−006, C21=1.81552e−006
C04=1.36219e−009, C22=1.25978e−008, C40=8.34071e−009
C05=5.47534e−012, C23=1.02264e−010, C41=1.35072e−010
C06=−1.10384e−013, C24=2.72877e−013, C42=9.49423e−014
C60=−3.80594e−013 surface 20 (R2)
C02=8.15395e−005, C20=−2.10835e−004
C03=9.96478e−006, C21=3.94561e−006
C04=−4.25220e−008, C22=3.29584e−008, C40=2.71265e−008
C05=−2.06450e−011, C23=−5.12275e−011, C41=4.28789e−010
C06=7.87151e−014, C24=2.37491e−013, C42=−5.58217e−012
C60=−3.47348e−012 surface 21 (R3)
C02=2.70600e−003, C20=1.07862e−003
C03=8.88925e−006, C21=−1.31236e−005
C04=−6.87424e−008, C22=−8.94279e−009, C40=−3.52132e−008
C05=−1.50398e−009, C23=−6.70886e−010, C41=1.04289e−009
C06=−1.95832e−011, C24=−6.52406e−012, C42=−1.39380e−011
C60=−5.96763e−012 surface 22 (R4)
C02=2.21107e−003, C20=2.88015e−003
C03=−1.18067e−006, C21=−1.62934e−006
C04=8.46632e−009, C22=9.95858e−009, C40=1.19861e−009
C05=−1.34789e−011, C23=−1.73516e−011, C41=−4.30530e−011
C06=8.77560e−014, C24=3.20726e−013, C42=5.80718e−013
C60=2.76846e−013 rotatable members surface 17 (G1)

θy,i: ±3.14703° rotation center: (Xi,Yi,Zi)=(0.00 0.00 373.64) (EXP in FIG. 41)

surface 18 (G2)

θx,i ±0.51744° rotation center: (Xi,Yi,Zi)=(249.74 0.00 373.64)

The following is an explanation of the optical action of the present embodiment. The light generated by the light source (illumination system L) illuminates the light valve LV, the image of an original image at the light valve LV is magnified by the projection optical system P including the reflective second optical system R, and is projected onto the screen E.

The projection optical system P of the present embodiment is characterized in that it can move or tilt the image surface on the screen E. FIG. 55 shows the evaluation positions on the various image surfaces for evaluating the lateral aberration at the image surface positions S1 to S4.

Figure 43:
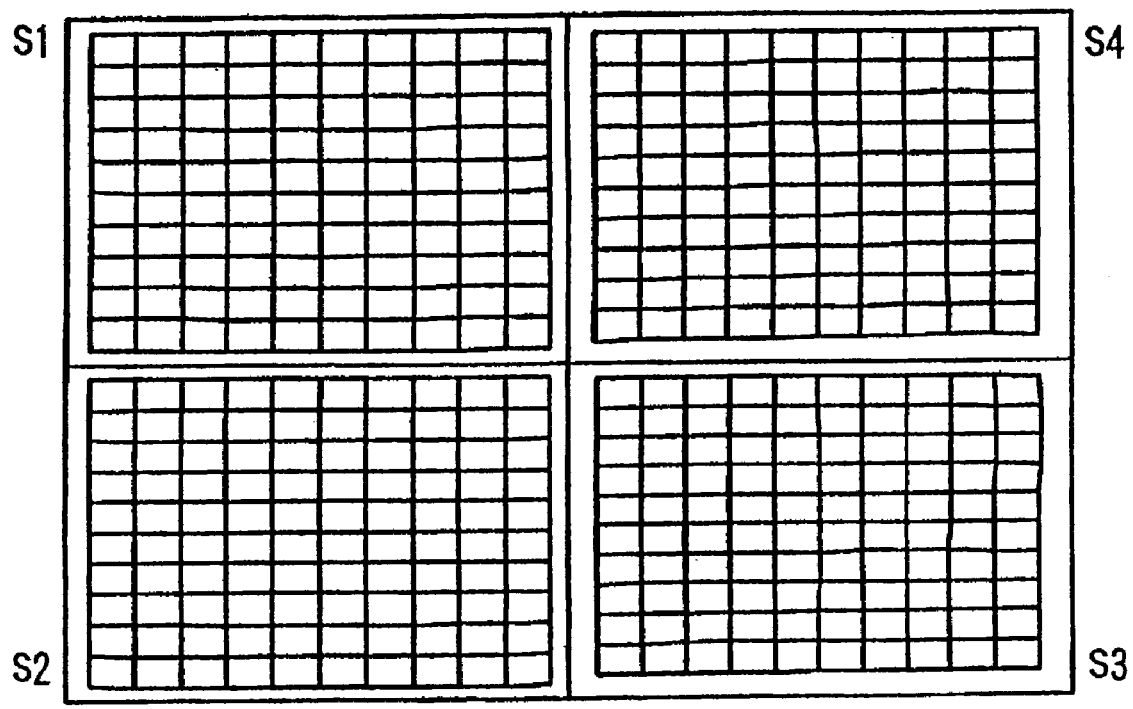
FIG. 43 is a diagram showing the distortion of the projection optical system according to Embodiment 5.
Figure 44:
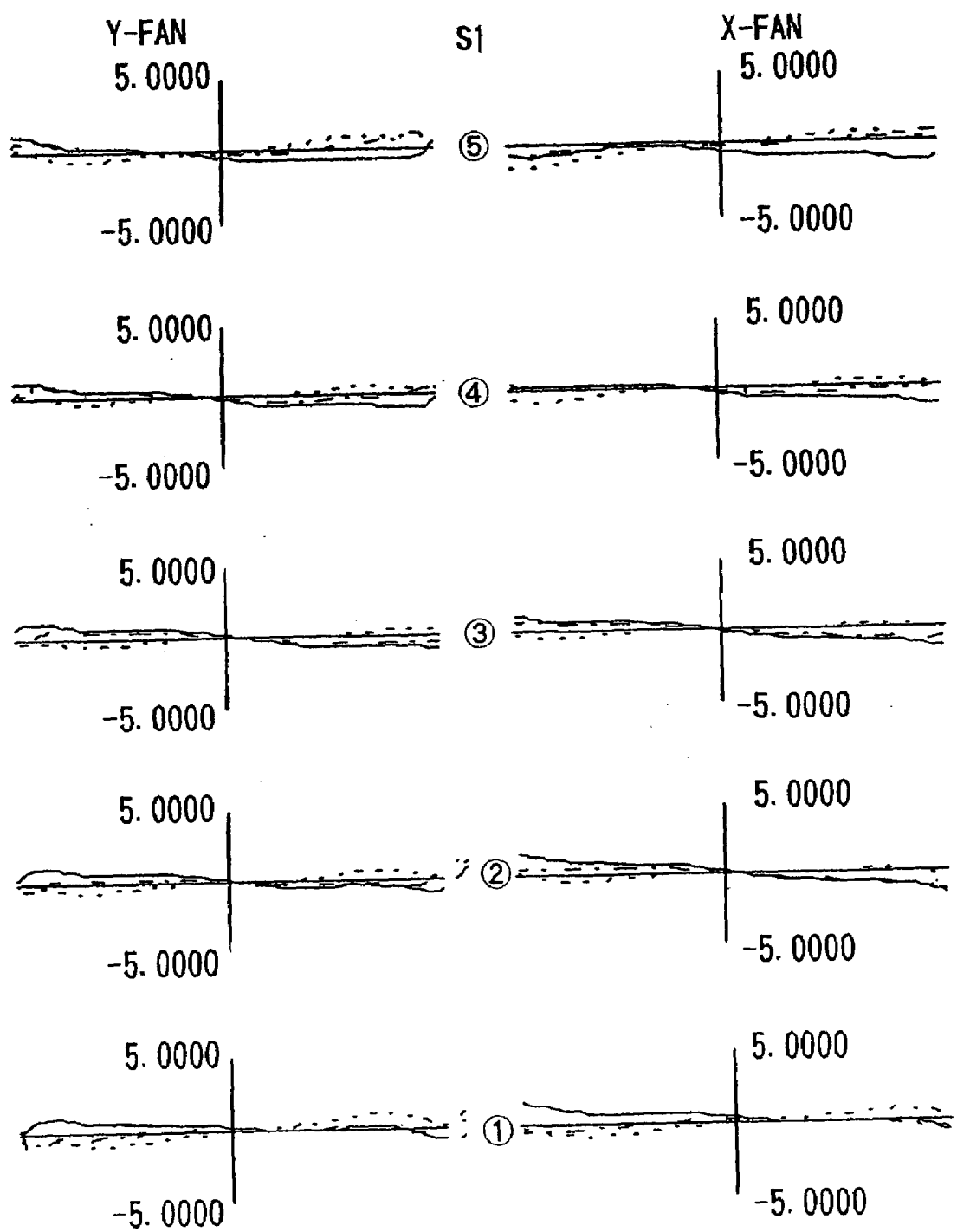
FIG. 44 is a diagram showing the lateral aberration of the projection optical system of Embodiment 5.
Figure 45:
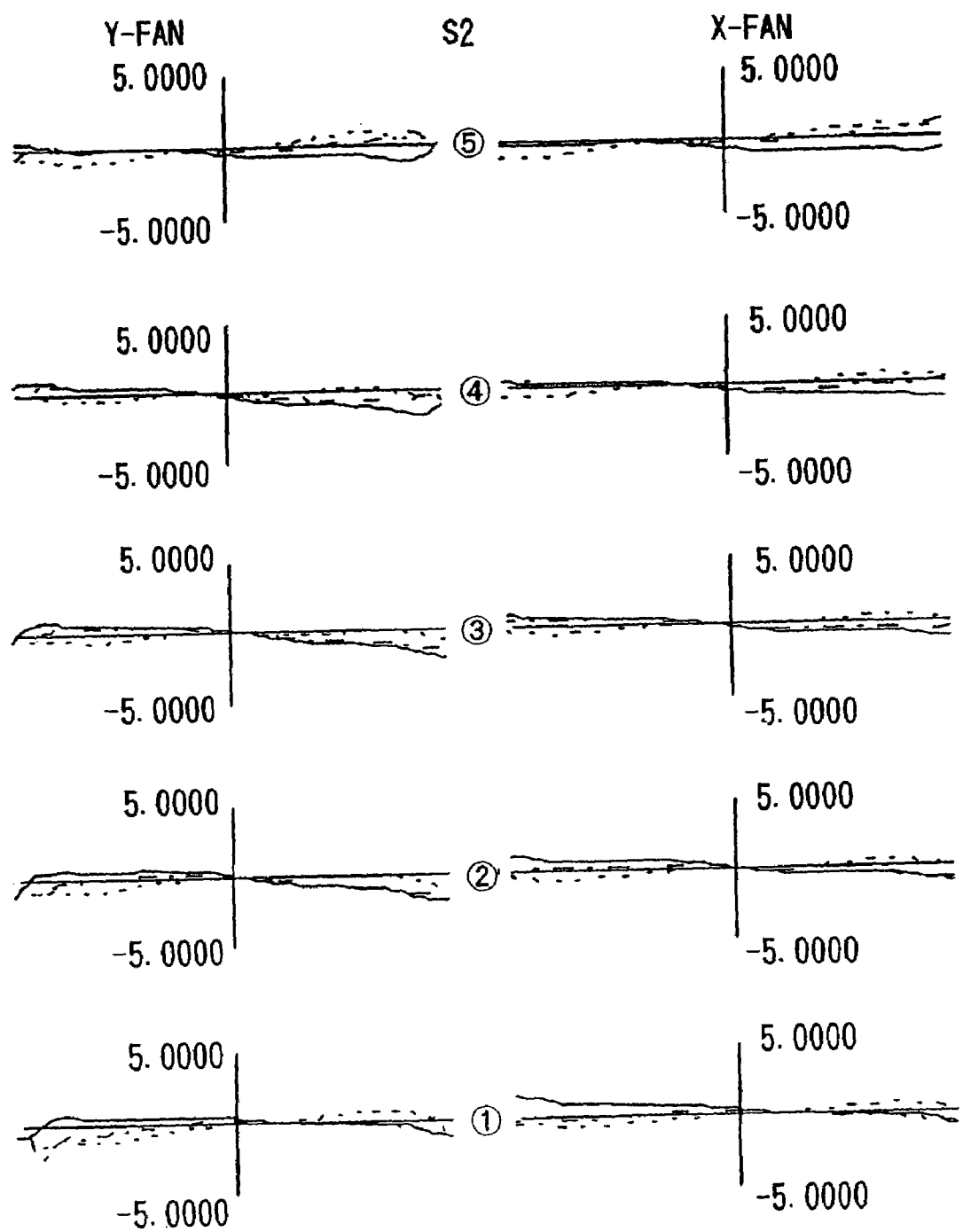
FIG. 45 is a diagram showing the lateral aberration of the projection optical system of Embodiment 5.
Figure 46:
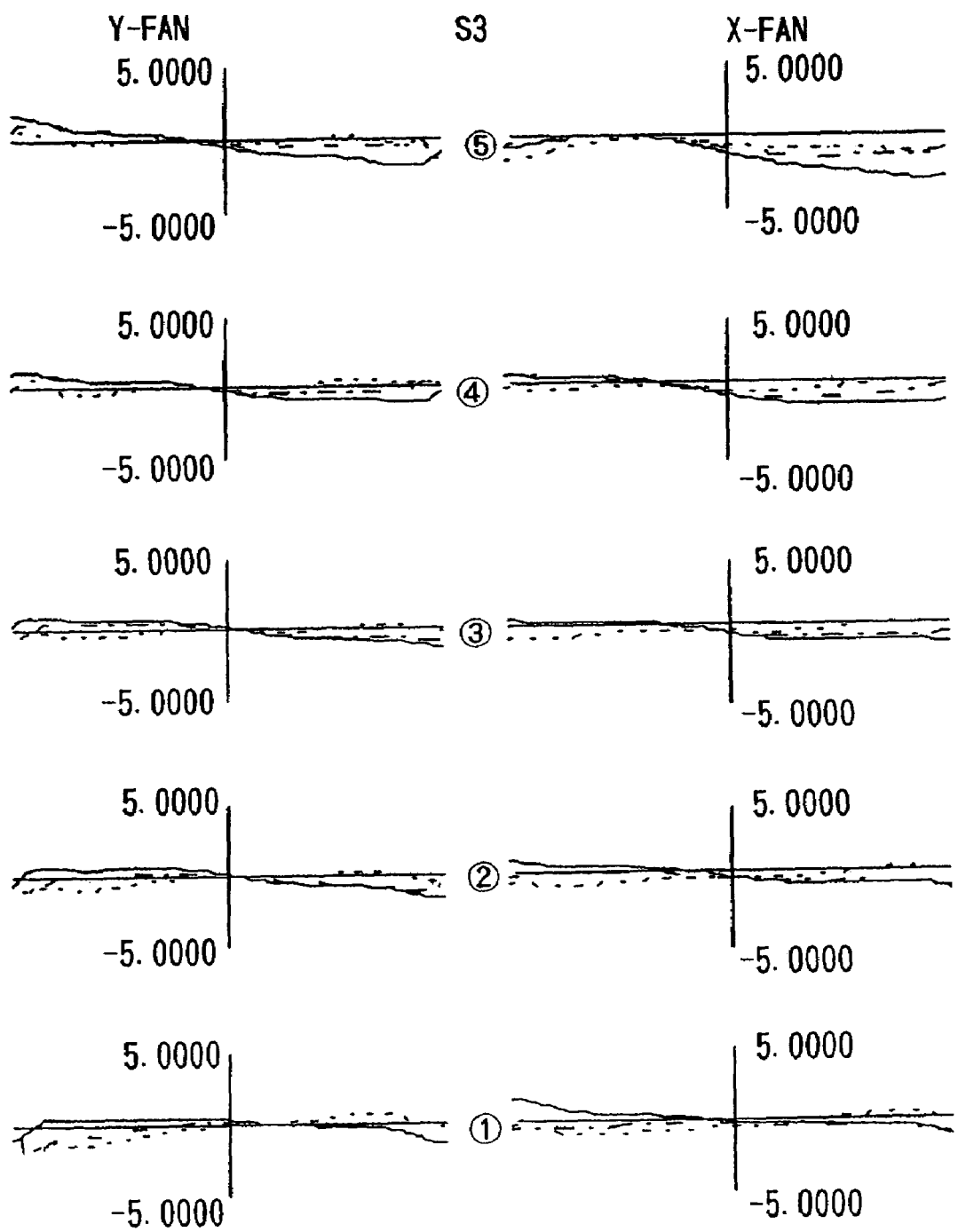
FIG. 46 is a diagram showing the lateral aberration of the projection optical system of Embodiment 5.
Figure 47:
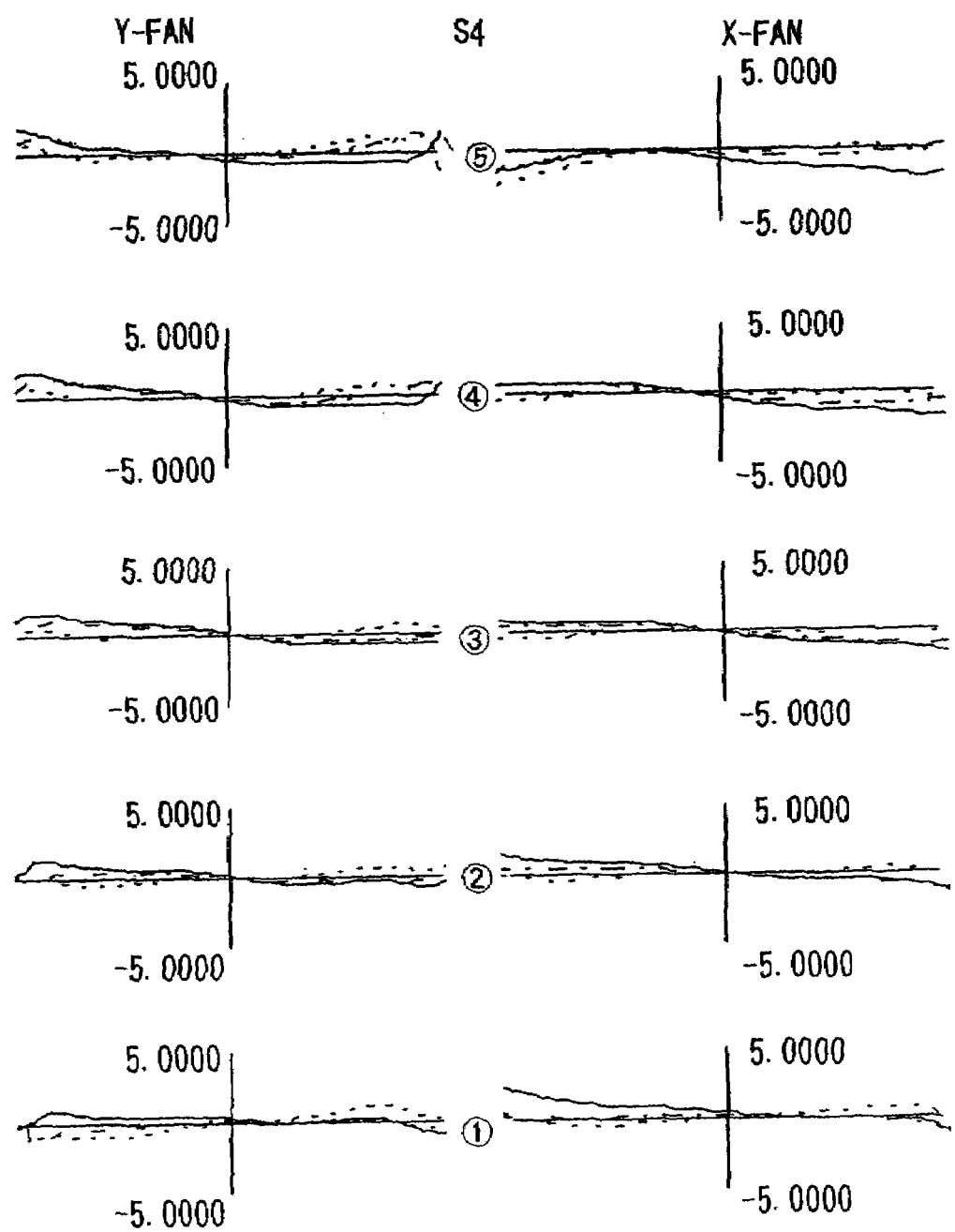
FIG. 47 is a diagram showing the lateral aberration of the projection optical system of Embodiment 5.

FIG. 43 shows the state of the distortion for the image surface positions S1 to S4 with the projection optical system P of the present embodiment, and FIGS. 44 to 47 show lateral aberration charts for the evaluation positions (1) through (5) of the image surface positions S1 to S4. As can be seen from FIG. 43, there is no large distortion in the present embodiment, and also the asymmetric distortion is small. As for the definition of the axes in the lateral aberration charts in FIGS. 44 to 47, the horizontal axis marks the x axis or the y axis on the pupil plane, and the vertical axis marks the aberration amount on the screen E. From these figures, it can be seen that excellent image formation is attained at each of the image surface positions S1 to S4.

Figure 48:
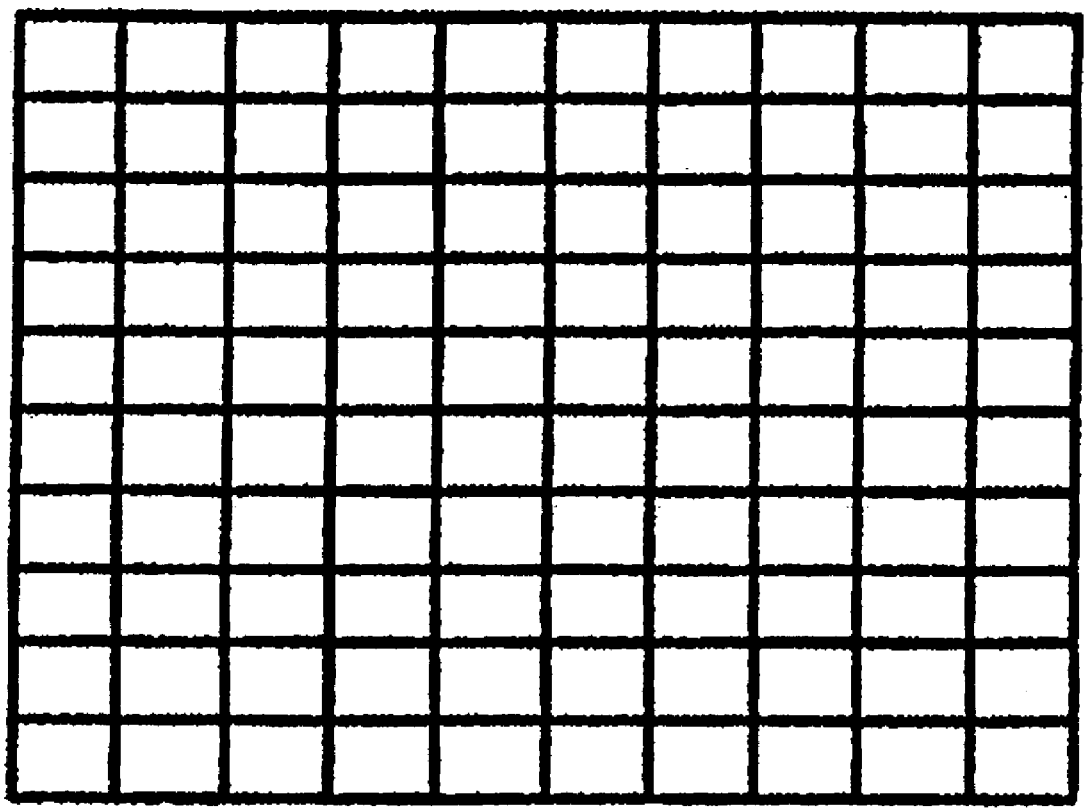
FIG. 48 is a diagram showing the distortion of the coaxial and rotationally symmetric system of Embodiment 5.
Figure 49:
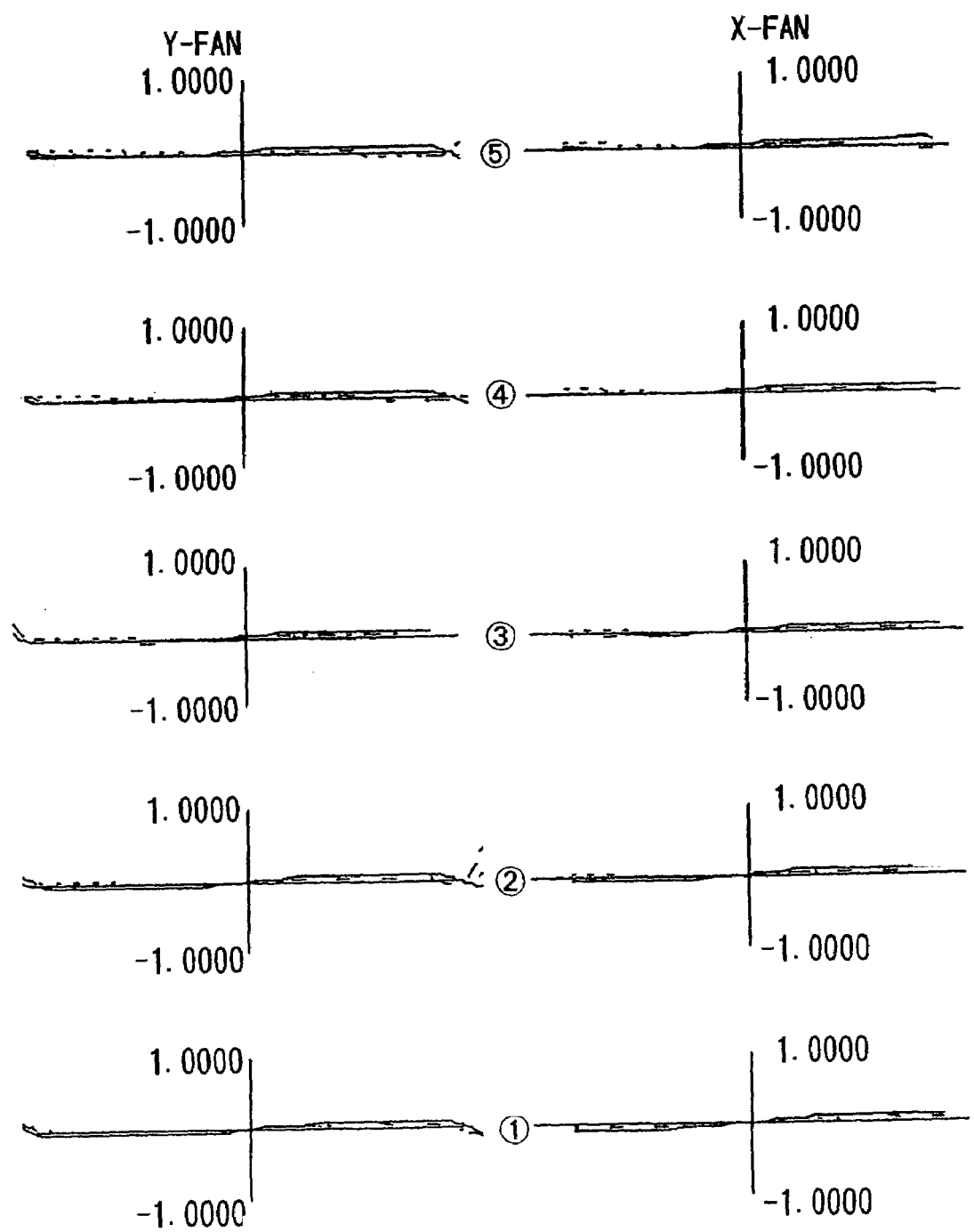
FIG. 49 is a diagram showing the lateral aberration of the coaxial and rotationally symmetric system of Embodiment 5.

In the present embodiment, as mentioned above, the first optical system C on the panel side has the ability to image light onto a spherical surface. FIG. 48 shows the state of the distortion of the first optical system C, and FIG. 49 shows lateral aberration charts at the evaluation positions (1) to (5). As can be seen from FIG. 48, there is no large distortion. And as can be seen from FIG. 49, the image formation is excellent.

It should be noted that the focal length of the first optical system C on the panel side is 162.978 mm (396.60 mm when converted to 35 mm size).

As explained in the foregoing, with the present embodiments, an image can be projected obliquely onto a screen by using off-axial reflective surfaces, so that the degree of freedom for setting up the projection display apparatus can be increased considerably. Moreover, by rotating one member within the projection optical system around the exit pupil position of the optical system on the panel side, it is possible to obtain undistorted images at any image position within a large specification range of projection angles, which is much broader than in the related art, and to realize a projection optical system and an image projection apparatus whose projection angle can be changed.

In the above-described Embodiments 1 to 5, the projection angle of the image is changed using rotatable mirrors, as shown in FIG. 50, but the present invention is not limited to this, and any optical element may be used, as long as it is a reflective member whose reflective surface angle is variable. Moreover, there is no limitation to reflective members, and it is also possible to use optical elements having a transmissive surface whose deflection direction can be varied, or an optical unit whose deflection direction can be varied and which is a combination of a plurality of optical elements.

For example, it is also possible to change the position of the image projected onto the screen by moving the first optical system C (Ra in Embodiment 2 and R1 to R4 in Embodiments 3 and 4) in a direction perpendicular to the optical axis of the first optical system C.

Moreover, if the position of the image projected onto the screen is moved in two directions (that is, two-dimensionally), then the image may be moved with respect to one direction by rotating a rotatable mirror, such as a rotatable mirror, and the image may be moved with respect the other direction by moving the first optical system C. These movements of the position of the image in two directions may be accomplished by any combination of using rotatable mirrors such as rotatable mirrors, moving the first optical system C, rotating the second optical system R and rotating the first optical system C with the liquid crystal panel.

Here, if two rotatable mirrors, such as rotatable mirrors, are used to move the image in two directions over the screen, then a first rotatable mirror having the function to move the image in a first direction with a larger movement amount, that is, a first rotatable mirror with a large rotation angle is placed at the exit pupil position of the first optical system C or at the vicinity thereof. A second rotatable mirror having the function to move the image in a direction different from the first direction and for which the movement amount of the image on the screen is smaller than for the first direction, that is a second rotatable mirror whose rotation angle is smaller than that of the first rotatable mirror is placed at a position that is further away from the exit pupil of the first optical system C than the first rotatable mirror. Thus, the rotatable mirror with the larger rotation angle can be placed at a position at which a deterioration of the optical performance can be prevented more easily, so that a deterioration of the overall optical performance can be prevented.

It should be noted, however, that the positions of the first rotatable mirror and the second rotatable mirror are not limited to this, and that it is also possible to place the first rotatable mirror and the second rotatable mirror such that the exit pupil of the first optical system C is arranged between them.

Moreover, if the image is moved in two directions over the screen with a single rotatable mirror, such as a rotatable mirror or the like, then there is the problem that the is image rotated, but it is possible to counter this by electrically rotating the image on the liquid crystal panel. Alternatively, it is also possible to rotate the liquid crystal panel itself.

Moreover, as a method for two-dimensionally moving the projection image on the screen (two-dimensionally changing the projection angle), there is the method of changing the projection angle in two perpendicular directions using two rotatable mirrors, as described above. However, as shown in FIG. 51, using an optical unit provided with a polarization beam splitter and a reflective member whose deflection direction is variable, such as a rotatable mirror, it is possible to two-dimensionally move the projection image without changing the orientation of the projection image (the orientation within the screen surface) by tilting the reflective members in two perpendicular directions (that is, by tilting the reflective members around two perpendicular rotation axes, the direction of the tilting being variable through the combination of these rotations)

Figure 51:
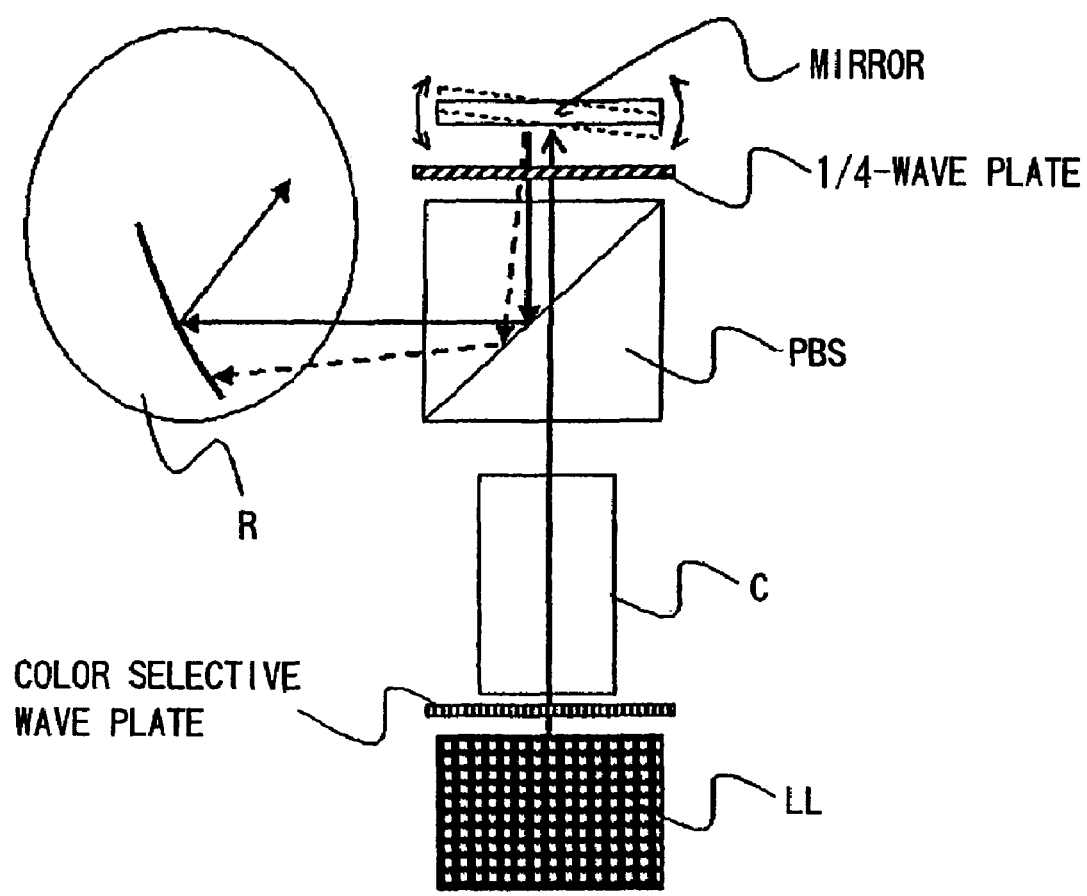
FIG. 51 is a diagram illustrating a modification example of the present embodiments.

It should be noted that FIG. 51 shows only a case in which the mirror is tilted from the state indicated by the solid line to the state indicated by the dashed line, but needless to say, the mirror may also be tilted to the side opposite to the state of the dashed line with respect to the state of the solid line.

Furthermore, in FIG. 51 the mirror is tilted only in a direction within the paper plane of the figure, but it is also possible that the mirror is tilted with respect to a direction perpendicular to the paper plane.

Thus, a two-dimensional movement of the projection image is possible by using one reflective member whose reflective surface can be tilted, so that it is possible to achieve miniaturization and simplification of the overall apparatus.

FIG. 51 shows a case in which a liquid crystal panel is used as the image display element. If there is only one liquid crystal panel (that is, in the case of a single panel), then the color-selective wave plate in FIG. 51 (that is, a color-selective wave plate which can impart a 90° phase difference on a specific color out of red light, green light and blue light, for example a color-selective wave plate which can offset green light by 90° from red light and blue light) is not necessary, and it is sufficient if the light entering the polarization beam splitter (PBS) is light with such a polarization direction that it can pass through the PBS, that is, P-polarized light. Needless to say, if the position of the rotatable mirror with respect to the PBS is changed, then the light entering the PBS may also be S-polarized light.

Moreover, in the present embodiments, rotatable rotatable mirrors are used, but the present invention is not limited to this. For example, as long as a reflective member and a drive mechanism with which the reflective member can be moved over various angles in a rotation direction are provided, then there is no limitation to rotatable mirrors.

Moreover, it is not necessary that the angle of the reflective member is changed continuously, and it is also possible that the image is projected onto a plurality of locations on the screen using a reflective member with which the angle to the optical axis of the optical system on the object side can be set discontinuously to a plurality of angles. Moreover, other than a reflective member such as a rotatable mirror, it is also possible to combine refractive optical elements (or diffractive optical elements) to form an optical unit that can deflect an image in a plurality of directions, and use this optical unit instead of the rotatable mirror.

Next, the case that three liquid crystal panels for red, green and blue are used (that is, three liquid crystal panels) is examined. If the light of the respective colors emerging from these three liquid crystal panels is color-combined by an optical element that wavelength-selectively transmits or reflects the light (for example a dichroic mirror or a dichroic prism), and the liquid crystal panels are arranged such that the polarization directions of the light emerging from the three liquid crystal panels are aligned, then a color-selective wave plate is not necessary, as for a single liquid crystal panel.

However, if color combination is performed using a PBS or the like, then the polarization directions of the three color light components inevitably do not match immediately after the color combination. In this case, it is necessary to align the polarization directions of the three color light components after the color combination and before three color light components are incident on the PBS shown in FIG. 51. Consequently, in the example shown in FIG. 51, a color-selective wave plate is arranged between the color combination system included in the image display panel system LL and the PBS, and the polarization direction of light of a specific color is rotated 90° by this color-selective wave plate, aligning the polarization directions of the three color light components.

Here, if a half-mirror is used instead of the PBS, then neither the color-selective wave plate nor the ¼-wave plate are necessary.

Moreover, the above-described Embodiments 1 to 5 further have the following characteristics feature. In the present embodiments, the second optical system R (Rb in Embodiment 2 and R5 to R8 in Embodiments 3 and 4) having a plurality of curved reflective surfaces forms an intermediate image. This second optical system R is arranged on the screen side (projection surface side) of the a reflective surface whose deflection direction is variable (or a reflective surface whose angle is variable in a rotation direction), such as a rotatable mirror. The projection optical system in the present embodiments is an enlarging projection system, so that the image light becomes gradually larger when approaching the screen, but there is the effect that the optical system (in particular the second optical system R) can be miniaturized by forming an intermediate image M with the second optical system R.

Moreover, this intermediate image is formed between the first and the second reflective surface of the second optical system R, counting from the screen side. Thus, there is the effect that the light beam diameter, which tends to increase when approaching the screen, can be constricted, and the reflective surface that is closest to the screen can be made small.

It should be noted that in the above-described embodiments, the second optical system R has four reflective surfaces, and the intermediate image is formed between the third reflective surface and the fourth reflective surface, counting from the light source side (panel side). Accordingly, the reflective surface of the second optical system R that is closest to the screen (the one reflective surface of the plurality of reflective surfaces of the second optical system R that is closest to the screen) is a concave reflective surface (having positive optical power). However, due to various reasons such as manufacturability of the reflective surfaces, the basic role of the second optical system R does not change even when no intermediate image is formed.

In the above-described Embodiments 1 to 5, the (color-combined) light that has passed through the image forming elements (e.g. liquid crystal panels) is incident on the first optical system C, the light that has passed through the first optical system C is incident on an optical system whose deflection direction is variable, such as a rotatable mirror or the like, the light that has passed through this optical system is incident on the second optical system R, and the light that has passed through this second optical system R is projected onto a screen serving as the projection surface.

Here, the exit pupil of the first optical system C (that is, the optical system that is arranged between the image forming element and the optical system whose deflection direction can be varied, or between the color combining optical system and the optical system whose deflection direction can be varied) is formed at a position closer to the screen than that optical element of the first optical system C that is placed at a position closest to the screen. Moreover, by arranging in the vicinity of this exit pupil position an optical system whose polarization direction (or deflection direction) can be varied, such as a rotatable mirror, it is possible to change the projection position of the projection image substantially without deterioration of the image quality of the projection image by changing the polarization direction (deflection direction) of the light using this optical system.

Moreover, the light valve (image forming element) LV used in the above-describe Embodiments 1 to 5, has a plurality of pixels within a plane that is perpendicular to the optical axis of the illumination optical system. Consequently, the above-described projection optical system simultaneously illuminates illumination light onto the plurality of pixels, and the light from the plurality of pixels is guided simultaneously onto the screen. This light valve LV may be a transmissive or reflective liquid crystal panel (TFT or polymer-dispersed liquid crystal), or a mirror device, such as a DMD. When using a mirror device, such as a DMD, then the mirror device may be arranged tilted from a plane that is perpendicular to the optical axis of the illumination optical system and the optical axis of the projection optical system.

Furthermore, the embodiments were described to have an aperture stop SS, but since it is a telecentric optical system, cases are conceivable in which no aperture stop is necessary. Consequently, it is not necessarily required that there is an aperture stop at the exit pupil position of the first optical system C, and the word "aperture stop" mentioned in the embodiments is interchangeable with "exit pupil" of the first optical system C.

Moreover, the second optical system R does not necessarily have to be an optical system including reflective surfaces, and it may also be a refractive optical system having only refractive lenses. Moreover, it is also possible to arrange at least one refractive lens to the screen side of the curved reflective surface of the second optical system R that is closest to the screen, that is, R4 in the embodiments.

As explained above, with the present embodiments, an image of an object surface can be moved and tilted by rotating at least one optical element around a point on the optical axis of the first optical system that is substantially at an exit pupil position of the first optical system. Therefore, it is possible to realize a projection optical system and an image projection apparatus including the same, with which undistorted images can be obtained at any image position within a large specification range of projection angles that is much broader than in the related art, and whose projection angle can be changed.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A projection optical system projecting light from an original image onto a projection surface, comprising:
   a plurality of optical elements,
   wherein a first optical system is constituted by at least one of the plurality of optical elements and has an ability to form an image of the original image on a predetermined surface different from the projection surface; and
   wherein a first optical element of the plurality of optical elements is rotated substantially around a center of an exit pupil of the first optical system, such that a projection image of the original image is moved.

2. The projection optical system according to claim 1, wherein the first optical element is rotated around a point on an optical axis of the first optical system, the point being substantially at a position of the exit pupil of the first optical system.

3. The projection optical system according to claim 1, wherein the movement of the projection image is at least one of a parallel movement and a movement in a tilting direction.

4. The projection optical system according to claim 1, wherein the first optical system has an ability to image the light from the original image onto a spherical surface whose curvature center is a point on an optical axis of the first optical system, the center point being substantially at a position of the exit pupil of the first optical system.

5. The projection optical system according to claim 1, wherein the exit pupil of the first optical system is formed at a position closer to the projection surface than an optical element, which is closest to the projection surface, of the first optical system.

6. The projection optical system according to claim 1,
wherein a second optical system is constituted by at least one of the plurality of optical elements and is arranged at a position closer to the projection surface than the first optical system; and
wherein the second optical system comprises a curved reflective surface.

7. The projection optical system according to claim 6,
wherein the second optical system comprises a curved and rotationally asymmetric reflective surface.

8. The projection optical system according to claim 6,
wherein the second optical system forms an intermediate image of the original image at a position which is different from the projection surface.

9. The projection optical system according to claim 8,
wherein the intermediate image is formed at a position closer to the original image than the reflective surface, which is closest to the projection surface, of the second optical system.

10. The projection optical system according to claim 8,
wherein the second optical system comprises a plurality of curved reflective surfaces; and
wherein the intermediate image is formed between a first reflective surface which is closest to the projection surface side, and a second reflective surface which is the second one counting from the projection surface side, of the curved reflective surfaces.

11. The projection optical system according to claim 6,
wherein the second optical system comprises four curved reflective surfaces.

12. The projection optical system according to claim 6,
wherein the reflective surface, which is closest to the projection surface, of the second optical system is a concave surface.

13. The projection optical system according to claim 6,
wherein all reflective surfaces of the second optical system are curved and rotationally asymmetric surfaces.

14. The projection optical system according to claim 6,
wherein the second optical system is rotated around a point on an optical axis of the first optical system, the point being substantially at a position of the exit pupil of the first optical system.

15. The projection optical system according to claim 6,
wherein the first optical element is arranged between the first optical system and the second optical system.

16. The projection optical system according to claim 15,
wherein the first optical element is rotatable in a plurality of rotational directions around a point, the point being on an optical axis of the first optical system.

17. The projection optical system according to claim 15,
wherein the first optical element is a reflective member.

18. The projection optical system according to claim 15,
wherein a second optical element of the plurality of optical element is rotated substantially around a center of an exit pupil of the first optical system, the first optical element and the second optical element are rotatable optical elements being rotatable in different directions.

19. The projection optical system according to claim 18,
wherein the second optical element is a reflective member.

20. The projection optical system according to claim 6,
further comprising an optical deflection element arranged between the first optical system and the second optical system, the optical deflection element deflecting a light ray traveling on the optical axis of the first optical system.

21. The projection optical system according to claim 1,
wherein the projection optical system projects the light from the original image obliquely onto the projection surface.

22. The projection optical system according to claim 1,
wherein a center line of light reaching a center of the projection image from a center of the original image is tilted with respect to the projection surface.

23. The projection optical system according to claim 1,
wherein the first optical system comprises a coaxial and rotationally symmetric lens.

24. The projection optical system according to claim 1,
wherein the first optical system consists of coaxial and rotationally symmetric lenses.

25. The projection optical system according to claim 1,
wherein the projection surface is a substantially planar surface.

26. The projection optical system according to claim 1,
wherein the projection optical system projects light from a plurality of original images onto the projection surface; and
wherein the projection optical system further comprises a color combining optical system which combines the light from the plurality of original images, the color combining optical system being arranged at a position closer to the original image than the first optical system.

27. An image projection apparatus comprising:
an image forming element forming an original image; and
the projection optical system according to claim 1.

28. The image projection apparatus according to claim 27,
wherein the image forming element is one of a reflective liquid crystal display element, a transmissive liquid crystal display element, and a mirror device.

29. An image display system comprising:
the image projection apparatus according to claim 27; and
an image information supply apparatus supplying image information for forming the original image with the image forming element to the image projection apparatus.

30. The projection optical system according to claim 1,
wherein the first optical element is arranged at the exit pupil position of the first optical system.

31. A projection optical system projecting light from an original image onto a projection surface, comprising:
a first optical system having an ability to form an image with the light onto a surface different from the projection surface;
a second optical system guiding light from the first optical system toward the projection surface and forming a projection image of the original image on the projection surface; and
an optical element arranged between the first and the second optical systems, wherein at least one of the first and the second optical systems and the optical element is rotated substantially around a center of an exit pupil of the first optical system, such that the projection image on the projection surface is moved.

32. The projection optical system according to claim 31,
wherein the optical element is a plane mirror arranged substantially at the exit pupil of the first optical system, and
wherein the optical element is rotated substantially around the center of the exit pupil of the first optical system, such that the projection image on the projection surface is moved.

33. The projection optical system according to claim 31, wherein the second optical system comprises at least a rotationally asymmetric reflective surface.

34. An image projection apparatus comprising:

an image forming element forming an original image; and a projection optical system projecting light from the original image onto a projection surface, wherein the projection optical system includes, a first optical system having an ability to form an image with the light onto a surface different from the projection surface;

a second optical system guiding light from the first optical system toward the projection surface and forming a projection image of the original image on the projection surface; and an optical element arranged between the first and the second optical systems, wherein at least one of the first and the second optical systems and the optical element is rotated substantially around a center of an exit pupil of the first optical system, such that the projection image on the projection surface is moved.

35. An image display system comprising:

the image projection apparatus according to claim 34; and an image information supply apparatus supplying image information for forming the original image with the image forming element to the image projection apparatus.

* * * * *